(12) United States Patent
Shimokawa et al.

(10) Patent No.: US 9,544,155 B2
(45) Date of Patent: Jan. 10, 2017

(54) POWER SUPPLY CONTROLLER, RELAY NODE DEVICE, WIRED AD-HOC NETWORK SYSTEM, AND POWER SUPPLY CONTROL METHOD

(71) Applicant: FUJITSU LIMITED, Kawasaki-shi, Kanagawa (JP)

(72) Inventors: Yoshinobu Shimokawa, Itoshima (JP); Toshitsugu Kobayashi, Fukuoka (JP); Yoshiyuki Jufuku, Itoshima (JP); Kensuke Kubo, Oonojo (JP); Masatsugu Kawamoto, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 214 days.

(21) Appl. No.: 14/475,037

(22) Filed: Sep. 2, 2014

(65) Prior Publication Data

US 2014/0369180 A1  Dec. 18, 2014

Related U.S. Application Data

(63) Continuation of application No. PCT/JP2012/058552, filed on Mar. 30, 2012.

(51) Int. Cl.
*H04L 12/10* (2006.01)
*H04L 12/931* (2013.01)
(Continued)

(52) U.S. Cl.
CPC ........... *H04L 12/10* (2013.01); *H04L 43/0811* (2013.01); *H04L 45/28* (2013.01); *H04L 49/40* (2013.01)

(58) Field of Classification Search
CPC ...... H04L 45/28; H04L 43/0811; H04L 12/10; H04L 49/40
See application file for complete search history.

(56) References Cited

U.S. PATENT DOCUMENTS

| | | | |
|---|---|---|---|
| 2007/0019560 A1* | 1/2007 | Brewer | H04L 12/10 370/252 |
| 2010/0231054 A1* | 9/2010 | Togawa | H04B 3/44 307/112 |

FOREIGN PATENT DOCUMENTS

| | | |
|---|---|---|
| JP | 5-252221 A | 9/1993 |
| JP | 2007-281628 | 10/2007 |

(Continued)

OTHER PUBLICATIONS

Notification of Transmittal of Translation of the International Preliminary Report on Patentability (Form PCT/IB/338, Form PCT/IB/373 & Form PCT/ISA/237), PCT/JP2012/058552, 6 pages, mailed Oct. 9, 2014.

(Continued)

*Primary Examiner* — Thai Nguyen
(74) *Attorney, Agent, or Firm* — Fujitsu Patent Center

(57) ABSTRACT

A power supply controller includes a first port, a second port, and a controller. The first port is connected to a power supply device. The second port is connected to a first relay node device via a wired path. The controller performs control to supply power received from the power supply device from the second port to the first relay node device. The controller performs control to generate a power-on instruction frame for instructing the first relay node device started by receiving power supply to start power supply from a port included in the first relay node device to a second relay node device connected to the first relay node device via a wired path. The controller performs control to transmit the generated power-on instruction frame from the second port.

14 Claims, 49 Drawing Sheets

(51) Int. Cl.
  *H04L 12/26*  (2006.01)
  *H04L 12/703*  (2013.01)

(56) References Cited

FOREIGN PATENT DOCUMENTS

JP    2009-106127    5/2009
JP    2010-213068    9/2010

OTHER PUBLICATIONS

Japanese Office Action mailed Jun. 16, 2015 for corresponding Japanese Patent Application No. 2014-507218, with Partial Translation, 6 pages.
International Search Report, mailed in connection with PCT/JP2012/058552 and mailed May 1, 2012.
Kentaro Ikemoto et al., "Wired and Wireless Hybrid Sensor Network", IEICE Technical Report, vol. 107, No. 393, Dec. 11, 2007, pp. 75-78 (7 pages). English Abstract.
Tadashige Iwao et al., "Multipurpose Practical Sensor Network: S-wire", Fujitsu. 57, May 3, 2006, pp. 285-290 (6 pages). English Abstract.

\* cited by examiner

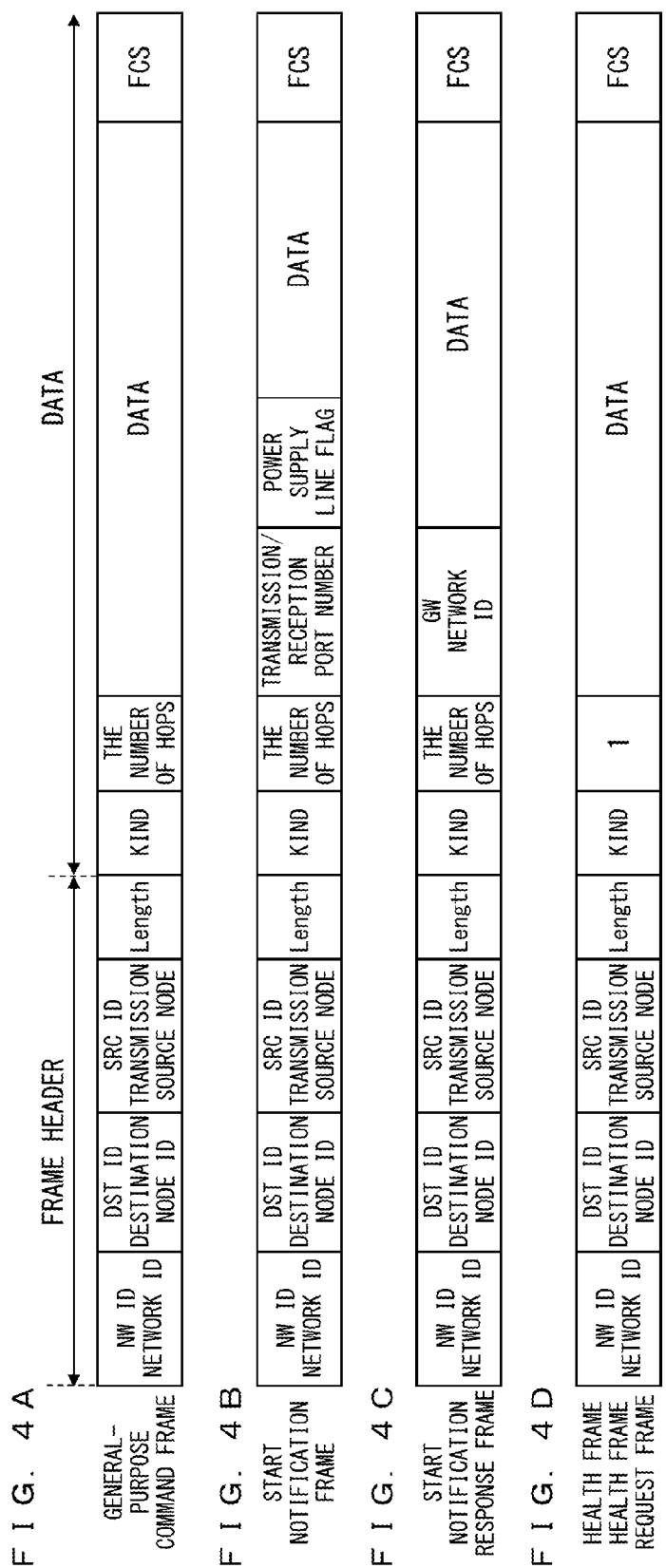

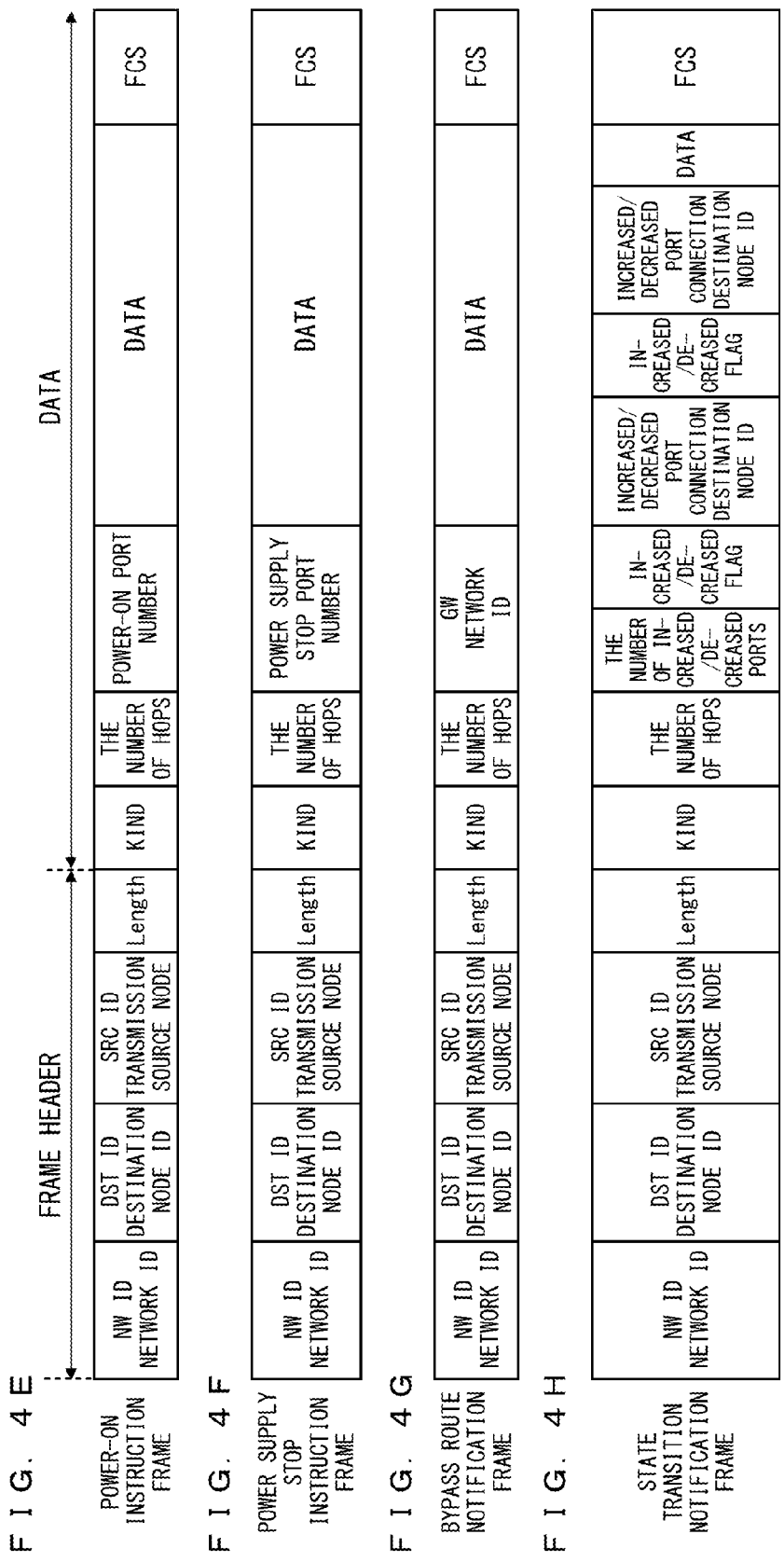

PORT 1 TRANSMISSION FRAME

| NETWORK ID | DESTINATION NODE ID | TRANSMISSION SOURCE NODE ID | KIND | THE NUMBER OF HOPS | TRANSMISSION/ RECEPTION PORT NUMBER | POWER SUPPLY LINE FLAG |
|---|---|---|---|---|---|---|
| 000000000000 | 000000000000 | NODE 1_ID | START NOTIFICATION | 1 | 10 00 00 00 00 00 00 00 | 0 |

PORT 2 TRANSMISSION FRAME

| NETWORK ID | DESTINATION NODE ID | TRANSMISSION SOURCE NODE ID | KIND | THE NUMBER OF HOPS | TRANSMISSION/ RECEPTION PORT NUMBER | POWER SUPPLY LINE FLAG |
|---|---|---|---|---|---|---|
| 000000000000 | 000000000000 | NODE 1_ID | START NOTIFICATION | 1 | 20 00 00 00 00 00 00 00 | 0 |

PORT 3 TRANSMISSION FRAME

| NETWORK ID | DESTINATION NODE ID | TRANSMISSION SOURCE NODE ID | KIND | THE NUMBER OF HOPS | TRANSMISSION/ RECEPTION PORT NUMBER | POWER SUPPLY LINE FLAG |
|---|---|---|---|---|---|---|
| 000000000000 | 000000000000 | NODE 1_ID | START NOTIFICATION | 1 | 30 00 00 00 00 00 00 00 | 0 |

F I G. 6 A

GW TRANSMISSION FRAME

| NETWORK ID | DESTINATION NODE ID | TRANSMISSION SOURCE NODE ID | KIND | THE NUMBER OF HOPS | TRANSMISSION/ RECEPTION PORT No. |
|---|---|---|---|---|---|
| 0FFFFFFFFFFF | NODE 1_ID | GW_ID | START NOTIFICATION RESPONSE | 1 | 1FFFFFFFFFFF |

GW TRANSMISSION FRAME:

| NETWORK ID | DESTINATION NODE ID | TRANSMISSION SOURCE NODE ID | KIND | THE NUMBER OF HOPS | POWER-ON PORT NUMBER |
|---|---|---|---|---|---|
| FFFFFFFFFFFF | NODE 1_ID | GW_ID | POWER-ON INSTRUCTION | 1 | POWER-ON SPECIFIED VALUE |

FIG. 7B

| | NETWORK ID | DESTINATION NODE ID | TRANSMISSION SOURCE NODE ID | KIND | THE NUMBER OF HOPS | TRANSMISSION/RECEPTION PORT NUMBER | POWER SUPPLY LINE FLAG |
|---|---|---|---|---|---|---|---|
| NODE 5 PORT 1 TRANSMISSION FRAME | 000000000000 | 000000000000 | NODE 5_ID | START NOTIFICATION | 1 | 10 00 00 00 00 00 00 | 0 |
| NODE 5 PORT 2 TRANSMISSION FRAME | 000000000000 | 000000000000 | NODE 5_ID | START NOTIFICATION | 1 | 20 00 00 00 00 00 00 | 0 |
| NODE 5 PORT 3 TRANSMISSION FRAME | 000000000000 | 000000000000 | NODE 5_ID | START NOTIFICATION | 1 | 30 00 00 00 00 00 00 | 0 |

FIG. 7C

NODE 1 TRANSMISSION FRAME:

| NETWORK ID | DESTINATION NODE ID | TRANSMISSION SOURCE NODE ID | KIND | THE NUMBER OF HOPS | TRANSMISSION/RECEPTION PORT NUMBER | POWER SUPPLY LINE FLAG |
|---|---|---|---|---|---|---|
| 000000000000 | 000000000000 | NODE 5_ID | START NOTIFICATION | 2 | 12 10 00 00 00 00 00 | 1 |

FIG. 7D

GW TRANSMISSION FRAME:

| NETWORK ID | DESTINATION NODE ID | TRANSMISSION SOURCE NODE ID | KIND | THE NUMBER OF HOPS | GW NETWORK ID |
|---|---|---|---|---|---|
| 200000000000 | NODE 5_ID | GW_ID | START NOTIFICATION RESPONSE | 2 | 11FFFFFFFFFF |

FIG. 7E

NODE 1 TRANSMISSION FRAME

| NETWORK ID | DESTINATION NODE ID | TRANSMISSION SOURCE NODE ID | KIND | THE NUMBER OF HOPS | GW NETWORK ID |
|---|---|---|---|---|---|
| 0FFFFFFFFFFF | NODE 5_ID | GW_ID | START NOTIFICATION RESPONSE | 2 | 11FFFFFFFFFF |

FIG. 7F

| | NETWORK ID | DESTINATION NODE ID | TRANSMISSION SOURCE NODE ID | KIND | THE NUMBER OF HOPS | TRANSMISSION/ RECEPTION PORT NUMBER | POWER SUPPLY LINE FLAG |
|---|---|---|---|---|---|---|---|
| NODE 2 PORT 1 TRANSMISSION FRAME | 000000000000 | 000000000000 | NODE 2_ID | START NOTIFICATION | 1 | 10 00 00 00 00 00 | 0 |
| NODE 2 PORT 2 TRANSMISSION FRAME | 000000000000 | 000000000000 | NODE 2_ID | START NOTIFICATION | 1 | 20 00 00 00 00 00 | 0 |
| NODE 2 PORT 3 TRANSMISSION FRAME | 000000000000 | 000000000000 | NODE 2_ID | START NOTIFICATION | 1 | 30 00 00 00 00 00 | 0 |

FIG. 7G

NODE 1 TRANSMISSION FRAME

| NETWORK ID | DESTINATION NODE ID | TRANSMISSION SOURCE NODE ID | KIND | THE NUMBER OF HOPS | TRANSMISSION/ RECEPTION PORT NUMBER | POWER SUPPLY LINE FLAG |
|---|---|---|---|---|---|---|
| 000000000000 | 000000000000 | NODE 2_ID | START NOTIFICATION | 2 | 13 30 00 00 00 00 | 1 |

FIG. 7H
GW TRANSMISSION FRAME

| NETWORK ID | DESTINATION NODE ID | TRANSMISSION SOURCE NODE ID | KIND | THE NUMBER OF HOPS | GW NETWORK ID |
|---|---|---|---|---|---|
| 30FFFFFFFFFF | NODE 2_ID | GW_ID | START NOTIFICATION RESPONSE | 2 | 31FFFFFFFFFF |

FIG. 7I
NODE 1 TRANSMISSION FRAME

| NETWORK ID | DESTINATION NODE ID | TRANSMISSION SOURCE NODE ID | KIND | THE NUMBER OF HOPS | GW NETWORK ID |
|---|---|---|---|---|---|
| 0FFFFFFFFFFF | NODE 2_ID | GW_ID | START NOTIFICATION RESPONSE | 2 | 31FFFFFFFFFF |

FIG. 8A
GW TRANSMISSION FRAME

| NETWORK ID | DESTINATION NODE ID | TRANSMISSION SOURCE NODE ID | KIND | THE NUMBER OF HOPS | POWER-ON PORT NUMBER |
|---|---|---|---|---|---|
| 20FFFFFFFFFF | NODE 5_ID | GW_ID | POWER-ON INSTRUCTION | 2 | POWER-ON SPECIFIED VALUE |

FIG. 8B
NODE 9 PORT 1 TRANSMISSION FRAME

| NETWORK ID | DESTINATION NODE ID | TRANSMISSION SOURCE NODE ID | KIND | THE NUMBER OF HOPS | TRANSMISSION/RECEPTION PORT NO. | POWER SUPPLY LINE FLAG |
|---|---|---|---|---|---|---|
| 000000000000 | 000000000000 | NODE 9_ID | START NOTIFICATION | 1 | 10 00 00 00 00 00 | 0 |

FIG. 8C
NODE 5 TRANSMISSION FRAME

| NETWORK ID | DESTINATION NODE ID | TRANSMISSION SOURCE NODE ID | KIND | THE NUMBER OF HOPS | TRANSMISSION/RECEPTION PORT NO. | POWER SUPPLY LINE FLAG |
|---|---|---|---|---|---|---|
| 000000000000 | 000000000000 | NODE 9_ID | START NOTIFICATION | 2 | 12 10 00 00 00 00 | 1 |

FIG. 8D
NODE 1 TRANSMISSION FRAME

| NETWORK ID | DESTINATION NODE ID | TRANSMISSION SOURCE NODE ID | KIND | THE NUMBER OF HOPS | TRANSMISSION/RECEPTION PORT NO. | POWER SUPPLY LINE FLAG |
|---|---|---|---|---|---|---|
| 000000000000 | 000000000000 | NODE 9_ID | START NOTIFICATION | 3 | 12 12 10 00 00 00 | 1 |

FIG. 8E

| NETWORK ID | DESTINATION NODE ID | TRANSMISSION SOURCE NODE ID | KIND | THE NUMBER OF HOPS | GW NETWORK ID |
|---|---|---|---|---|---|
| 220FFFFFFFFF | NODE 9_ID | GW_ID | START NOTIFICATION RESPONSE | 3 | 111FFFFFFFFF |

GW TRANSMISSION FRAME

FIG. 8F

| NETWORK ID | DESTINATION NODE ID | TRANSMISSION SOURCE NODE ID | KIND | THE NUMBER OF HOPS | GW NETWORK ID |
|---|---|---|---|---|---|
| 20FFFFFFFFFF | NODE 9_ID | GW_ID | START NOTIFICATION RESPONSE | 3 | 111FFFFFFFFF |

NODE 1 TRANSMISSION FRAME

FIG. 8G

| NETWORK ID | DESTINATION NODE ID | TRANSMISSION SOURCE NODE ID | KIND | THE NUMBER OF HOPS | GW NETWORK ID |
|---|---|---|---|---|---|
| 0FFFFFFFFFFF | NODE 9_ID | GW_ID | START NOTIFICATION RESPONSE | 3 | 111FFFFFFFFF |

NODE 5 TRANSMISSION FRAME

FIG. 8H

| NETWORK ID | DESTINATION NODE ID | TRANSMISSION SOURCE NODE ID | KIND | THE NUMBER OF HOPS | TRANSMISSION/ RECEPTION PORT NO. | POWER SUPPLY LINE FLAG |
|---|---|---|---|---|---|---|
| 000000000000 | 000000000000 | NODE 6_ID | START NOTIFICATION | 1 | 20 00 00 00 00 00 | 0 |
| 000000000000 | 000000000000 | NODE 6_ID | START NOTIFICATION | 1 | 30 00 00 00 00 00 | 0 |

NODE 6 PORT 2 TRANSMISSION FRAME

NODE 6 PORT 3 TRANSMISSION FRAME

FIG. 8I

NODE 2 TRANSMISSION FRAME

| NETWORK ID | DESTINATION NODE ID | TRANSMISSION SOURCE NODE ID | KIND | THE NUMBER OF HOPS | TRANSMISSION/ RECEPTION PORT NO. | POWER SUPPLY LINE FLAG |
|---|---|---|---|---|---|---|
| 00000000000 | 00000000000 | NODE 6_ID | START NOTIFICATION | 2 | 32 20 00 00 00 00 | 0 |

FIG. 8J

NODE 1 TRANSMISSION FRAME

| NETWORK ID | DESTINATION NODE ID | TRANSMISSION SOURCE NODE ID | KIND | THE NUMBER OF HOPS | TRANSMISSION/ RECEPTION PORT NO. | POWER SUPPLY LINE FLAG |
|---|---|---|---|---|---|---|
| 00000000000 | 00000000000 | NODE 6_ID | START NOTIFICATION | 3 | 13 32 20 00 00 00 | 0 |

FIG. 8K

NODE 5 TRANSMISSION FRAME

| NETWORK ID | DESTINATION NODE ID | TRANSMISSION SOURCE NODE ID | KIND | THE NUMBER OF HOPS | TRANSMISSION/ RECEPTION PORT NO. | POWER SUPPLY LINE FLAG |
|---|---|---|---|---|---|---|
| 00000000000 | 00000000000 | NODE 6_ID | START NOTIFICATION | 2 | 13 30 00 00 00 00 | 1 |

FIG. 8L

NODE 1 TRANSMISSION FRAME

| NETWORK ID | DESTINATION NODE ID | TRANSMISSION SOURCE NODE ID | KIND | THE NUMBER OF HOPS | TRANSMISSION/ RECEPTION PORT NO. | POWER SUPPLY LINE FLAG |
|---|---|---|---|---|---|---|
| 00000000000 | 00000000000 | NODE 6_ID | START NOTIFICATION | 3 | 12 13 30 00 00 00 | 1 |

| FIG. | | | | | |
|---|---|---|---|---|---|
| FIG. 8M GW TRANSMISSION FRAME | NETWORK ID 230FFFFFFFFF | DESTINATION NODE ID NODE 6_ID | TRANSMISSION SOURCE NODE ID GW_ID | KIND START NOTIFICATION RESPONSE | THE NUMBER OF HOPS 3 | GW NETWORK ID 311FFFFFFFFF |
| FIG. 8N NODE 1 TRANSMISSION FRAME | NETWORK ID 30FFFFFFFFFF | DESTINATION NODE ID NODE 6_ID | TRANSMISSION SOURCE NODE ID GW_ID | KIND START NOTIFICATION RESPONSE | THE NUMBER OF HOPS 3 | GW NETWORK ID 311FFFFFFFFF |
| FIG. 8O NODE 5 TRANSMISSION FRAME | NETWORK ID 0FFFFFFFFFFF | DESTINATION NODE ID NODE 6_ID | TRANSMISSION SOURCE NODE ID GW_ID | KIND START NOTIFICATION RESPONSE | THE NUMBER OF HOPS 3 | GW NETWORK ID 311FFFFFFFFF |
| FIG. 8P GW TRANSMISSION FRAME | NETWORK ID 320FFFFFFFFF | DESTINATION NODE ID NODE 6_ID | TRANSMISSION SOURCE NODE ID GW_ID | KIND ALTERNATIVE ROUTE NOTIFICATION | THE NUMBER OF HOPS 3 | GW NETWORK ID 231FFFFFFFFF |
| FIG. 8Q NODE 1 TRANSMISSION FRAME | NETWORK ID 20FFFFFFFFFF | DESTINATION NODE ID NODE 6_ID | TRANSMISSION SOURCE NODE ID GW_ID | KIND ALTERNATIVE ROUTE NOTIFICATION | THE NUMBER OF HOPS 3 | GW NETWORK ID 231FFFFFFFFF |
| FIG. 8R NODE 2 TRANSMISSION FRAME | NETWORK ID 0FFFFFFFFFFF | DESTINATION NODE ID NODE 6_ID | TRANSMISSION SOURCE NODE ID GW_ID | KIND ALTERNATIVE ROUTE NOTIFICATION | THE NUMBER OF HOPS 3 | GW NETWORK ID 231FFFFFFFFF |

FIG. 12A

NODE 20

| NETWORK ID | DESTINATION NODE ID | TRANSMISSION SOURCE NODE ID | KIND | THE NUMBER OF HOPS | TRANSMISSION/ RECEPTION PORT NO. | POWER SUPPLY LINE FLAG |
|---|---|---|---|---|---|---|
| 000000000000 | 000000000000 | NODE 1_ID | START NOTIFICATION | 1 | 10 00 00 00 00 00 00 00 | 0 |

TRANSMISSION FRAME

FIG. 12B

NODE 16

| NETWORK ID | DESTINATION NODE ID | TRANSMISSION SOURCE NODE ID | KIND | THE NUMBER OF HOPS | TRANSMISSION/ RECEPTION PORT NO. | POWER SUPPLY LINE FLAG |
|---|---|---|---|---|---|---|
| 000000000000 | 000000000000 | NODE 1_ID | START NOTIFICATION | 2 | 32 10 00 00 00 00 00 00 | 1 |

TRANSMISSION FRAME

FIG. 12C

NODE 15

| NETWORK ID | DESTINATION NODE ID | TRANSMISSION SOURCE NODE ID | KIND | THE NUMBER OF HOPS | TRANSMISSION/ RECEPTION PORT NO. | POWER SUPPLY LINE FLAG |
|---|---|---|---|---|---|---|
| 000000000000 | 000000000000 | NODE 1_ID | START NOTIFICATION | 3 | 13 32 10 00 00 00 00 00 | 1 |

TRANSMISSION FRAME

FIG. 12D

NODE 11

| NETWORK ID | DESTINATION NODE ID | TRANSMISSION SOURCE NODE ID | KIND | THE NUMBER OF HOPS | TRANSMISSION/ RECEPTION PORT NO. | POWER SUPPLY LINE FLAG |
|---|---|---|---|---|---|---|
| 000000000000 | 000000000000 | NODE 1_ID | START NOTIFICATION | 4 | 32 13 32 10 00 00 00 00 | 1 |

TRANSMISSION FRAME

FIG. 12E

| | NETWORK ID | DESTINATION NODE ID | TRANSMISSION SOURCE NODE ID | KIND | THE NUMBER OF HOPS | TRANSMISSION/ RECEPTION PORT NO. | POWER SUPPLY LINE FLAG |
|---|---|---|---|---|---|---|---|
| NODE 10 TRANSMISSION FRAME | 000000000000 | 000000000000 | NODE 1_ID | START NOTIFICATION | 5 | 13 32 13 32 10 00 00 00 | 1 |

FIG. 12F

| | NETWORK ID | DESTINATION NODE ID | TRANSMISSION SOURCE NODE ID | KIND | THE NUMBER OF HOPS | TRANSMISSION/ RECEPTION PORT NO. | POWER SUPPLY LINE FLAG |
|---|---|---|---|---|---|---|---|
| NODE 6 TRANSMISSION FRAME | 000000000000 | 000000000000 | NODE 1_ID | START NOTIFICATION | 6 | 31 13 32 13 32 10 00 00 | 1 |

FIG. 12G

| | NETWORK ID | DESTINATION NODE ID | TRANSMISSION SOURCE NODE ID | KIND | THE NUMBER OF HOPS | TRANSMISSION/ RECEPTION PORT NO. | POWER SUPPLY LINE FLAG |
|---|---|---|---|---|---|---|---|
| NODE 5 TRANSMISSION FRAME | 000000000000 | 000000000000 | NODE 1_ID | START NOTIFICATION | 7 | 13 31 13 32 13 32 10 00 | 1 |

FIG. 12H

| | NETWORK ID | DESTINATION NODE ID | TRANSMISSION SOURCE NODE ID | KIND | THE NUMBER OF HOPS | TRANSMISSION/ RECEPTION PORT NO. | POWER SUPPLY LINE FLAG |
|---|---|---|---|---|---|---|---|
| NODE 1 TRANSMISSION FRAME | 000000000000 | 000000000000 | NODE 1_ID | START NOTIFICATION | 8 | 12 13 31 13 32 13 32 10 | 1 |

FIG. 13A

GW TRANSMISSION FRAME

| NETWORK ID | DESTINATION NODE ID | TRANSMISSION SOURCE NODE ID | KIND | THE NUMBER OF HOPS | GW NETWORK ID |
|---|---|---|---|---|---|
| 23132320FFFF | NODE 20_ID | GW_ID | START NOTIFICATION RESPONSE | 8 | 13133111FFFF |

FIG. 13B

NODE 1 TRANSMISSION FRAME

| NETWORK ID | DESTINATION NODE ID | TRANSMISSION SOURCE NODE ID | KIND | THE NUMBER OF HOPS | GW NETWORK ID |
|---|---|---|---|---|---|
| 3132320FFFFF | NODE 20_ID | GW_ID | START NOTIFICATION RESPONSE | 8 | 13133111FFFF |

FIG. 13C

NODE 2 TRANSMISSION FRAME

| NETWORK ID | DESTINATION NODE ID | TRANSMISSION SOURCE NODE ID | KIND | THE NUMBER OF HOPS | GW NETWORK ID |
|---|---|---|---|---|---|
| 132320FFFFFF | NODE 20_ID | GW_ID | START NOTIFICATION RESPONSE | 8 | 13133111FFFF |

FIG. 13D

NODE 6 TRANSMISSION FRAME

| NETWORK ID | DESTINATION NODE ID | TRANSMISSION SOURCE NODE ID | KIND | THE NUMBER OF HOPS | GW NETWORK ID |
|---|---|---|---|---|---|
| 32320FFFFFFF | NODE 20_ID | GW_ID | START NOTIFICATION RESPONSE | 8 | 13133111FFFF |

FIG. 13E

NODE 10 TRANSMISSION FRAME

| NETWORK ID | DESTINATION NODE ID | TRANSMISSION SOURCE NODE ID | KIND | THE NUMBER OF HOPS | GW NETWORK ID |
|---|---|---|---|---|---|
| 2320FFFFFFFF | NODE 20_ID | GW_ID | START NOTIFICATION RESPONSE | 8 | 13133111FFFF |

FIG. 13F
NODE 11 TRANSMISSION FRAME

| NETWORK ID | DESTINATION NODE ID | TRANSMISSION SOURCE NODE ID | KIND | THE NUMBER OF HOPS | GW NETWORK ID |
|---|---|---|---|---|---|
| 320FFFFFFFFF | NODE 20_ID | GW_ID | START NOTIFICATION RESPONSE | 8 | 13133111FFFF |

FIG. 13G
NODE 15 TRANSMISSION FRAME

| NETWORK ID | DESTINATION NODE ID | TRANSMISSION SOURCE NODE ID | KIND | THE NUMBER OF HOPS | GW NETWORK ID |
|---|---|---|---|---|---|
| 20FFFFFFFFFF | NODE 20_ID | GW_ID | START NOTIFICATION RESPONSE | 8 | 13133111FFFF |

FIG. 13H
NODE 16 TRANSMISSION FRAME

| NETWORK ID | DESTINATION NODE ID | TRANSMISSION SOURCE NODE ID | KIND | THE NUMBER OF HOPS | GW NETWORK ID |
|---|---|---|---|---|---|
| 0FFFFFFFFFFF | NODE 20_ID | GW_ID | START NOTIFICATION RESPONSE | 8 | 13133111FFFF |

| NODE NUMBER | PRIORITY ORDER | NETWORK ID | THE NUMBER OF HOPS | POWER SUPPLY LINE FLAG |
|---|---|---|---|---|
| NODE 10 | 1 | 2310FFFFFFFF | 4 | 1 |
| | 2 | 222320FFFFFF | 6 | 0 |
| | 3 | 312230FFFFFF | 6 | 0 |

F I G. 1 4

| ROUTING | PRIORITY ORDER | NETWORK ID | THE NUMBER OF HOPS | TRANSMISSION PORT NUMBER |
|---|---|---|---|---|
| GW | 1 | 1311FFFFFFFF | 4 | 1 |
| | 2 | 231111FFFFFF | 6 | 2 |
| | 3 | 311331FFFFFF | 6 | 3 |

F I G. 1 5

| NODE NUMBER | PRIORITY ORDER | NETWORK ID | THE NUMBER OF HOPS | POWER SUPPLY LINE FLAG |
|---|---|---|---|---|
| NODE 10 | 1 | 231111FFFFFF | 6 | 1 |
| | 2 | 311331FFFFFF | 6 | 0 |
| | 3 | FFFFFFFFFFFF | 0 | 0 |

FIG. 21

| ROUTING | PRIORITY ORDER | NETWORK ID | THE NUMBER OF HOPS | TRANSMISSION PORT NUMBER |
|---|---|---|---|---|
| NODE 10 | 1 | 222320FFFFFF | 6 | 2 |
| | 2 | 312230FFFFFF | 6 | 3 |
| | 3 | FFFFFFFFFFFF | 0 | 0 |

F I G. 2 2

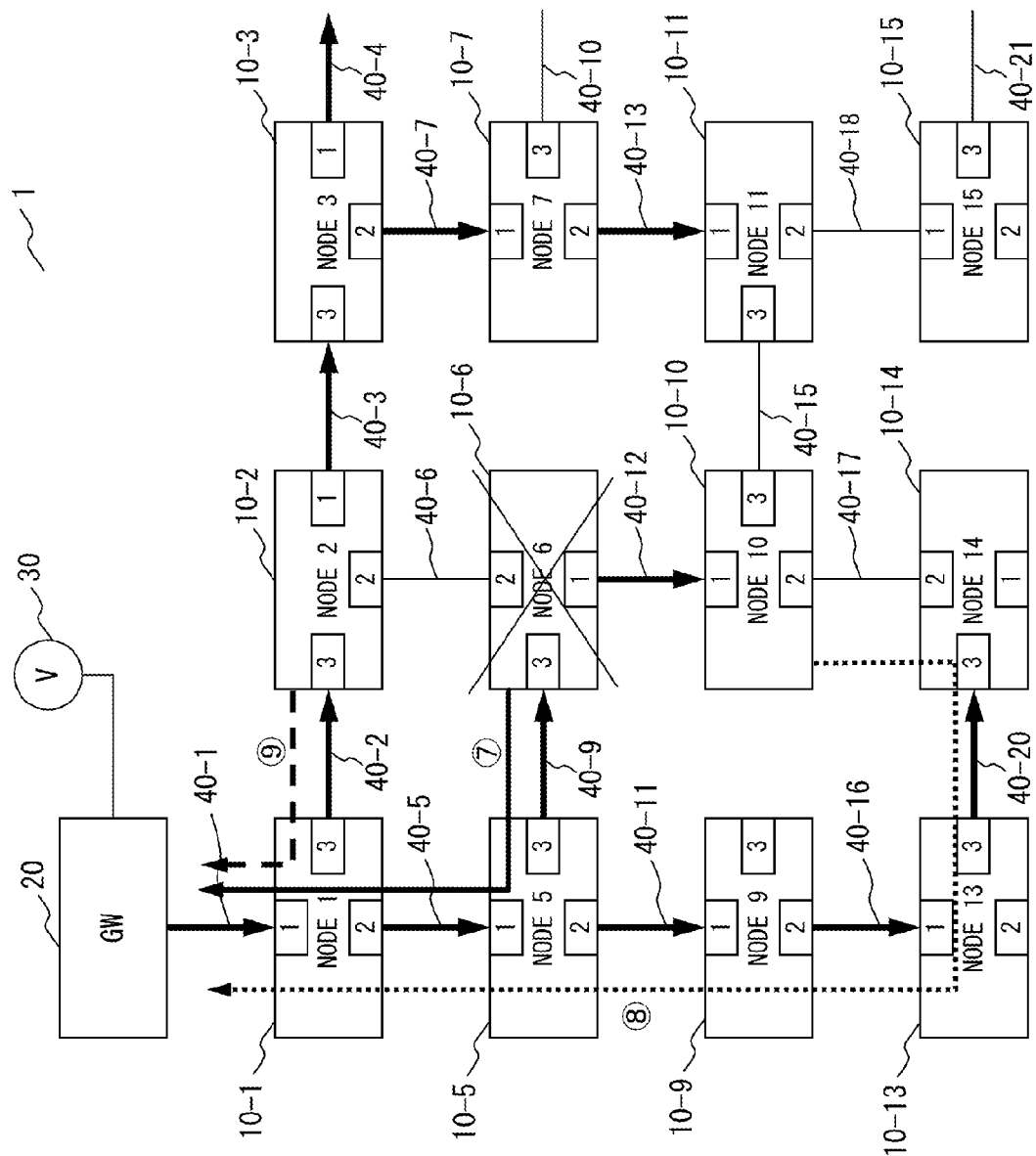
F I G. 2 3

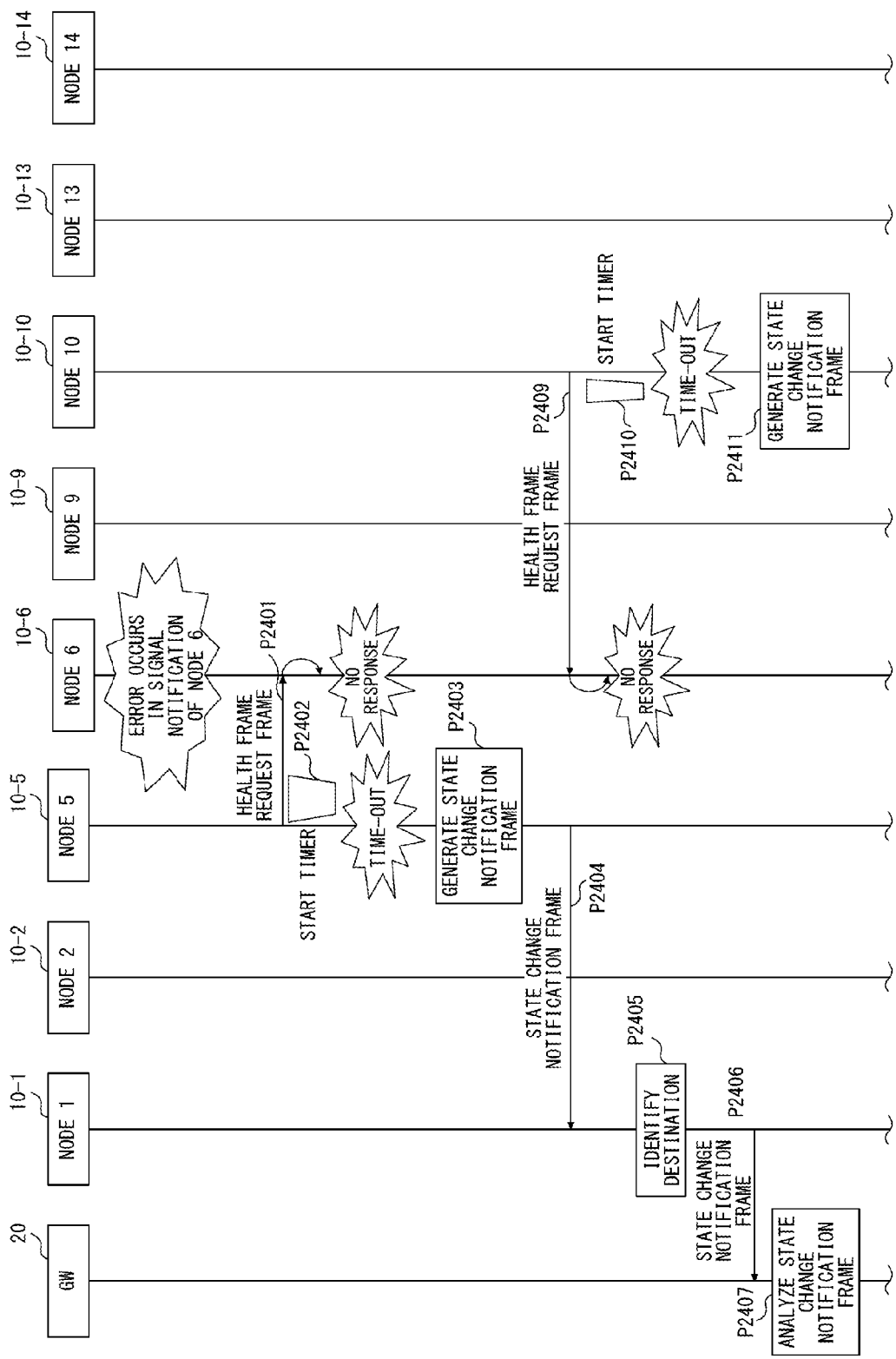
F I G. 24A

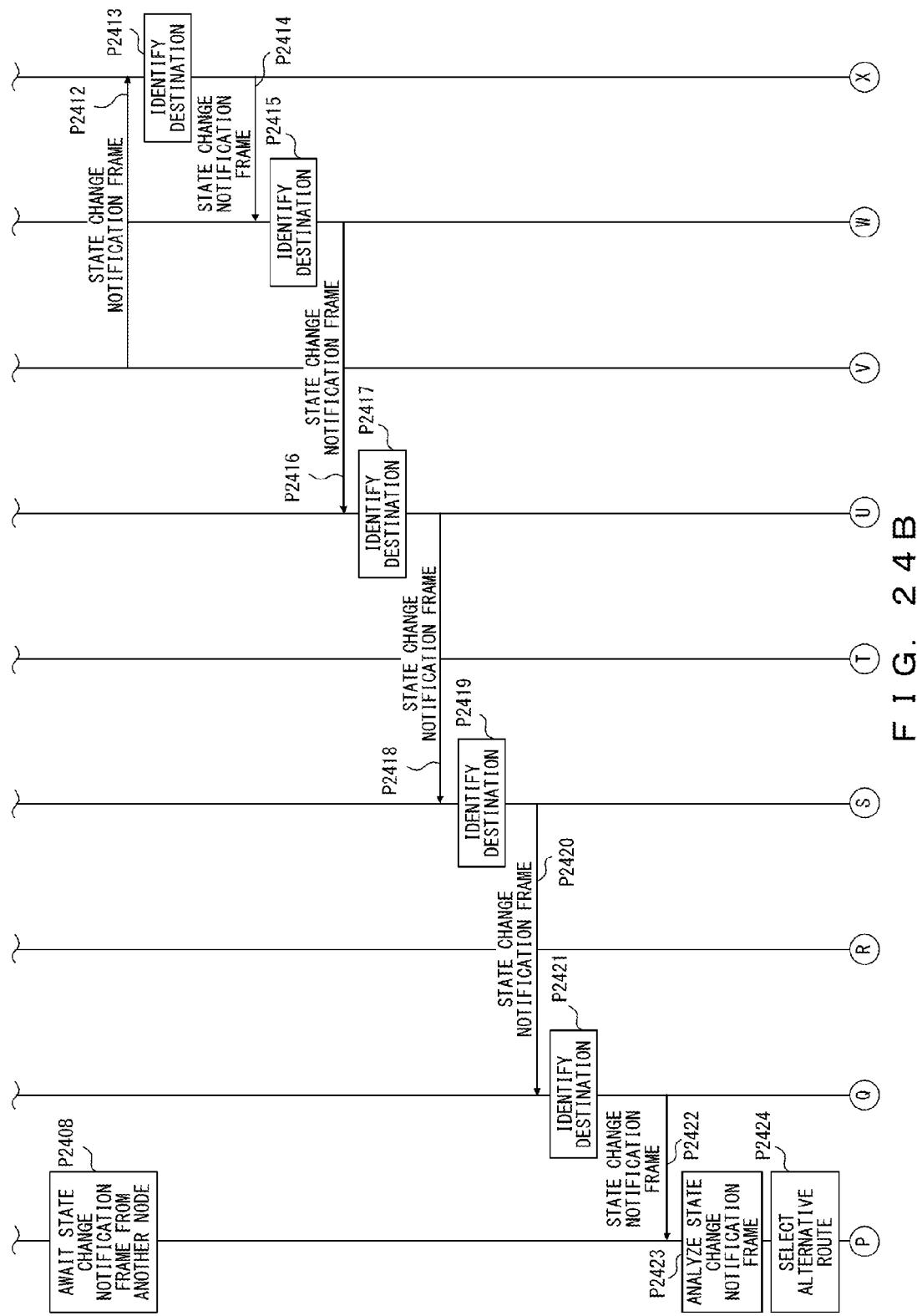
F I G. 2 4 B

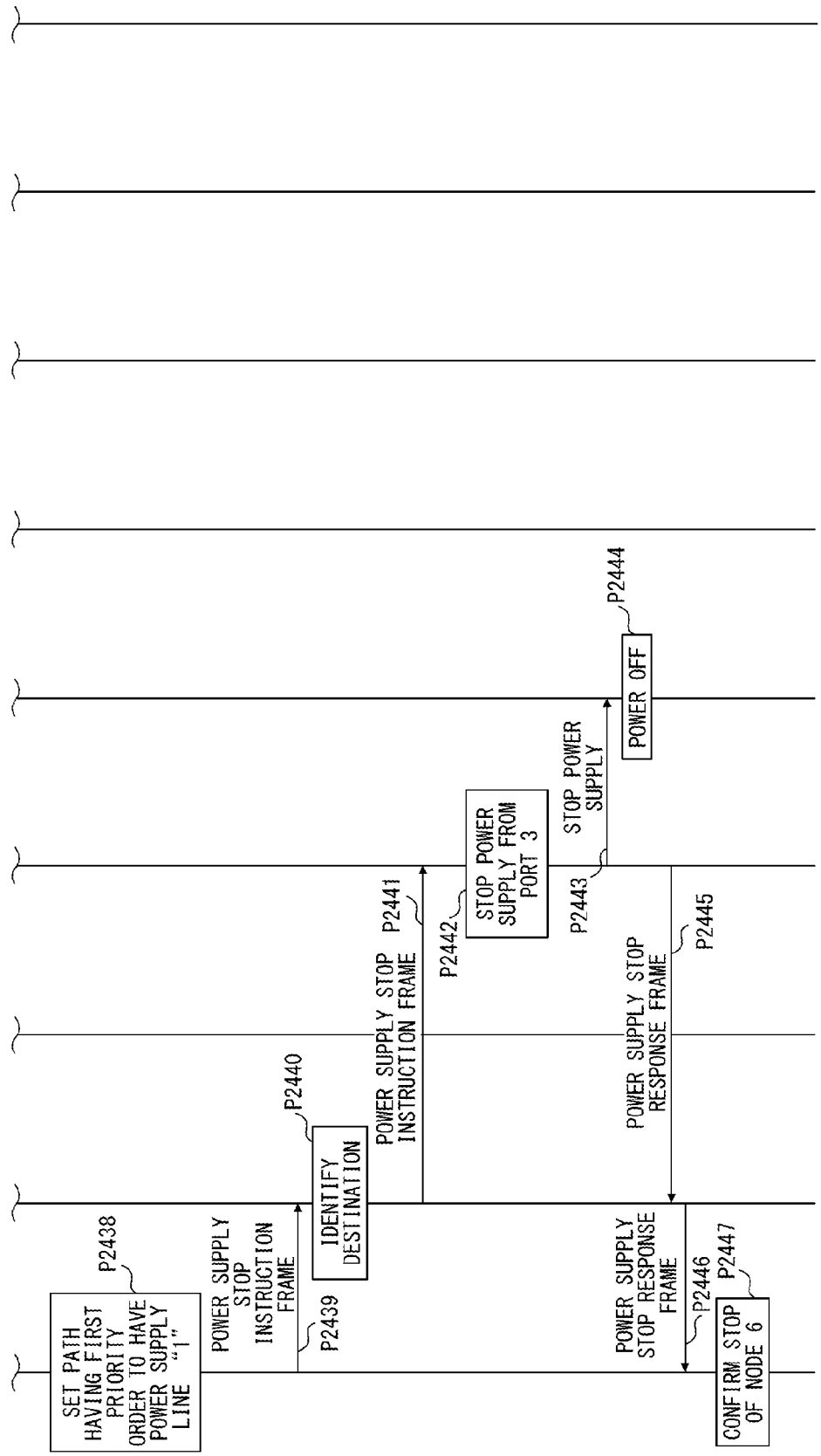

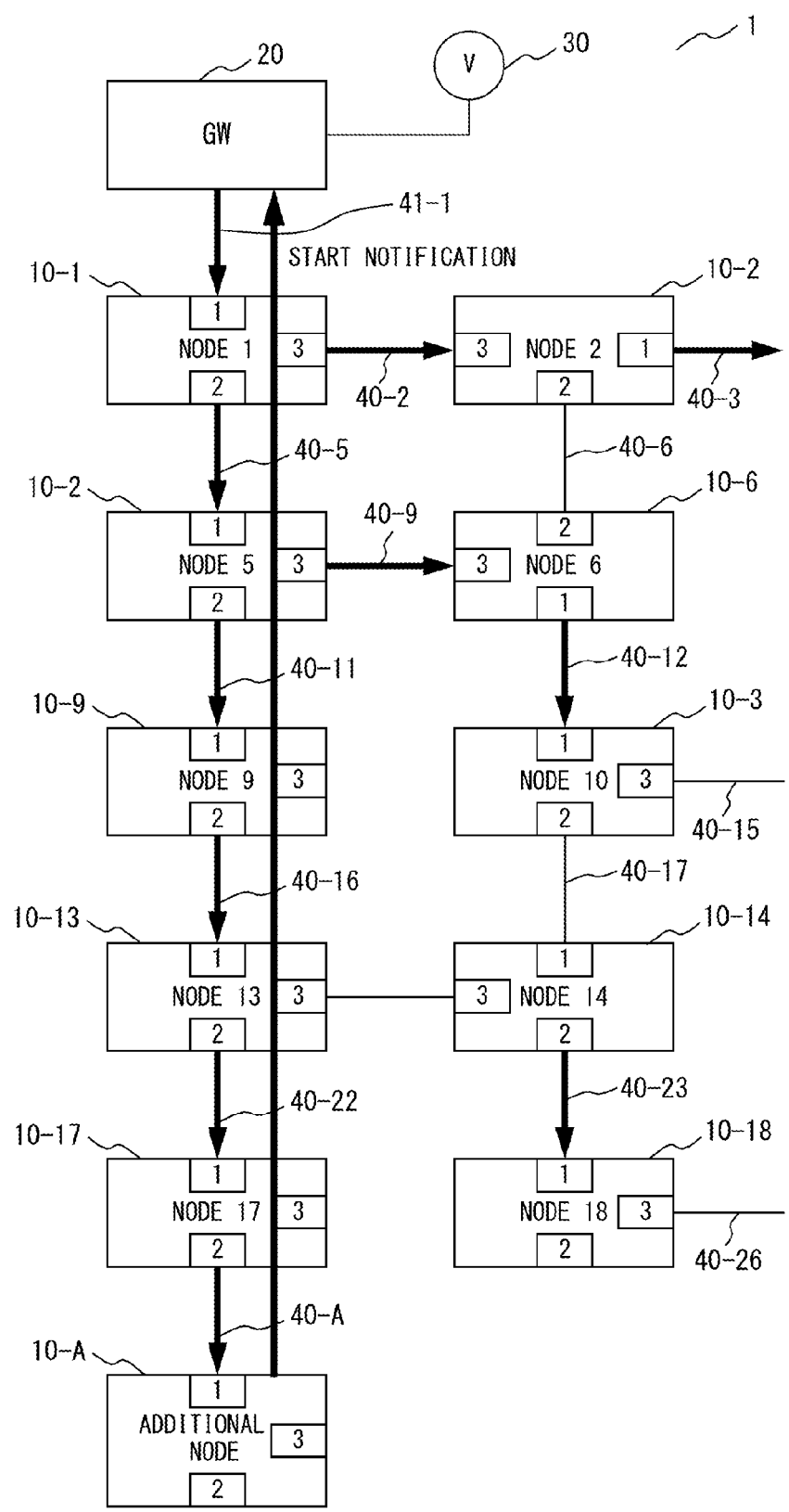
F I G. 28

POWER SUPPLY CONTROLLER, RELAY NODE DEVICE, WIRED AD-HOC NETWORK SYSTEM, AND POWER SUPPLY CONTROL METHOD

CROSS-REFERENCE TO RELATED APPLICATIONS

This application is a continuation application of International Application PCT/JP2012/058552, filed on Mar. 30, 2012 and designated the U.S., the entire contents of which are incorporated herein by reference.

FIELD

The embodiments discussed herein are related to a power supply controller, a relay node device, a wired ad-hoc network system, and a power supply control method.

BACKGROUND

In recent years, the social consciousness of the environment and energy-saving has been enhanced, and efforts have been activated for realizing optimum energy supply by monitoring the emissions of greenhouse gas, such as $CO_2$, or collecting information, such as power consumption, from time to time. In view of this, in order to accurately and immediately collecting information, such as green house gas emissions or power consumption, a technique referred to as a sensor network has been studied and developed.

A system of the sensor network includes a plurality of sensors provided in a target area, a plurality of relay node devices including a connection interface to the provided sensors, a gateway connecting the plurality of relay node devices and a server, and a server collecting data detected by the sensors.

In the sensor network system, an ad-hoc communication technology can be used. In the sensor network system using the ad-hoc communication technology, the relay node device recognizes a relay node device adjacent to the own node device and autonomously constructs a network, and monitors communication quality or a communication failure with the adjacent relay node device and autonomously selects a communication path.

A place to be detected by the sensor is, for example, a dangerous area, such as a river or a cliff, an area in soil, an area under water, or an area in a structure. When the sensor is provided in the area described above, it is difficult in some cases that a relay node connected to the sensor performs data transfer to or from an adjacent relay node device using a wireless communication system. In addition, when a relay node device is configured to be driven by a power source incorporated into the own device, the relay node device stops operating due to the life of the power source.

In order to solve the inconveniences described above, a power supply device that supplies power to each of the relay node devices is provided in the sensor network system, and a wired ad-hoc network in which adjacent relay node devices are connected by wired cables is used. On each of the wired cables connecting the adjacent relay node devices, a signal line and a feeder line may be mounted using, for example, the Power Over Ethernet (POE) technology.

When multiple sensors are provided in the wired sensor network system, the number of relay node devices connected to the sensors is also increased, and therefore it is complicated to manually start the multiple relay node devices. In addition, in the wired sensor network system, when the sensors are provided in a dangerous area, such as a river or a cliff, in soil, under water, or in a structure, it is difficult to manually start each of the plural relay node devices connected to the sensors. In view of the foregoing, the plural relay node devices are configured to be started by supplying power from a power supply device to the respective relay node devices through wired cables connecting relay node devices adjacent to each other.

However, when power needed for starting each of the relay node devices is supplied simultaneously from the power supply device, a large current from the power supply device flows at once into a root relay node device connected near the power supply device. For that reason, in the relay node devices near the root, the temporary large current from the power supply device becomes a rush current, and the relay node devices near the root are likely to not be started normally. In addition, relay node devices near a terminal that receive power supply via other relay node devices are likely to not be started normally due to voltage drop or the like.

In view of the foregoing, the power supply from the power supply device to each of the relay node devices in the wired ad-hoc network system needs to be controlled such that each of the relay node devices is normally started.

PRIOR ART DOCUMENTS

Non-Patent Document

[Non-Patent Document 1] Tadashige Iwao, et al., "Multi-purpose Practical Sensor Network: S-wire", FUJITSU.57, 3, May 2006, pp. 285-290

SUMMARY

According to an aspect of the embodiments, a power supply controller includes a first port, a second port, and a controller. The first port is connected to a power supply device. The second port is connected to a first relay node device via a wired path. The controller performs control to supply power received from the power supply device from the second port to the first relay node device. The controller performs control to generate a power-on instruction frame for instructing the first relay node device started by receiving power supply to start power supply from a port included in the first relay node device to a second relay node device connected to the first relay node device via a wired path. The controller performs control to transmit the generated power-on instruction frame from the second port.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4 4A-4H illustrate an example of a format of a frame transmitted/received in a wired ad-hoc network system according to an embodiment;

FIGS. 6A and 6B are a diagram explaining an ad-hoc frame transmitted/received in a power-on process for a relay node device 10-1;

FIGS. 7A-7I are a diagram explaining an ad-hoc frame transmitted/received in a power-on process for relay node devices 10-2 and 10-5;

FIGS. 8A-8R are a diagram explaining an ad-hoc frame transmitted/received in a power-on process for relay node devices 10-6 and 10-9;

FIGS. 12A-12H illustrate an example of the start notification frame in the transmission route illustrated in FIG. 11;

FIGS. 13A-13H illustrate an example of the start notification response frame in the transmission route illustrated in FIG. 11;

FIG. 14 illustrates an example of each of node routing management tables;

FIG. 15 illustrates an example of a GW routing management table;

FIG. 21 illustrates an example of each node routing management table after a routing change process;

FIG. 22 illustrates an example of a GW routing management table after a routing change process;

FIG. 23 is a diagram explaining a failure detection process and a routing change process according to an embodiment when a communication failure occurs;

FIGS. 24A-24D illustrate an example of a sequence of a failure detection process and a routing change process according to an embodiment when a communication failure occurs;

FIG. 28 is a diagram explaining the second example of a power supply control process according to an embodiment for an added relay node device.

DESCRIPTION OF EMBODIMENTS

The embodiments discussed herein are described in detail with reference to the drawings.

Figure 1A:
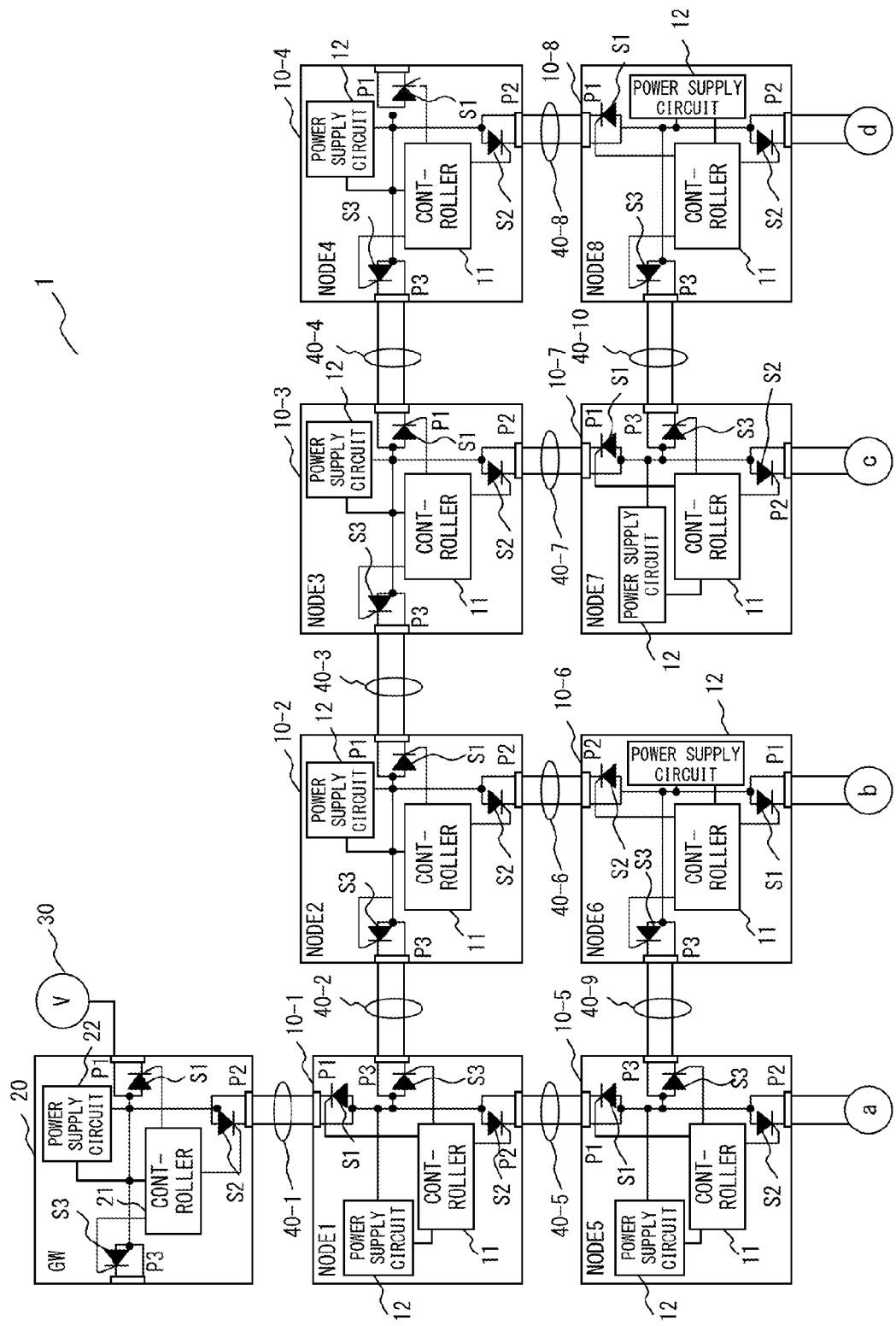
FIGS. 1A and 1B illustrate an example of a configuration of a wired ad-hoc network system according to an embodiment.
Figure 1B:
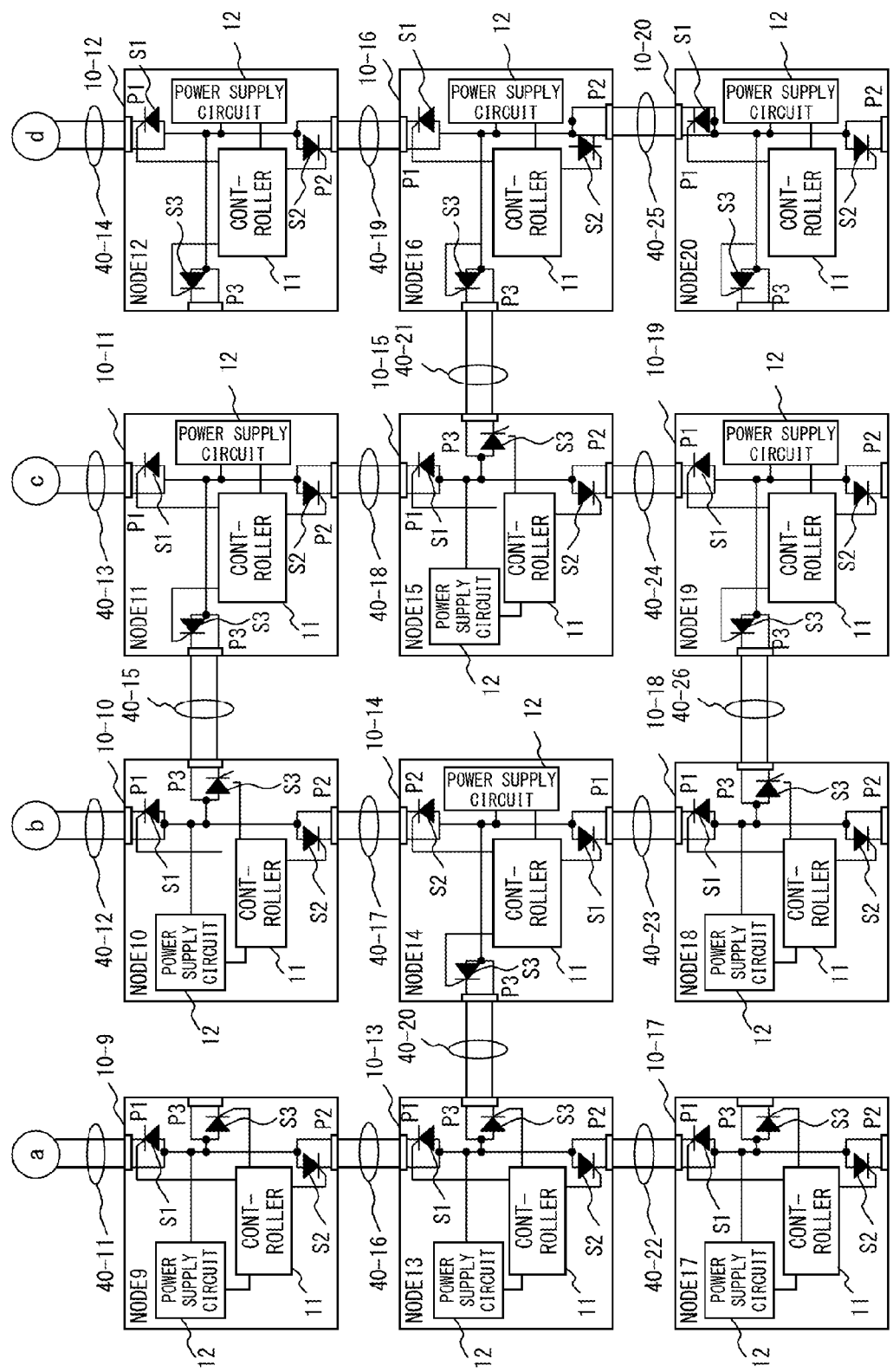

FIGS. 1A and 1B illustrate an example of a configuration of a wired ad-hoc network system according to an embodiment.

A wired ad-hoc network system 1 illustrated in FIGS. 1A and 1B includes relay node devices 10-1 to 10-20 (nodes 1-20), a gateway device (GW) 20, a power supply device 30, and paths 40-1 to 40-26. The gateway device 20 is an example of a power supply controller according to the embodiment.

In FIGS. 1A and 1B, twenty relay node devices 10 are illustrated, but the number of relay node devices 10 included in the wired ad-hoc network system 1 is not limited to twenty. In the description below, when the relay node devices 10-1 to 10-20 are not distinguished from each other, the term "relay node device 10" is used. In addition, in the description below, the relay node devices 10-1 to 10-20 are referred to as "nodes 1-20" in some cases.

The relay node device 10 includes a controller 11, a power supply circuit 12, three ports P1-P3, and three port power switches S1-S3.

The ports P1-P3 are connection interfaces with an adjacent relay node device 10 or an adjacent gateway device 20. The number of ports included in each of the relay node devices 10 illustrated in FIGS. 1A and 1B is an example, and it does not mean that the number of ports included in each of the relay node devices 10 according to the embodiment is limited to three.

The port power switches S1-S3 are switches that turn on or off power supply outputs to the ports P1-P3 in accordance with a control signal from the controller 11. The port power switches S1-S3 turn on or off the power output from the ports P1-P3, but do not limit the power input into the ports P1-P3. The port power switches S1-S3 respectively correspond to the ports P1-P3.

In FIGS. 1A and 1B, a thyristor is illustrated for each of the port power switches S1-S3, but the port power switches S1-S3 may be arbitrary switching elements, such as a Field Effect Transistor (FET). In addition, FIGS. 1A and 1B illustrate an example in a case in which a DC power is supplied to the relay node device 10, but when an AC power is supplied to the relay node device 10, the port power switches S1-S3 may be relay switches, or the like.

The controller 11 controls a route of a packet transmission from the own node device 10 to the gateway device 20. In addition, the controller 11 controls power supply to an adjacent relay node device 10 via each of the ports P1-P3 by controlling the turning on/off of each of the port power switches S1-S3.

The power supply circuit 12 is a circuit that generates an output power needed in the own node device 10 from an input power supplied from the adjacent relay node device 10 or the adjacent gateway device 20.

The relay node device 10 is connected to the adjacent gateway device 20 and the adjacent relay node devices 10 via the three ports P1-P3. In addition, the relay node device 10 is connected to a plurality of sensors (not illustrated). The sensors may be arbitrary sensors including a temperature sensor, a wind velocity sensor, an illuminance sensor, a human detection sensor, a power reading meter, an acceleration sensor, a distortion sensor, a monitor camera, and the like, and are selected in accordance with the mounting. Data obtained from the sensors is transmitted to a server (not illustrated) via the relay node device 10 and the gateway device 20.

The gateway device 20 includes a controller 21, a power supply circuit 22, three ports P1-P3, and three port power switches S1-S3.

The ports P1-P3 are connection interfaces with adjacent relay node devices 10. The number of ports included in each of the relay node devices 10 illustrated in FIGS. 1A and 1B is an example, and it does not mean that the number of ports included in the gateway device 20 according to the embodiment is limited to three.

The port power switches S1-S3 are switches that turn on or off power outputs to the ports P1-P3 in accordance with a control signal from the controller 21. The port power switches S1-S3 turn on or off the power output from the ports P1-P3, but do not limit the power input into the ports P1-P3. The port power switches S1-S3 respectively correspond to the ports P1-P3. In FIGS. 1A and 1B, a thyristor is illustrated for each of the port power switches S1-S3, but this is an example similarly to the port power switches S1-S3 of the relay node device 10 described above.

The gateway device 20 is connected to a power supply device 30 that is a power source of the own device 20 and is a power source of each of the relay node devices 10, via the port. In an example illustrated in FIGS. 1A and 1B, the gateway device 20 is connected to the power supply device 30 via the port P1.

The controller 21 controls a transmission route of a packet between each of the relay node devices 10 and the server.

In addition, the controller 21 controls power supply to the relay node device 10 via the port by controlling the turning on/off of the port power switch. In the example illustrated in FIGS. 1A and 1B, the gateway device 21 controls power supply to the relay node device 10 via the port P2 by controlling the turning on/off of the port power switch S2. In addition, the controller 21 controls power supply to the relay node device 10 by transmitting various frames including a power-on instruction frame to the relay node device 10.

The power supply circuit 22 is a circuit that generates an output power needed in the own device from an input power supplied from the power supply device 30 via the port P1.

The paths 40-1 to 40-26 are wired paths used for the data communication and the power supply between the relay node device 10 and the gateway device 20, and between adjacent relay node devices 10. The paths 40-1 to 40-26 may be cables using the POE technology, for example.

The paths 40-1 to 40-26 illustrated in FIGS. 1A and 1B are merely an example of a path connecting the relay node device 10 and the gateway device 20, and between adjacent relay node devices 10, but do not mean that a configuration of a path according to the embodiment is limited to the paths 40-1 to 40-26. In the description below, when the paths 40-1 to 40-26 are distinguished from each other, the term "path 40" is used.

Described below is an example of functional configurations of the relay node device 10 and the gateway device 20 according to the embodiment.

Figure 2:
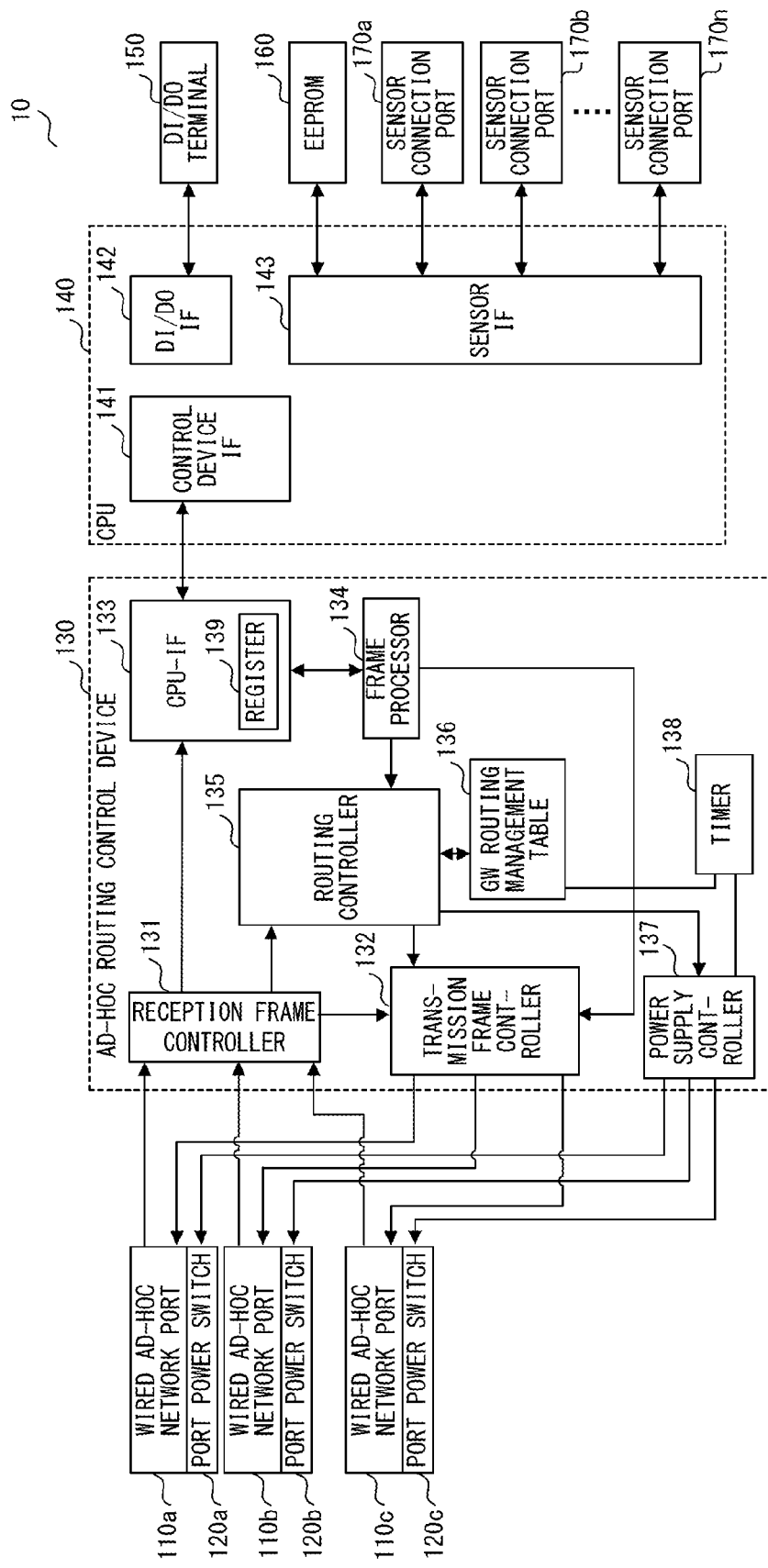
FIG. 2 illustrates a functional configuration of a relay node device according to an embodiment.

FIG. 2 illustrates a functional configuration of the relay node device according to the embodiment.

The relay node device 10 illustrated in FIG. 2 includes wired ad-hoc network ports 110 (110a-110c), port power switches 120 (120a-120c), an ad-hoc routing control device 130, and a Central Processing Unit (CPU) 140. In addition, the relay node device 10 may include a Digital Input/Digital Output (DI/DO) terminal 150, an Electrically Erasable Programmable Read Only Memory (EEPROM) 160, and sensor connection ports 170 (170a-170n).

The wired ad-hoc network port 110 terminates data of an encapsulated ad-hoc frame transmitted to/received from another relay node device 10 or the gateway device 20, and encodes or decodes the transmitted/received ad-hoc frame.

The wired ad-hoc network ports 110a-110c respectively correspond to the ports P1-P3 of the relay node device 10 illustrated in FIGS. 1A and 1B. The number of wired ad-hoc network ports 110 included in the relay node device 10 is arbitrary, but in the description below, a case in which three ports, i.e., ports P1, P2, and P3, are included is described as an example.

The wired ad-hoc network port 110 may include a buffer memory that temporarily stores a transmission frame.

The port power switches 120a-120c respectively correspond to the port power switches S1-S3 of the relay node device 10 illustrated in FIGS. 1A and 1B. The port power switch 120 is a switch that turns on or off a power output to the wired ad-hoc network port 110.

The ad-hoc routing control device 130 corresponds to the controller 11 of the relay node device 10 illustrated in FIGS. 1A and 1B. The ad-hoc routing control device 130 is realized by, for example, a Field Programmable Gate Array (FPGA) or a Static Random Access Memory (SRAM).

The ad-hoc routing control device 130 includes a reception frame controller 131, a transmission frame controller 132, a CPU interface 133, a frame processor 134, a routing controller 135, a GW routing management table 136, a power supply controller 137, and a timer 138. The CPU interface 133 includes a register 139.

The reception frame controller 131 receives frame data from the wired ad-hoc network port 110. The reception frame controller 131 outputs a frame addressed to another relay node device 10, to the routing controller 135. In addition, the reception frame controller 131 outputs a frame addressed to the own node device 10 to the CPU interface 133.

The CPU interface 133 outputs a frame input from the reception frame controller 131, to the CPU 140. The CPU interface 133 appropriately uses the register 139 at the time of the output to the CPU 140.

The routing controller 135 performs a routing process of the packet transmission using the GW routing management table 136. The GW routing management table 136 is a table for managing a route from the own node device 10 to the gateway device 20. As described below in detail, data in the GW routing management table 136 is stored in a power-on process according to the embodiment performed on each of the relay node devices 10 in the wired ad-hoc network system 1. In addition, the data in the GW routing management table 136 is changed in a routing change process according to the embodiment.

The frame processor 134 generates a frame including data that the CPU interface 133 has obtained from the CPU 140, and outputs the frame to the rouging controller 135 and the transmission frame controller 132.

The transmission frame controller 132 outputs a frame input from the routing controller 135 or the frame processor 135, to the wired ad-hoc network port 110 in accordance with a destination.

The power supply controller 137 controls the turning on/off of the port power switch 120, and controls the power supply to an adjacent relay node device 10 via the wired ad-hoc network port 110.

The CPU 140 processes data obtained from a sensor (not illustrated) provided in the relay node device 10. The CPU 140 includes a control device interface 141, a DI/DO interface 142, and a sensor interface 143.

The control device interface 141 transmits/receives sensor data, sensor control data, and the like, to/from the CPU interface 133. The sensor interface 143 transmits/receives data to/from the sensor via the sensor connection port 170. The sensor interface 143 is also connected to the EEPROM 160. The EEPROM 160 appropriately stores various pieces of sensor data and sensor control data. The DI/DO interface 142 is connected to the DI/DO terminal 150. The DI/DO terminal 150 operates as a data input terminal and a data output terminal.

Figure 3:
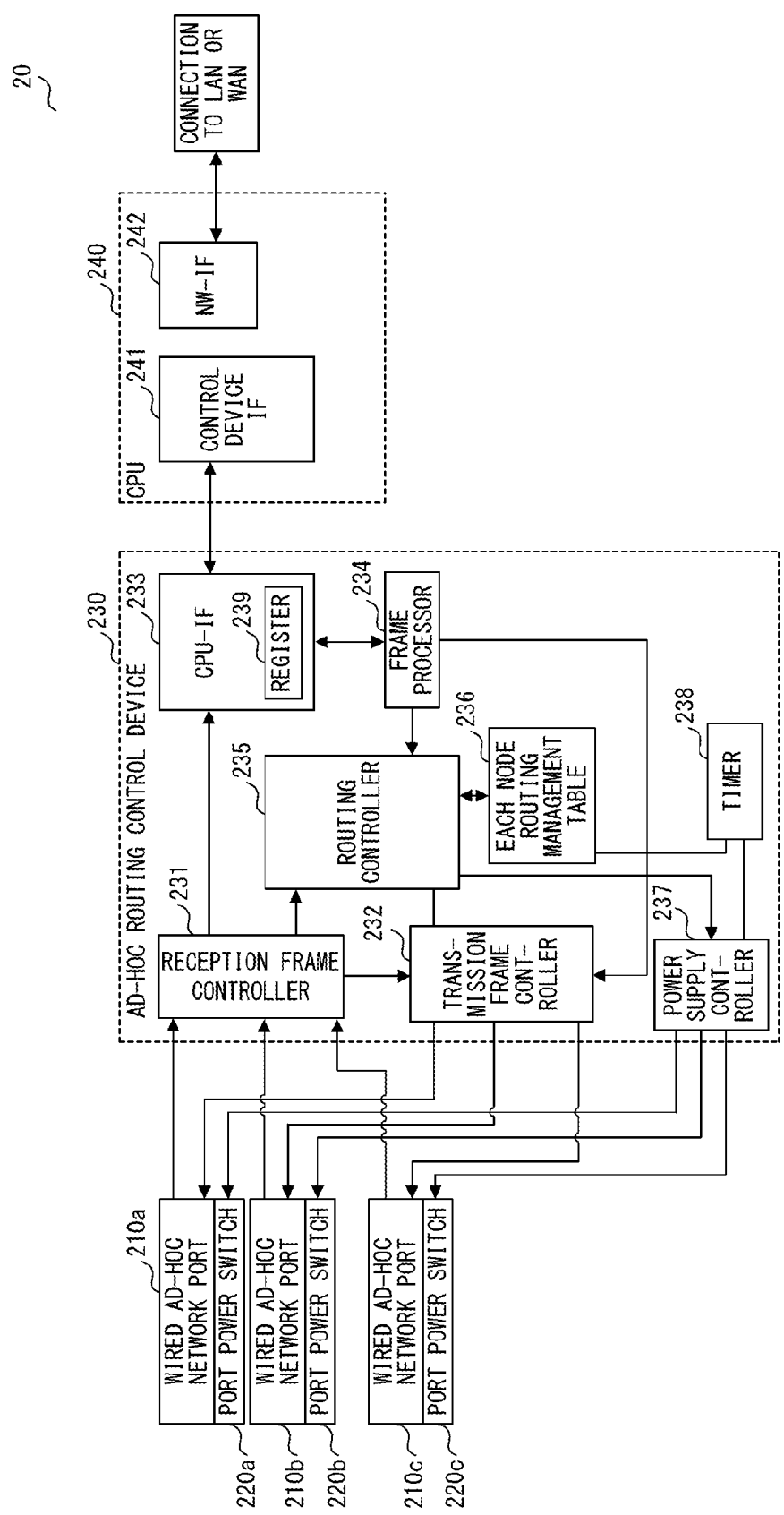
FIG. 3 illustrates a functional configuration of a gateway device according to an embodiment.

FIG. 3 illustrates a functional configuration of the gateway device according to the embodiment.

The gateway device 20 illustrated in FIG. 3 includes wired ad-hoc network ports 210 (210a-210c), port power switches 220 (220a-220c), an ad-hoc routing control device 230, and a CPU 240.

The ad-hoc network port 210 terminates data of an encapsulated ad-hoc frame transmitted to/received from another relay node device 10, and encodes or decodes the transmitted/received ad-hoc frame.

The ad-hoc network ports 210 respectively correspond to the ports P1-P3 illustrated in FIG. 1A. The number of wired ad-hoc network ports 210 provided in the gateway device 20 is arbitrary, but a case in which three ports, i.e., ports P1, P2, and P3, are provided is described as an example.

The wired ad-hoc network port 210 may include a buffer memory that temporarily stores a transmission frame.

The port power switches 220a-220c respectively correspond to the port power switches S1-S3 of the gateway device 20 illustrated in FIG. 1A. The port power switch 220 is a switch that turns on or off a power output to the wired ad-hoc network port 210.

The ad-hoc routing control device 230 corresponds to the controller 21 of the gateway device 20 illustrated in FIG. 1A. The ad-hoc routing control device 230 is realized by, for example, a Field Programmable Gate Array (FPGA) or a Static Random Access Memory (SRAM).

The ad-hoc routing control device 230 includes a reception frame controller 231, a transmission frame controller 232, a CPU interface 233, a frame processor 234, a routing controller 235, each of node routing management tables 236, a power supply controller 237, and a timer 238. The CPU interface 233 includes a register 239.

The reception frame controller 231 receives frame data from the wired ad-hoc network port 210. The reception frame controller 231 outputs a frame addressed to each of the relay node devices 10, to the routing controller 235. In addition, the reception frame controller 231 outputs a frame addressed to the own node device 20, to the CPU interface 233.

The CPU interface 233 outputs a frame input from the reception frame controller 231, to the CPU 240. The CPU interface 233 appropriately uses the register 239 in the output to the CPU 240.

The routing controller 235 performs a routing process of the packet transmission using each of the node routing management tables 236. Each of the node routing management tables 236 is a table for managing a route from the own device 20 to each of the relay node devices 10. Data in each of the node routing management tables 236 is stored in a power-on process according to the embodiment performed on each of the relay node devices 10 in the wired ad-hoc network system 1, as described below in detail. In addition, the data in each of the node routing management tables 236 is changed in a routing change process according to the embodiment.

The frame processor 234 generates a frame including data that the CPU interface 233 has obtained from the CPU 240, and outputs the frame to the routing controller 235 and the transmission frame controller 232.

The transmission frame controller 232 outputs a frame input from the routing controller 236 or the frame processor 235, to the wired ad-hoc network port 210 in accordance with a destination.

The power supply controller 237 controls the turning on and off of the port power switch 220, and controls the power supply to the relay node device 10 via the wired ad-hoc network port 210.

The CPU 240 processes data obtained from a server (not illustrated) via a Local Area Network (LAN) or a Wide Area network (WAN). The CPU 240 includes a control device interface 241 and a network (NW) interface 142.

The control device interface 241 transits/receives a packet addressed to the server, each of the relay node devices 10, or the like, to/from the CPU interface 233. The network interface 242 is connected to the server via the LAN or the WAN.

In the embodiment, the gateway device 20 controls the power supply from the power supply device 30 connected to the gateway device 20 to each of the relay node devices 10. The gateway device 20 is an example of the power supply controller according to the embodiment.

Before a power supply control method according to the embodiment is described, an example of a format of a frame transmitted/received in the wired ad-hoc network system according to the embodiment is described.

FIGS. 4A-4H illustrate an example of a format of a frame transmitted/received in the wired ad-hoc network system according to the embodiment.

FIGS. 4A-4H illustrate a general-purpose command frame, a start notification frame, a start notification response frame, a health frame, a health frame request frame, a power-on instruction frame, a power supply stop instruction frame, an alternative route notification frame, and a state change notification frame.

The start notification frame illustrated in FIG. 4B is an ad-hoc frame for notifying the gateway device 20 of the start of the own node device 10. The start notification response frame illustrated in FIG. 4C is an ad-hoc frame by which the gateway device 20 notifies the relay node device 10 that has transmitted the start notification frame of a response to the start notification.

The health frame request frame illustrated in FIG. 4D is an ad-hoc frame for requesting, to an adjacent relay node device 10, a notification (health frame) for notifying whether the adjacent relay node device 10 is normally operating. In addition, the health frame illustrated in FIG. 4D is an ad-hoc frame for notifying an adjacent device which has transmitted the health frame request frame that the own node device 10 is normally operating, in response to the health frame request frame. As illustrated in FIG. 4D, the health frame request frame and the health frame may be in the same frame format.

The power-on instruction frame illustrated in FIG. 4E is an ad-hoc frame by which the gateway device 20 instructs a destination relay node device 10 to supply power to an adjacent relay node device 10 via a port. The power supply stop instruction frame illustrated in FIG. 4F is an ad-hoc frame by which the gateway device 20 instructs the destination relay node device 10 to stop power supply to the adjacent relay node device 10 via the port.

The alternative route notification frame illustrated in FIG. 4G is an ad-hoc frame by which the gateway device 20 notifies a destination rely node device 10 of an alternative route used when a failure occurs in a power supply line and/or a path being used as a transmission route of a frame.

The state change notification frame illustrated in FIG. 4H is an ad-hoc frame for notifying the gateway device 20 of a failure occurrence or a failure recovery in the communication and/or power supply between an own node device and an adjacent relay node device 10.

The general-purpose command frame illustrated in FIG. 4A is an ad-hoc frame for a command other than commands of the various ad-hoc frames described above.

All types of ad-hoc frame illustrated in FIGS. 4A-4H include a frame header portion and a data portion.

The frame header portion of each of the various ad-hoc frames includes a network identification data (ID) field, a destination node ID field, a transmission source node ID field, and a Length field.

In the network ID field, data is set that indicates a transmission route of a frame from a transmission source device to a destination device. In the destination node ID field, a MAC address of 6 bytes is set that is assigned to a destination of a frame. In the transmission source node ID field, a MAC address of 6 bytes is set that is assigned to a destination source device. In the Length field, a value of 2 bytes is set that indicates a length of data in a frame.

The data portion of each of the various ad-hoc frames includes a KIND field, the number of HOPs field, a data field, and a Frame Check Sequence (FCS) field.

In the KIND field, data of 2 bytes is set that indicates the type of ad-hoc frame. In the number of HOPs field, data of 2 bytes is set that indicates the number of hops until an ad-hoc frame reaches a destination device. In the data field, variable length data of 46-1500 bytes is set. FCS is a checksum code used for detecting and correcting a failure in a frame.

The start notification frame includes a transmission/reception port number field and a power supply line flag field in the data portion, in addition to the fields common to the various ad-hoc frames described above.

In the transmission/reception port number field, pieces of data are set that respectively indicate a transmission port number and a reception port number of a relay node device 10 transmitting/receiving a frame before the frame reaches the gateway device 20 that is a destination of the frame. In the transmission/reception port number field, a pair of data indicating a port number of a relay node device that transmits a start notification frame and data indicating a port number of a relay node device 10 that receives the start notification frame is set. In the description below, the transmission port and the reception port are collectively referred to as a "transmission/reception port" in some cases.

In the power supply line flag field, data is set that indicates whether an adjacent relay node device 10 has been started by the power supply via a port and a power supply line to the adjacent relay node device 10 has been established.

The start notification response frame and the alternative route notification frame include a Gateway (GW) network ID field in the data portion, in addition to the fields common to the various ad-hoc frames described above.

In the GW network ID field, data is set that indicates a transmission route of a frame from a transmission source relay node device 10 to the gateway device 20.

The power-on instruction frame includes a power-on port number field in the data portion, in addition to the fields common to the various ad-hoc frames described above. In the power-on port number field, data is set that indicates port numbers of one or more transmission ports for supplying power to an adjacent relay node.

The power supply stop instruction frame includes a power supply stop port number field in the data portion, in addition to the fields common to the various ad-hoc frames described above. In the power supply stop port number field, data is set that indicates port numbers of one or more transmission ports for stopping power supply to an adjacent relay node.

The state change notification frame includes the number of increased/decreased ports field, one or more increased/decreased flag fields, and an increased/decreased port connection destination node ID field of the same number as the number of increased/decreased flag fields.

In the number of increased/decreased ports field, data is set that indicates the number of transmission ports of an own node device in which a state change occurs due to a failure occurrence or a failure recovery between the own relay node device 10 and an adjacent relay node device 10. In the increased/decreased flag field, data is set that indicates that the number of connectable transmission ports is decreased due to the failure occurrence or that the number of connectable transmission ports is increased due to the failure recovery. In the increased/decreased flag field, data is set that indicates the number of an unconnectable transmission port due to the failure occurrence or the number of a connectable transmission port due to the failure recovery. In the increased/decreased port connection destination node ID field, an ID of an adjacent relay node device that becomes unconnectable via a transmission port due to the failure occurrence, or an ID of an adjacent relay node device that becomes connectable via a transmission port due to the failure recovery.

Described below is an example of a power supply control method in the wired ad-hoc network system according to the embodiment. Processes described below with reference to the drawings are not necessarily performed time-serially, but include processes that may be performed in parallel or individually. In addition, it does not mean that it is impossible to add processes other than the processes described below with reference to the drawings.

The power supply control process according to the embodiment includes a power-on process, a power supply line switching process, a failure detection process, a recovery detection process, a routing change process, and a rely node device addition process.

<Power-on Process>

As one aspect of the power supply control process according to the embodiment, the power-on process according to the embodiment is first described with reference to FIGS. 1A-1B and FIGS. 5A-5B to FIGS. 8A-8R.

Figure 5A:
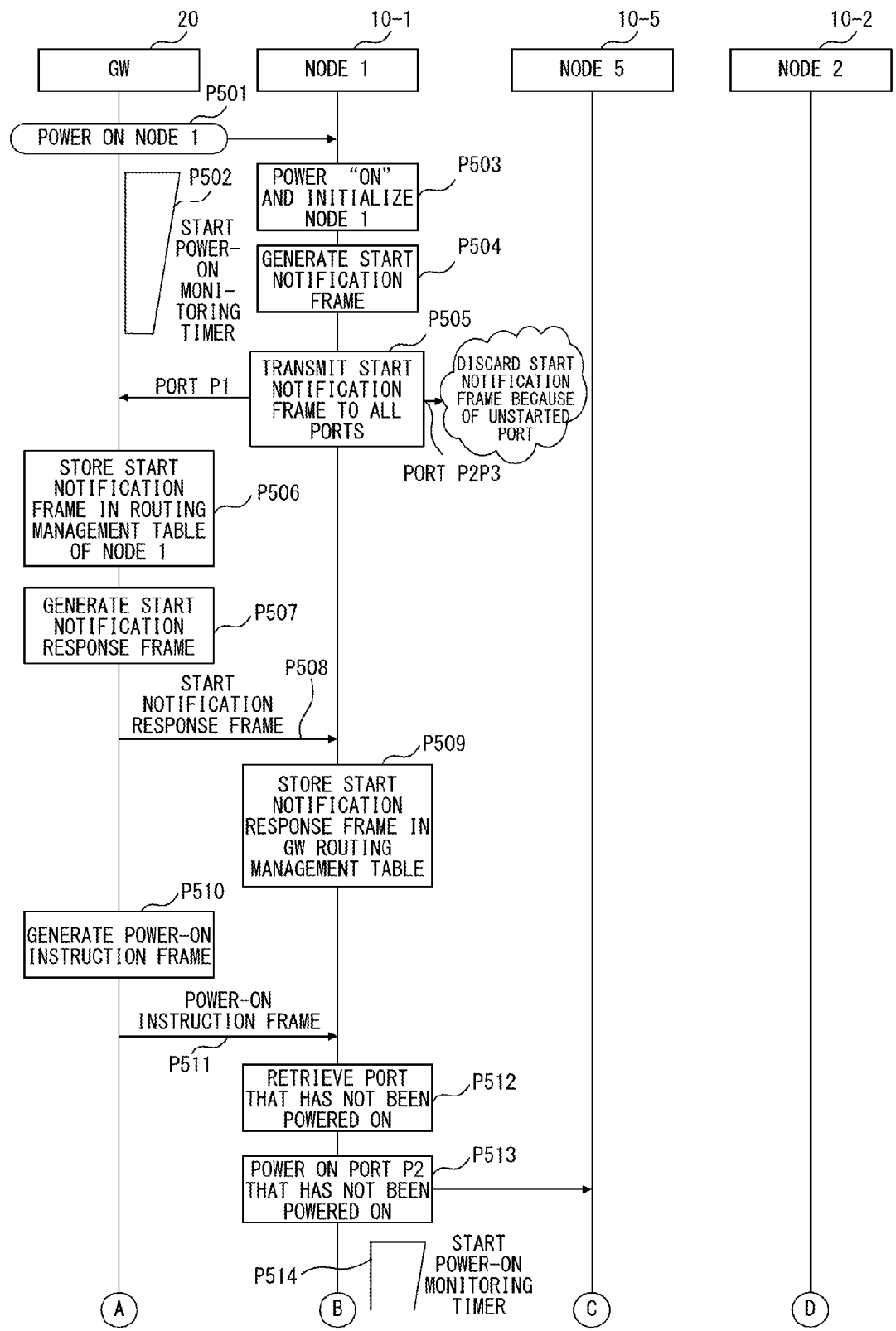
FIGS. 5A and 5B illustrate an example of a process sequence from starting a power-on process for a relay node device 10-1 to starting a power-on process for a relay node device 10-5.
Figure 5B:
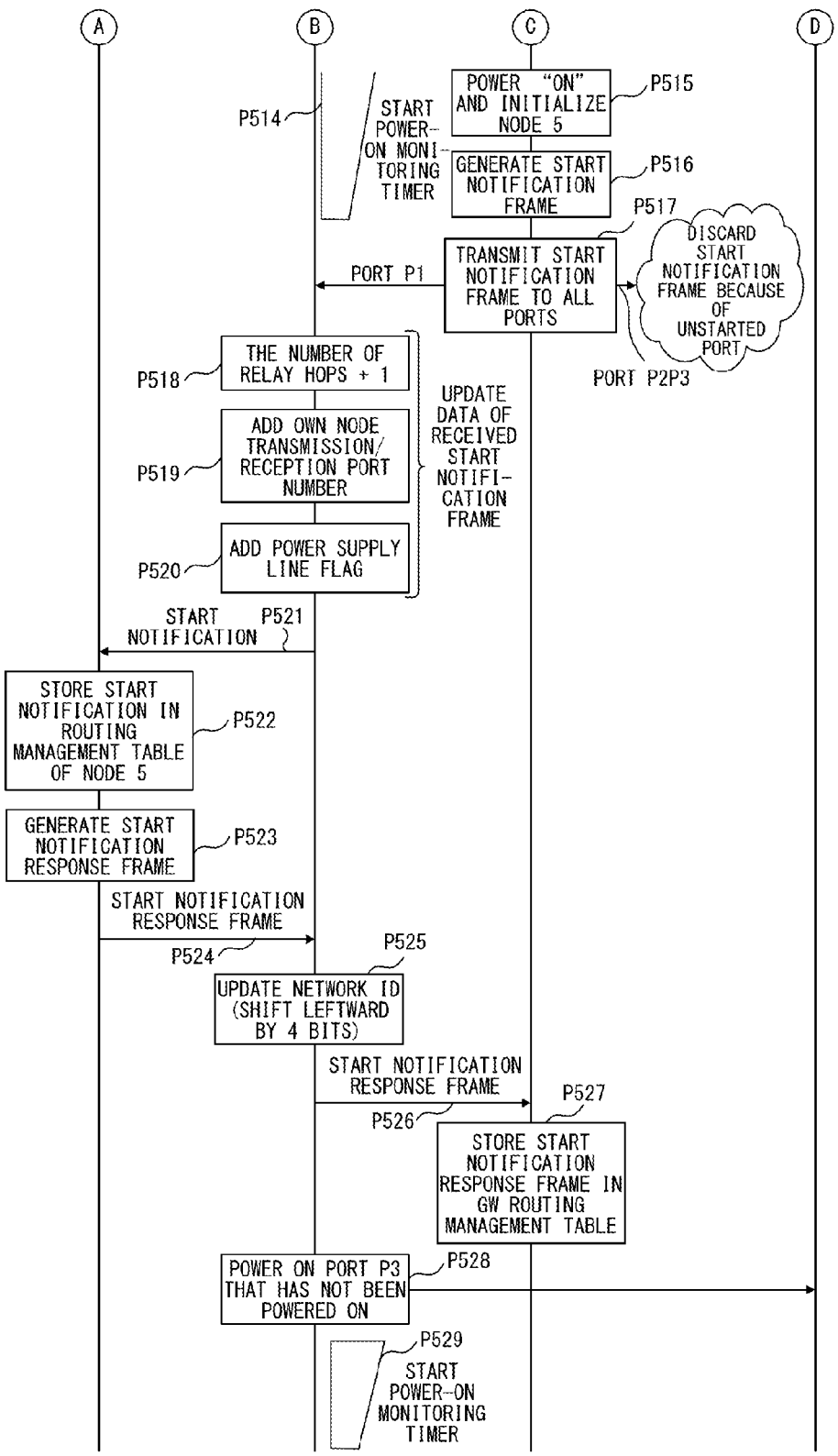

FIG. 5A and FIG. 5B illustrate an example of a process sequence from staring a power-on process for a relay node device 10-1 to starting a power-on process for a relay node device 10-5. FIGS. 6A and 6B are a diagram explaining ad-hoc frames that are transmitted/received in the power-on process for the relay node device 10-1. FIGS. 7A-7I are diagrams explaining ad-hoc frames that are transmitted/received in a power-on process for relay node devices 10-2 and 10-5. FIGS. 8A-8R are diagrams explaining ad-hoc frames that are transmitted/received in a power-on process for relay node devices 10-6 and 10-9. In order to simplify the description, in FIGS. 6A-6B to FIGS. 8A-8R, some fields in the ad-hoc frames illustrated in FIGS. 4A-4H are not illustrated.

First, the gateway device 20, which has been started by the reception of the power supply from the power supply device 30, starts a power-on process for the relay node device 10-1.

Namely, the power supply controller 237 of the gateway device 20 starts power supply to the relay node device 10-1 (node 1) via the port P2 (p501) along with starting the timer 238 (p502). If a start notification frame is not received from the relay node device 10-1 when a prescribed time passes after starting the timer 238, the power supply controller 237 stops the power supply to the relay node device 10-1 via the port P2, and performs the power-on process for another relay node device 10.

The relay node device 10-1 receives power supply from the gateway device 20 via the port P1, and is started (p503). The routing controller 135 of the relay node device 10-1 generates a start notification frame (p504), and the transmission frame controller 132 performs control to transmit the generated start notification frame from all of the ports P1-P3 (p505). An example of the generated and transmitted start notification frame is illustrated in FIG. 6A.

In the start notification frames illustrated in FIG. 6A, "000000000000" set in a network ID field indicates that an ID is not assigned. In addition, "000000000000" set in a destination node ID field indicates a broadcast address. In a transmission source node ID field, an ID of the relay node device 10-1 that is a transmission source of the start notification frame is set. In a KIND field, data indicating that the frame is a start notification frame is set. In a number of HOPs field, "1" that is the number of hops to an adjacent device is set. In a transmission/reception port number field, each of "1" to "3" indicating the numbers of the ports P1-P3 from which the start notification frames are to be transmitted is set for a first digit (left-most one bit). For the following one digit, "0" is set that indicates that a port from which the start notification frame is to be received does not exist in the own node device 10-1. For the other digits, "0" is set that indicates that no transmission/reception ports exist. In a power supply line field, "0" is set that indicates that power supply lines to the adjacent relay node devices 10-2 and 10-5 are not established.

When the relay node device 10-1 transmits the start notification frames illustrated in FIG. 6A, the adjacent relay node devices 10-2 and 10-5 have not been started. Therefore, the start notification frame transmitted from the port P3 of the relay node device 10-1 to the relay node device 10-2 is discarded. In addition, the start notification frame transmitted from the port P2 of the relay node device 10-1 to the relay node device 10-5 is discarded. In FIG. 6A, the start notification frames transmitted from the port P2 and the port P3 that are indicated by strikethrough indicate that these frames are discarded.

The gateway device 20 receives the start notification frame transmitted from the port P1 of the relay node device 10-1 (FIG. 6A) via the port P2 of the own device 20. The gateway device 20 refers to the transmission source node ID field of the start notification frame, and thereby determines that the relay node device 10-1 has been started by the power supply from the port P2 of the own device. The gateway device 20 refers to the transmission/reception port number field of the received start notification frame, and thereby determines that the relay node device 10-1 has transmitted the start notification frame from the port P1. The gateway device 20 refers to the number of HOPs field of the received start notification frame, and thereby determines that the number of hops from the relay node device 10-1 to the own device 20 is 1.

The routing controller 235 of the gateway device 20 refers to the start notification frame received from the relay node device 10-1, and stores an ID and the number of hops of the relay node device 10-1 in a routing management table 236 for the relay node device 10-1. In addition, the routing controller 235 refers to the transmission/reception port number field of the received start notification frame, and generates a network ID to the relay node device 10-1. Then, the routing controller 235 stores the generated network ID in the rouging management table 236, and sets a power supply line flag indicating that a power supply line has been established in a route indicated by the generated network ID (p506).

The routing controller 235 generates a start notification response frame (p507). Then, the transmission frame controller 232 performs control to transmit the generated start notification response frame to the relay node device 10-1 via the port P2 (p508). An example of the generated and transmitted start notification frame is illustrated in FIG. 6B.

As illustrated in FIG. 6B, in a network ID field of the start notification response frame, "0FFFFFFFFFFF" is set as a network ID. "0" that is the first digit (left-most one bit) in the network ID "0FFFFFFFFFFF" indicates that a transmission port of the relay node device 10-1 which has received the start notification response frame does not exist. Namely, when the network ID is "0FFFFFFFFFFF", a device to which the frame is transferred next is a destination device of the frame.

As illustrated in FIG. 6B, in a destination node ID field, an ID of the relay node device 10-1 that is a destination of the start notification response frame is set. In a transmission source node ID field, an ID of the gateway device 20 that is a transmission source of the start notification response frame is set. In a KIND field, data indicating that the frame is a start notification frame is set. In a number of HOPs field, "1" that is the number of hops from the gateway device 20 to the relay node device 10-1 is set.

As illustrated in FIG. 6B, in a GW network ID field of the start notification response frame, "1FFFFFFFFFFF" is set as a GW network ID. "1" that is the first digit in the GW network ID "1FFFFFFFFFFF" indicates the number of the transmission port P1 of the relay node device 10-1 at the time of transmitting a frame to the gateway device 20.

The relay node device 10-1 receives the start notification response frame illustrated in FIG. 6B via the port P1. The relay node device 10-1 refers to the number of HOPs field of the received start notification response frame, and thereby determines that the number of hops from the own node device to the gateway device 20 is 1. In addition, the relay node device 10-1 refers to the GW network ID field of the received start notification response frame, and thereby determines that the GW network ID from the own node device to the gateway device 20 is "1FFFFFFFFFFF". Namely, the relay node device 10-1 determines that a transmission port of the own node device at the time of transmitting a frame to the gateway device 20 is the port P1.

The routing controller 135 of the relay node device 10-1 refers to the start notification response frame received from the gateway device 20, and stores the GW network ID and the number of hops in the GW routing management table 136 (p509).

As a result of the power-on process for the relay node device 10-1 as described above, a path 40-1 is established as a power supply line. When the path 40-1 is established as the power supply line, the gateway device 20 proceeds to a power-on process for the relay node device 10-2 (node 2) and the relay node device 10-5 (node 5) which are adjacent to the relay node device 10-1.

First, the routing controller 235 of the gateway device 20 generates a power-on instruction frame for the relay node device 10-1 (p510). The transmission frame controller 232 performs control to transmit the generated power-on instruction frame from the port P2 (p511). An example of the power-on instruction frame is illustrated in FIG. 7A.

In the power-on instruction frame illustrated in FIG. 7A, "FFFFFFFFFFFF" set in a network ID field indicates that an initial value of a network ID is set. In a destination node ID field, an ID of the relay node device 10-1 that is a destination of the power-on instruction frame is set. In a transmission source node ID field, an ID of the gateway device 20 that is a transmission source of the power-on instruction frame is set. In a KIND field, data indicating the power-on instruction frame is set. In a number of HOPs field, "1" that is the number of hops from the gateway device 20 to the relay node device 10-1 is set. In a power-on port number field, a power-on specified value indicating all ports other than ports that receive power supply is set.

The relay node device 10-1 receives a power-on instruction frame transmitted from the gateway device 20, via the port P1. The power supply controller 137 of the relay node device 10-1 retrieves ports of the own node device which are not supplying power except for the port P1 that is receiving power supply (p512).

The relay node device 10-1 starts power supply to adjacent relay node devices via all of the retrieved ports that are not supplying power. The relay node device 10 may simultaneously start power supply to adjacent plural relay node devices 10. However, in order to suppress a rush current to the relay node device 10 to which the power supply is started, the power supply to the adjacent relay node devices 10 may be started sequentially. Described below is an example in which the relay node device 10 sequentially starts power supply to the adjacent relay node devices 10 in descending order of a port number.

The power supply controller 137 of the relay node device 10-1 controls a port power switch S2 to be in an on state so as to start power supply to the relay node device 10-5 via the port P2 (p513), along with starting the timer 138 (p514). If a start notification frame is not received from the relay node device 10-5 when a prescribed time passes after starting the timer 138, the power supply controller 137 stops the power supply to the relay node device 10-5, and performs a power-on process for another relay node device 10.

The relay node device 10-5 is started by the reception of the power supply from the relay node device 10-1, via the port P1 of the own node device (p515). The routing controller 135 of the relay node device 10-5 generates a start notification frame (p516). The transmission frame controller 132 performs control to transmit the generated start notification frame from all of the ports P1-P3 (p517). An example of the generated and transmitted start notification frame is illustrated in FIG. 7B.

In the start notification frames illustrated in FIG. 7B, in a network ID field and a destination node ID field, "000000000000" is set. In a transmission source ID field, an ID of the relay node device 10-5 is set. In a KIND field, data indicating that the frame is a start notification frame is set. In a number of HOPs field, "1" is set that indicates the number of hops to an adjacent device. For the first digit in a transmission/reception port number field, each of "1" to "3" indicating the numbers of the ports P1-P3 from which the start notification frames are to be transmitted is set. In addition, for the following one digit, "0" is set that indicates that there are no reception ports. For the other digits, "0" is set that indicates that there are no transmission/reception ports. In a power supply line flag filed, "0" is set that indicates that power supply lines to adjacent relay node devices 10-6 and 10-9 has not been established.

When the relay node device 10-5 transmits the start notification frames (FIG. 7B), the adjacent relay node devices 10-5 and 10-9 have not been started. Therefore, the start notification frame transmitted from the port P2 of the relay node device 10-5 to the relay node device 10-9 is discarded. In addition, the start notification frame transmitted from the port P3 of the relay node device 10-5 to the relay node device 10-6 is discarded. In FIG. 7B, the start notification frames transmitted from the port P2 and the port P3 that are indicated by strikethrough indicate that these frames are discarded.

The relay node device 10-1 receives the start notification frame transmitted from the port P1 of the relay node device 10-5, via the port P2 of the own node device. The relay node device 10-1 refers to the transmission source node ID field of the start notification frame, and thereby determines that the start notification frame is transmitted from the relay node device 10-5 and that the relay node device 10-5 has been started by the power supply form the port P2 of the own node device. In addition, the relay node device 10-1 refers to the transmission/reception port number filed of the start notification frame, and thereby determines that a transmission port of the relay node device 10-5 which has transmitted the start notification frame is the port P1.

The routing controller 135 of the relay node device 10-1 increments the number of hops that is indicated by the start notification frame received from the relay node device 10-5 by 1 (p518), and adds data indicating a transmission/reception port number of the own node device in the start notification frame (p519). In addition, the routing controller 135 sets the power supply line flag to "1" indicating that an adjacent node device has been started by the power supply via a port of the own node device (p520). Then, the relay node device 10-1 transfers the start notification frame to the gateway device 20 that is a transmission source of the power-on instruction frame (p521). FIG. 7C illustrates an example of the start notification frame transmitted by the relay node device 10-1.

As illustrated in FIG. 7C, the routing controller 135 of the relay node device 10-1 increments the number of hops in the number of HOPs field of the received start notification frame (FIG. 7B) by 1, and sets "2". In addition, the routing controller 135 shifts each of a transmission port number and a reception port number which are written in the transmission/reception port number field backward (rightward) by two digits. Then, the routing controller 135 sets the first digit to the transmission port number "1" of the relay node device 10-1, and sets the following digit to the reception port number "2". The routing controller 135 sets, in the power supply line flag field of the start notification frame, "1" that indicates that a start notification frame has been received from the port P2 via which the power-on process has been performed, namely, that the adjacent relay node device 10-5 has been started.

The gateway device 20 receives the start notification frame (FIG. 7C) transmitted from the relay node device 10-1, via the port P2. The gateway device 20 refers to the transmission source node ID field and the power supply line flag of the received start notification frame, and thereby determines that the relay node device 10-5 has been started by the power supply along a route indicated by the start notification frame. The gateway device 20 refers to the transmission/reception port number field, and thereby recognizes transmission/reception ports of devices until the start notification frame is received by the own device 20 after the start notification frame is transmitted from the relay node device 10-5. The gateway device 20 refers to the number of HOPs field, and thereby recognizes the number of hops from the gateway device 20 to the relay node device 10-5.

The routing controller 235 of the gateway device 20 refers to the start notification frame received from the relay node device 10-1, and stores an ID and the number of hops of the relay node device 10-5 in a routing management table 236 for the relay node device 10-5. In addition, the routing controller 235 refers to the transmission/reception port number field of the received start notification frame, and generates a network ID to the relay node device 10-5. Then, the routing controller 235 stores the generated network ID in the routing management table 236, and sets a power supply line flag indicating that a power supply line has been established along a route indicated by the generated network ID (p522).

The routing controller 235 of the gateway device 20 generates a start notification response frame addressed to the relay node device 10-5 (p523). Then, the transmission frame controller 232 performs control to transmit the generated start notification response frame to the relay node device 10-1 via the port P2 (p524). An example of the generated and transmitted start notification response frame is illustrated in FIG. 7D.

As illustrated in FIG. 7D, the routing controller 235 sets a network ID field of the start notification response frame such that the start notification response frame passes through the same route as a transmission route of the start notification frame and reaches a destination relay node device 10. In the start notification response frame illustrated in FIG. 7D, the routing controller 235 retrieves the reception port numbers "0" and "2" that have been sequentially set in the transmission/reception port number field of the start notification frame (FIG. 7C). The retrieved reception port numbers correspond to transmission port numbers of devices that the start notification response frame passes through. Therefore, the routing controller 235 inserts the retrieved reception port numbers as transmission port numbers of the start notification response frame sequentially from the first digit in a network ID field of the start notification response frame in an order reverse to the order set in the start notification frame. "20" in the network ID "20FFFFFFFFFF" illustrated in FIG. 7D corresponds to reception port numbers in an order reverse to the order set in the transmission/reception port number filed of the start notification frame.

As illustrated in FIG. 7D, the routing controller 235 sets the ID of the relay node device 10-5 in a destination node ID field of the start notification response frame. The routing controller 235 sets the ID of the gateway device 20 in a transmission source node ID field. The routing controller 235 sets data indicating a start notification response frame in a KIND field. The routing controller 235 sets "2" that is the number of hops from the gateway device 20 to the relay node device 10-5 in a number of HOPs field of the start notification response frame.

The routing controller 235 refers to a transmission port number set in the transmission/reception port number field of the start notification frame transmitted from the relay node device 10-5. Then, the routing controller 235 sets a GW network ID indicating a route from the relay node device 10-5 to the gateway device 20 in a GW network ID field of the start notification response frame, using the referred transmission port number. In the example of the start notification response frame illustrated in FIG. 7D, the routing controller 235 retrieves the transmission port numbers "1" and "1" that have been sequentially set in the transmission/reception port number field of the start notification frame (FIG. 7C). Then, the routing controller 235 inserts the retrieved transmission port numbers sequentially from the first digit in the GW network ID field in the same order as the order set in the transmission/reception port number field of the start notification frame (FIG. 7C). "11" in the GW network ID field "11FFFFFFFFFF" illustrated in FIG. 7D corresponds to transmission port numbers set in the transmission/reception port number field of the start notification frame.

The relay node device 10-1 receives the start notification response frame from the gateway device 20.

The routing controller 135 of the relay node device 10-1 refers to the network ID field of the received start notification response frame. The first digit in the network ID field indicates a transmission port number of the relay node device 10-1 in the start notification response frame. The routing controller 135 deletes data of the first digit in the network ID field of the start notification response frame, and shifts pieces of data of the following digits forward (leftward) by one digit (p525). FIG. 7E illustrates an example of a start notification response frame generated by the routing controller 135. Compared with the data in the network ID field of the start notification response frame illustrated in FIG. 7D, data in the network ID field of the start notification response frame illustrated in FIG. 7E has been shifted forward by one digit.

The transmission frame controller 132 performs control to transmit the start notification response frame, in which the setting in the network ID field has been changed by the routing controller 135, from the transmission port P2 that is indicated in the first digit in the network ID field of the start notification response frame when the start notification response frame was received by the relay node device 10-1 (p526).

The relay node device 10-5 receives the start notification response frame transmitted from the relay node device 10-1, via the port P1.

The relay node device 10-5 refers to the number of HOPs field of the received start notification response frame, and thereby determines that the number of hops from the gateway device 20 to the own node device is 2. In addition, the relay node device 10-5 refers to the GW network ID field, and thereby determines that a GW network ID from the own node device to the gateway device 20 is "11FFFFFFFFFF".

The routing controller 135 of the relay node device 10-5 refers to the received start notification response frame, and stores the GW network ID and the number of hops in the GW routing management table 136 (p527).

As a result of a power-on process for the relay node device 10-5 via the port P2 of the relay node device 10-1 as described above, a path 40-5 is newly established as a power supply line. When the path 40-5 is established as the power supply line, the relay node device 10-1 goes to a power-on process for the relay node device 10-2 via the port P3.

The power supply controller 137 of the relay node device 10-1 controls a port power switch S3 to be in an on state and starts power supply to the relay node device 10-2 via the port P3 (p528), along with starting the timer 138 (p529). If a start notification frame is not received from the relay node device 10-2 when a prescribed time passes after starting the timer 138, the power supply controller 137 stops the power supply to the relay node device 10-2, and performs a power-on process for another relay node device 10.

When the process sequence described above with reference to FIG. 5A and FIG. 5B is understood, the following process sequence can be understood similarly, and therefore the following process sequence is not illustrated in FIG. 5A and FIG. 5B.

The relay node device 10-2 receives power supply from the relay node device 10-1 via the port P3 of the own node device, and is started. The routing controller 135 of the relay node device 10-2 generates a start notification frame, and the transmission frame controller 132 performs control to transmit the generated start notification frame from all of the ports P1-P3. Examples of the generated and transmitted start notification frame are illustrated in FIG. 7F.

In the start notification frames of FIG. 7F, in a network ID field and a destination node ID field, "000000000000" is set. In a transmission source node ID field, an ID of the relay node device 10-2 is set. In a KIND field, data is set that indicates a start notification frame. In a number of HOPs filed, "1" is set that is the number of hops to an adjacent device. The first digit in a transmission/reception port number field is set to each of "1" to "3" that respectively indicate the numbers of the ports P1 to P3 from which the start notification frames are to be transmitted. The following digit in the transmission/reception port number field is set to "0" indicating that a reception port does not exist. The other digits are set to "0" indicating that a transmission/reception port does not exist. In a power supply line flag field, "0" is set that indicates that power supply lines to adjacent relay node devices 10-3 and 10-6 have not been established.

When the relay node device 10-2 transmits the start notification frames (FIG. 7F), the adjacent relay node devices 10-3 and 10-6 have not been started. Therefore, the start notification frame transmitted from the port P1 of the relay node device 10-2 to the relay node device 10-3 is discarded. In addition, the start notification frame transmitted from the port P2 of the relay node device 10-2 to the relay node device 10-6 is discarded. In FIG. 7F, the start notification frames respectively transmitted from the port P1 and the port P2 that are indicated by strikethrough indicate that these frames are discarded.

The relay node device 10-1 receives the start notification frame transmitted from the port P3 of the relay node device 10-2, via the port P3. The relay node device 10-1 refers to the transmission source node ID field of the start notification frame, and thereby determines that the start notification frame has been transmitted from the relay node device 10-2. In addition, the relay node device 10-1 refers to the transmission/reception port number field of the start notification frame, and thereby determines that a transmission port of the relay node device 10-2 which has transmitted the start notification frame is the port P3.

The relay node device 10-1 adds data indicating a transmission/reception port number of the own node device to the start notification frame received from the relay node device 10-2, and increments the number of hops indicated by the start notification frame by 1. In addition, the relay node device 10-1 sets, in the power supply line flag, "1" that indicates that the start notification frame has been received from the port P3 via which the power-on process has been performed. Then, the relay node device 10-1 transfers the start notification frame to the gateway device 20. FIG. 7G illustrates an example of a start notification frame transferred by the relay node device 10-1.

As illustrated in FIG. 7G, the routing controller 135 of the relay node device 10-1 increments the number of hops in the number of HOPs field of the received start notification frame (FIG. 7F) by 1, and sets "2". In addition, the routing controller 135 shifts the respective transmission/reception port numbers written in the transmission/reception port number field backward by two digits. Then, the routing controller 135 sets the first digit in the transmission/reception port number field to the transmission port number "1" of the relay node device 10-1, and sets the following digit to the reception port number "3". The routing controller 135 sets, in the power supply line flag field of the start notification frame, "1" indicating that the start notification frame has been received from the port P3 via which the power-on process has been performed, namely, that the adjacent relay node device 10-2 has been started.

The gateway device 20 receives the start notification frame (FIG. 7G) transmitted from the relay node device 10-1, via the port P2. The gateway device 20 refers to the transmission source node ID field of the start notification frame, and thereby determines that the relay node device 10-2 has been started by the power supply along a route indicted by the start notification frame. The gateway device 20 refers to the transmission/reception port number field of the received start notification frame, and thereby recognizes transmission/reception ports of devices until the start notification frame is received by the own device 20 after the start notification frame is transmitted from the relay node device 10-2. The gateway device 20 refers to the number of HOPs field of the received start notification frame, and thereby recognizes the number of hops from the gateway device 20 to the relay node device 10-2.

The routing controller 235 of the gateway device 20 refers to the start notification frame received from the relay node device 10-1, and stores an ID and the number of hops of the relay node device 10-2 in a routing management table 236 for the relay node device 10-2. In addition, the routing controller 235 generates a network ID to the relay node device 10-2 and stores the generated network ID in the routing management table 236, and sets a power supply line flag indicating that a power supply line has been established along a route indicated by the generated network ID.

The routing controller 235 generates a start notification response frame addressed to the relay node device 10-2. Then, the transmission frame controller 232 transmits the generated start notification response frame to the relay node device 10-1 via the port P2. An example of the generated and transmitted start notification frame is illustrated in FIG. 7H.

The routing controller 235 sets a network ID field of the start notification response frame such that the start notification response frame passes through the same route as a transmission route of the start notification frame and reaches a destination relay node device 10. In the example of the start notification response frame illustrated in FIG. 7H, the routing controller 235 retrieves the reception port numbers "0" and "3" that have been sequentially set in the transmission/reception port number field of the start notification frame (FIG. 7G). The routing controller 235 inserts the retrieved reception port numbers as transmission port numbers of the start notification response frame sequentially from the first digit in a network ID field of the start notification response frame in an order reverse to the order set in the start notification frame. "30" in the network ID field "30FFFFFFFFFF" illustrated in FIG. 7H corresponds to reception port numbers in an order reverse to the order set in the transmission/reception port number filed of the start notification frame.

As illustrated in FIG. 7H, the routing controller 235 sets an ID of the relay node device 10-2 in a destination node ID field of the start notification response frame. The routing controller 235 sets an ID of the gateway device 20 in a transmission source node ID field. The routing controller 235 sets data indicating a start notification response frame in a KIND field. The routing controller 235 sets, in a number of HOPs field of the start notification response frame, "2" that is the number of hops from the gateway device 20 to the relay node device 10-2.

The routing controller 235 refers to the transmission port number set in the transmission/reception port number field of the start notification frame transmitted from the relay node device 10-2. Then, the routing controller 235 sets a GW network ID indicating a route from the relay node device 10-2 to the gateway device 20, in a GW network ID field of the start notification response frame. In the example of the start notification response frame illustrated in FIG. 7H, the routing controller 235 retrieves the transmission port numbers "3" and "1" that have been sequentially set in the transmission/reception port number field of the start notification frame (FIG. 7G). Then, the routing controller 235 inserts the transmission port numbers sequentially from the first digit in the GW network ID field in the same order as the order set in the transmission/reception port number filed of the start notification frame (FIG. 7G). "31" in the GW network ID field "31FFFFFFFFFF" illustrated in FIG. 7H corresponds to the transmission port numbers set in the transmission/reception port number field of the start notification frame.

The relay node device 10-1 receives the start notification response frame from the gateway device 20. The routing controller 135 of the relay node device 10-1 deletes data of the first digit in the network ID field of the start notification response frame, and shifts pieces of data of the following digits forward by one digit. FIG. 7I illustrates an example of a start notification response frame generated by the routing controller 135. Compared with data in the network ID field of the start notification response frame illustrated in FIG. 7H, data in a network ID field of the start notification response frame illustrated in FIG. 7I is shifted forward by one digit. The transmission frame controller 132 performs control to transmit the start notification response frame from the transmission port P3, which is indicated in the first digit of the network ID field of the start notification response frame when the relay node device 10-1 has received the start notification response frame.

The relay node device 10-2 receives the start notification response frame transmitted from the relay node device 10-1, via the port P3.

The relay node device 10-2 refers to the number of HOPs field of the received start notification response frame, and thereby determines that the number of hops from the gateway device 20 to the own node device is 2. In addition, the relay node device 10-2 refers to the GW network ID field, and thereby determines that a GW network ID from the own node device to the gateway device 20 is "31FFFFFFFFFF".

The routing controller 135 of the relay node device 10-2 refers to the received start notification response frame, and stores the GW network ID and the number of hops in the GW routing management table 136.

As a result of the power-on process via the port P3 of the relay node device 10-1 as described above, a path 40-2 is newly established as a power supply line. When the path 40-2 is established as the power supply line, the gateway device 20 goes to a power-on process for the relay node devices 10-6 and 10-9 which are adjacent to the relay node device 10-5. In addition, the gateway device 20 goes to a power-on process for the relay node devices 10-3 and 10-6 which are adjacent to the relay node device 10-2.

The power-on process for the relay node devices 10-6 and 10-9, which are adjacent to the relay node device 10-5 previously started as a result of the power-on process for the relay node device 10-1, is described below as an example.

First, the routing controller 235 of the gateway device 20 generates a power-on instruction frame for the relay node device 10-5, and the transmission frame controller 232 performs control to transmit the generated power-on instruction frame. An example of the power-on instruction frame is illustrated in FIG. 8A.

In the power-on instruction frame illustrated in FIG. 8A, "20" in "20FFFFFFFFFF" set in a network ID field indicates transmission port numbers of a relay node device 10 that transmits the power-on instruction frame. Namely, in the example illustrated in FIG. 8A, it indicates that the power-on instruction frame is transferred to the relay node device 10-5 via the port P2 of the relay node device 10-1. In a destination node ID field, an ID of the relay node device 10-5 is set. In a transmission source node ID field, an ID of the gateway device 20 is set. In a KIND field, data indicating a power-on instruction frame is set. In a number of HOPs field, "2" is set that is the number of hops from the gateway device 20 to the relay node device 10-5. In a power-on port number field, a power-on specified value is set that indicates all ports other than a port via which power supply has been received.

The relay node device 10-5 receives the power-on instruction frame transmitted from the gateway device 20, via the port P1. The relay node device 10-5 starts power supply to adjacent relay node devices via ports other than the port P1 via which the power supply has been received. Described below is an example in which the relay node device 10-5 first starts a power-on process via the port P2 and then starts a power-on process via the port P3.

The power supply controller 137 of the relay node device 10-5 controls a port power switch S2 to be in an on state and starts power supply to the relay node device 10-9 via the port P2, along with starting the timer 138. If a start notification frame from the relay node device 10-9 is not received when a prescribed time passes after starting the timer 138, the power supply controller 137 stops the power supply to the relay node device 10-9, and performs a power-on process for another relay node device 10.

The relay node device 10-9 receives power supply from the relay node device 10-5 via the port P1 of the own node device, and is started. The routing controller 135 of the relay node device 10-9 generates a start notification frame, and the transmission frame controller 132 performs control to transmit the generated start notification frame from all of the ports P1-P3.

When the relay node device 10-9 transmits the start notification frames, an adjacent relay node device 10-13 has not been started. In addition, nothing is connected to the port P3 of the relay node device 10-9. Therefore, the start notification frames respectively transmitted from the port P2 and the port P3 of the relay node device 10-5 are discarded. An example of the start notification frame transmitted from the port P1 is illustrated in FIG. 8B.

In the start notification frame illustrated in FIG. 8B, "000000000000" is set in a network ID field and a destination node ID field. In a transmission source ID field, an ID of the relay node device 10-9 is set. In a KIND field, data indicating a start notification frame is set. In a number of HOPs field, "1" is set that is the number of hops to an adjacent device. The first digit in a transmission/reception port number field is set to "1" that is the number of the port P1 from which the start notification frame is to be transmitted. In addition, the following digit in the transmission/reception port number field is set to "0" indicating that a reception port does not exist. The other digits are set to "0"

indicating that a transmission/reception port does not exist. In a power supply line flag field, "0" is set because a power supply line to the adjacent relay node device 10-13 has not been established.

The relay node device 10-5 receives the start notification frame transmitted from the port P1 of the relay node device 10-9, via the port P2. The relay node device 10-5 adds data indicating a transmission/reception port number of the own node device in the start notification frame received from the relay node device 10-9, and increments the number of hops by 1. In addition, the relay node device 10-5 sets, in a power supply line flag field of the start notification frame, "1" that indicates that the start notification frame has been received from the port P2 via which a power-on process has been performed, namely, that the adjacent relay node device 10-9 has been started. Then, the relay node device 10-5 transfers the start notification frame to the relay node device 10-1. FIG. 8C illustrates an example of the start notification frame transferred by the relay node device 10-5.

The relay node device 10-1 receives the start notification frame transmitted from the relay node device 10-5, via the port P2. The relay node device 10-1 adds data indicating a transmission/reception port number of the own node device, in the start notification frame received from the relay node device 10-5, and increments the number of hops by 1. Then, the relay node device 10-1 transfers the start notification frame to the gateway device 20. FIG. 8D illustrates an example of the start notification frame transferred by the relay node device 10-1.

The gateway device 20 receives the start notification frame transmitted from the relay node device 10-1, via the port P2. The gateway device 20 refers to a transmission source node ID field and a power supply line flag field of the start notification frame, and thereby determines that the relay node device 10-9 has been started by the power supply along a route indicated by the start notification frame. The gateway device 20 refers to a transmission/reception port number field of the received start notification frame, and thereby recognizes transmission/reception ports of relay node devices 10 until the start notification frame is received by the own device 20 after the start notification frame is transmitted from the relay node device 10-5. The gateway device 20 refers to a number of HOPs field of the received start notification frame, and thereby recognizes the number of hops from the gateway device 20 to the relay node device 10-9.

The routing controller 235 of the gateway device 20 refers to the start notification frame received from the relay node device 10-1, and stores an ID and the number of hops of the relay node device 10-9 in a routing management table 236 for the relay node device 10-9. In addition, the routing controller 235 generates a network ID to the relay node device 10-9 and stores the generated network ID in the routing management table 236, and sets a power supply line flag indicating that a power supply line has been established along a route indicated by the generated network ID.

The routing controller 235 generates a start notification response frame addressed to the relay node device 10-9. Then, the transmission frame controller 232 performs control to transmit the generated start notification response frame to the relay node device 10-1 via the port P2. An example of the generated and transmitted start notification response frame is illustrated in FIG. 8E.

The rely node device 10-1 receives the start notification response frame from the gateway device 20. The routing controller 135 of the relay node device 10-1 deletes data of the first digit in a network ID field of the start notification response frame, and shifts pieces of data of the following digits forward by one digit. FIG. 8F illustrates an example of a start notification response frame generated by the routing controller 135. The transmission frame controller 132 performs control to transmit the start notification response frame from the transmission port P2 indicated by the first digit in the network ID field.

The relay node device 10-5 receives the start notification response frame transmitted from the port P2 of the relay node device 10-1, via the port P1. The routing controller 135 of the relay node device 10-5 deletes data of the first digit in the network ID field of the start notification response frame, and shifts pieces of data of the following digits forward by one digit. FIG. 8G illustrates an example of a start notification response frame generated by the routing controller 135. The transmission frame controller 132 performs control to transmit the start notification response frame from the transmission port P2 indicated by the first digit in the network ID field.

The relay node device 10-9 receives the start notification response frame transmitted from the port P2 of the relay node device 10-5, via the port P1.

The relay node device 10-9 refers to a number of HOPs field of the received start notification response frame, and thereby determines that the number of hops from the gateway device 20 to the own node device is 3. In addition, the relay node device 10-5 refers to a GW network ID field, and thereby determines that a GW network ID from the own node device to the gateway device 20 is "111FFFFFFFFF".

The routing controller 135 of the relay node device 10-9 refers to the received start notification response frame, and stores the GW network ID and the number of hops in the GW routing management table 136.

As a result of the power-on process for the relay node device 10-9 via the port P2 of the relay node device 10-5 as described above, a path 40-11 is newly established as a power supply line. When the path 40-11 is established as the power supply line, the relay node device 10-5 goes to a power-on process for the relay node device 10-6 via the port P3.

The power supply controller 137 of the relay node device 10-5 controls a port power switch S3 to be in an on state and starts power supply to the relay node device 10-6 via the port P3, along with starting the timer 138. If a start notification frame is not received from the relay node device 10-6 when a prescribed time passes after starting the timer 138, the power supply controller 137 stops the power supply to the relay node device 10-6, and performs a power-on process for another relay node device 10.

The relay node device 10-6 receives power supply from the relay node device 10-5 via the port P3 of the own node device, and is started. The rouging controller 135 of the relay node device 10-6 generates a start notification frame, and the transmission frame controller 132 performs control to transmit the generated start notification frame from all of the ports P1-P3.

When the relay node device 10-6 transmits the start notification frames, an adjacent relay node device 10-10 has not been started. Therefore, the start notification frame transmitted from the port P1 of the relay node device 10-6 is discarded. Examples of the start notification frames transmitted from the port P2 and the port P3 are illustrated in FIG. 8H.

The relay node device 10-2 receives the start notification frame transmitted from the port P2 of the relay node device 10-6, via the port P2. The relay node device 10-2 adds data indicating a transmission/reception port number of the own node device in the start notification frame received from the relay node device 10-6, and increments the number of hops by 1. Then, the relay node device 10-2 transfers the start notification frame to the relay node device 10-1 via the port P3. FIG. 8I illustrates an example of the start notification frame transferred by the relay node device 10-2.

The relay node device 10-1 receives the start notification frame transmitted from the relay node device 10-2, via the port P3. The relay node device 10-1 adds data indicating a transmission/reception port number of the own node device in the start notification frame received from the relay node device 10-2, and increments the number of hops by 1. Then, the relay node device 10-1 transfers the start notification frame to the gateway device 20. FIG. 8J illustrates an example of the start notification frame transferred by the relay node device 10-1.

On the other hand, the relay node device 10-5 receives the start notification frame transmitted form the port P3 of the relay node device 10-6, via the port P3. The relay node device 10-5 adds data indicating a transmission/reception port number of the own node device in the start notification frame received from the relay node device 10-6, and increments the number of hops by 1. In addition, the relay node device 10-5 sets, in a power supply line flag field of the start notification frame, "1" that indicates that the relay node device 10-5 has received the start notification frame from the port P3 via which the power-on process has been performed, namely, that the adjacent relay node device 10-6 has been started. Then, the relay node device 10-5 transfers the start notification frame to the relay node device 10-1 via the port P1. FIG. 8K illustrates an example of the start notification frame transferred by the relay node device 10-5.

The relay node device 10-1 receives the start notification frame transmitted from the relay node device 10-5, via the port P2. The relay node device 10-1 adds data indicating a transmission/reception port number of the own node device in the start notification frame received from the relay node device 10-5, and increments the number of hops by 1. Then, the relay node device 10-1 transfers the start notification frame to the gateway device 20. FIG. 8L illustrates an example of the start notification frame transferred by the relay node device 10-1.

The gateway device 20 receives the respective start notification frames (FIG. 8J and FIG. 8L) that have been transmitted from the port P2 and the port P3 of the relay node device 10-5, from the relay node device 10-1.

First, the gateway device 20 can determine that a power supply line has been established along a route indicated in the start notification frame (FIG. 8L) in which a setting value in the power supply line flag field is "1" from among the received plural start notification frames, and that the relay node device 10-6 has been started. In the example of the start notification frame illustrated in FIG. 8L, the gateway device 20 can determine that the path 40-9, in addition to the path 40-1 and the path 40-5, has been newly established as a power supply line.

Therefore, the routing controller 235 of the gateway device 20 refers to the transmission/reception port number field of the start notification frame in which a setting value in the power supply line flag field is "1". Then, the routing controller 235 generates a start notification response frame that is addressed to the relay node device 10-6 and is to be transmitted along a route in which a power supply line has been established. An example of the generated start notification response frame is illustrated in FIG. 8M. The transmission frame controller performs control to transmit the generated start notification frame via the port P2.

The relay node device 10-1 receives the start notification response frame from the gateway device 20. The routing controller 135 of the relay node device 10-1 deletes data of the first digit in a network ID field of the start notification response frame, and shifts pieces of data of the following digits forward by one digit. FIG. 8N illustrates an example of a start notification response frame generated by the routing controller 135. The transmission frame controller 132 performs control to transmit the start notification response frame from the transmission port P2 indicated by the first digit in the network ID field.

The relay node device 10-5 receives the start notification response frame transmitted from the port P2 of the relay node device 10-1, via the port P1. The routing controller 135 of the relay node device 10-5 deletes data of the first digit in the network ID field of the start notification response frame, and shifts pieces of the following digits forward by one digit. FIG. 8O illustrates an example of the start notification response frame generated by the routing controller 135. The transmission frame controller 132 performs control to transmit the start notification response frame from the transmission port P3 indicated by the first digit in the network ID field.

The relay node device 10-6 receives the start notification response frame transmitted from the port P3 of the relay node device 10-5, via the port P3.

The relay node device 10-6 refers to a number of HOPs field of the received start notification response frame, and thereby determines that the number of hops from the gateway device 20 to the own node device is 3. In addition, the relay node device 10-6 refers to a GW network ID field, and thereby determines that a GW network ID from the own node device to the gateway device 20 is "311FFFFFFFFF".

The routing controller 135 of the relay node device 10-6 refers to the received start notification response frame, and stores the GW network ID and the number of hops in the GW routing management table 136.

On the other hand, the gateway device 20 determines that a route indicated by a start notification frame (FIG. 8J) in which a setting value in a power supply line flag field is "0" from among the received plural start notification frames is an alternative route for starting the relay node device 10-6.

The routing controller 235 of the gateway device 20 refers to a transmission/reception port number field of the start notification frame in which the setting value in the power supply line flag field is "0", and generates an alternative route notification frame for the relay node device 10-6. An example of the generated alternative route notification frame is illustrated in FIG. 8P. The transmission frame controller performs control to transmit the generated alternative route notification frame, via the port P2.

The relay node device 10-1 receives the alternative route notification frame from the gateway device 20. The routing controller 135 of the relay node device 10-1 deletes data of the first digit in a network ID field of the alternative route notification frame, and shifts pieces of data of the following digits forward by one digit. FIG. 8Q illustrates an example of the alternative route notification frame generated by the routing controller 135. The transmission frame controller 132 performs control to transmit the alternative route notification frame from the transmission port P3 indicated by the first digit in the network ID field.

The relay node device 10-2 receives the alternative route notification frame transmitted from the port P3 of the relay node device 10-1, via the port P3. The routing controller 135 of the relay node device 10-2 deletes data of the first digit in the network ID field of the alternative route notification frame, and shifts pieces of data of the following digits forward by one digit. FIG. 8R illustrates an example of the alternative route notification frame generated by the routing controller 135. The transmission frame controller 132 performs control to transmit the alternative route notification frame from the transmission port P2 indicated by the first digit in the network ID field.

The relay node device 10-6 receives the alternative route notification frame transmitted from the port P2 of the relay node device 10-2, via the port P2.

The relay node device 10-6 refers to a number of HOPs field of the received alternative route notification frame, and thereby determines that the number of hops from the gateway device 20 to the own node device is 3. In addition, the relay node device 10-6 refers to a GW network ID field, and thereby determines that a GW network ID of an alternative route from the own node device to the gateway device 20 is "231FFFFFFFF".

The routing controller 135 of the relay node device 10-6 refers to the received alternative route notification frame, and stores the GW network ID and the number of hops of the alternative route in the GW routing management table 136.

A power-on process for each of the relay node devices 10 in the wired ad-hoc network system 1 illustrated in FIGS. 1A and 1B is performed by similarly continuing the power-on process described above afterward, and all power supply lines are established in the wired ad-hoc network system 1.

Figure 9:
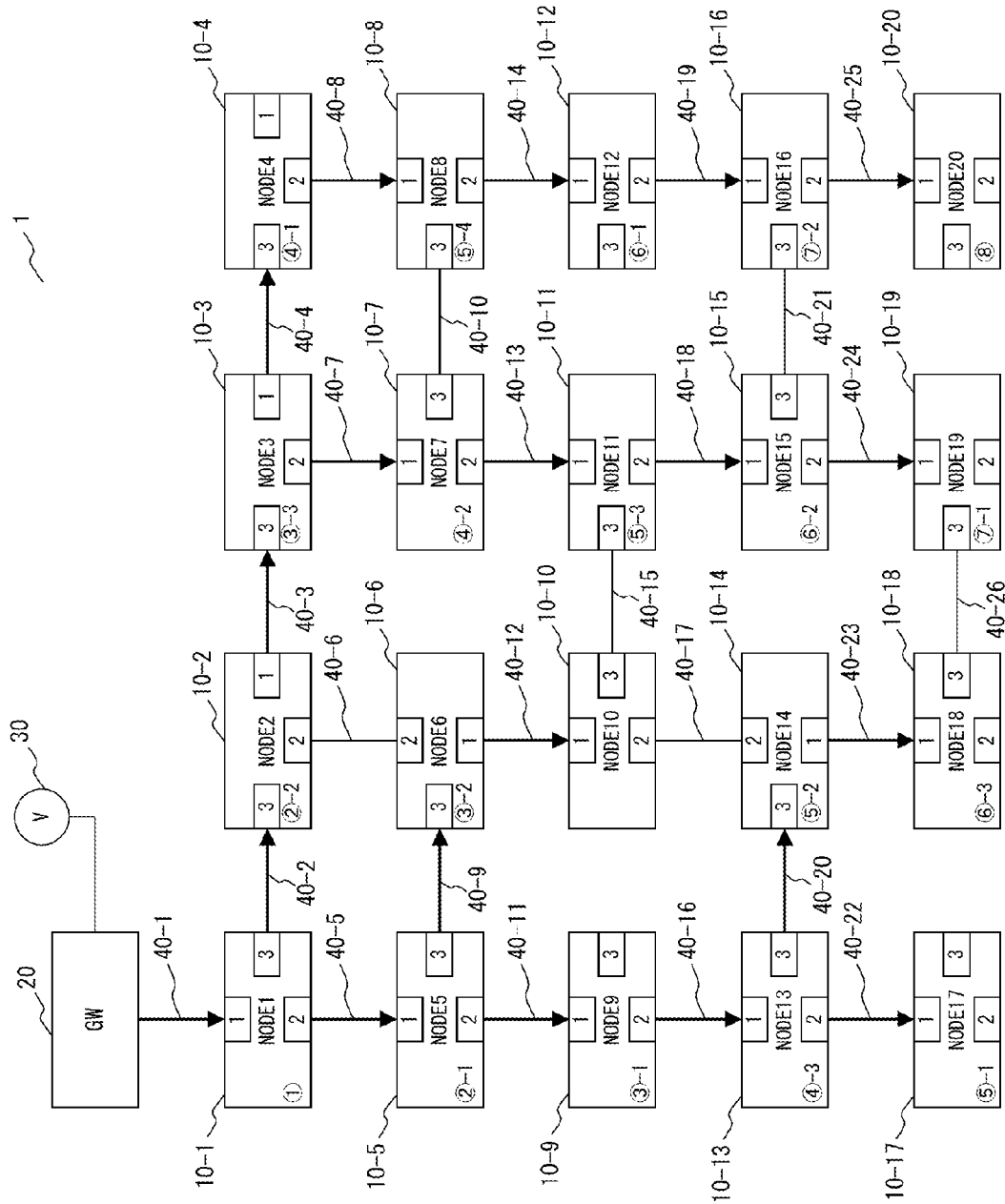
FIG. 9 illustrates an example of a power supply line established in a wired ad-hoc network system.

FIG. 9 illustrates an example of the power supply line established in the wired ad-hoc network system.

In FIG. 9, a circled number assigned to each of the relay node devices 10 indicates the number of hops from the gateway device 20. A branch number of the circled number assigned to each of the relay node devices 10 indicates the order of a started relay node device 10 in the relay node devices which have the same numbers of hops. For example, in the relay node device 10-2 and the relay node device 10-5 which have 2 as the same numbers of hops, the relay node device 10-5 is started first, and the relay node device 10-2 is then started.

In FIG. 9, a path 40 illustrated by an arrow indicates a path established as a power supply line, and a direction of the arrow indicates a direction in which power is supplied. The other paths 40 illustrated by a bar line indicate paths set as an alternative route.

Figure 10A:
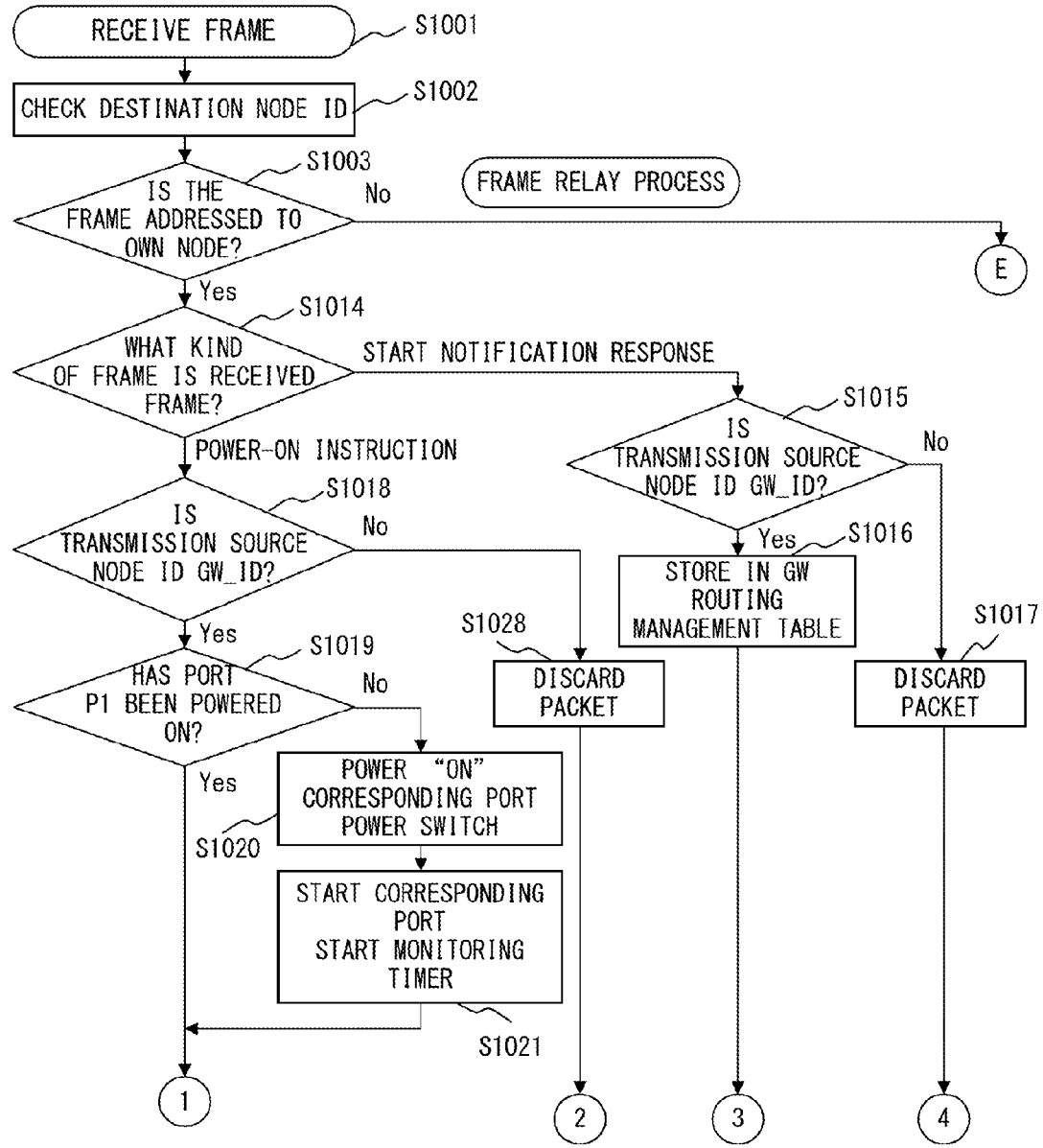
FIGS. 10A-10C illustrate an example of a power-on process flow of a relay node device according to an embodiment.
Figure 10B:
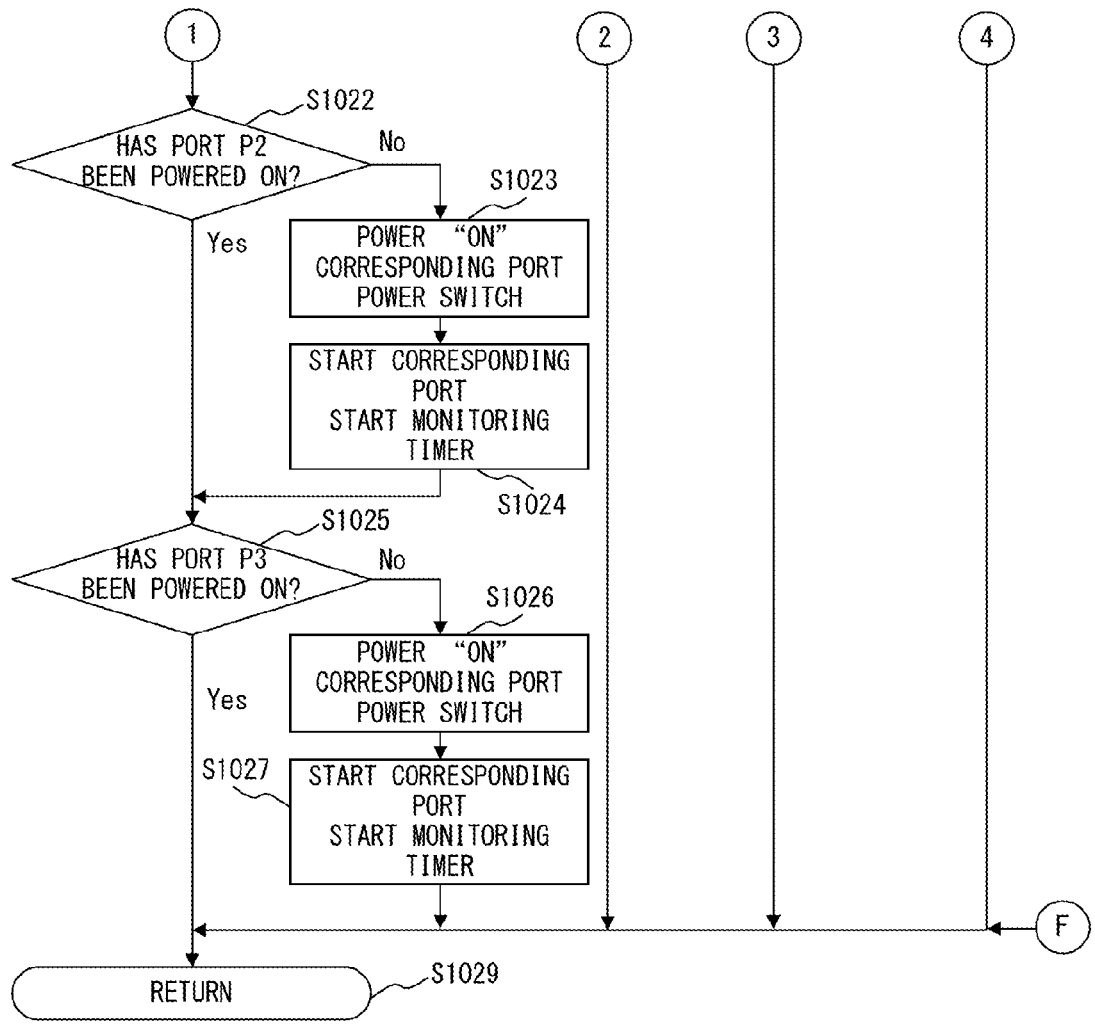
Figure 10C:
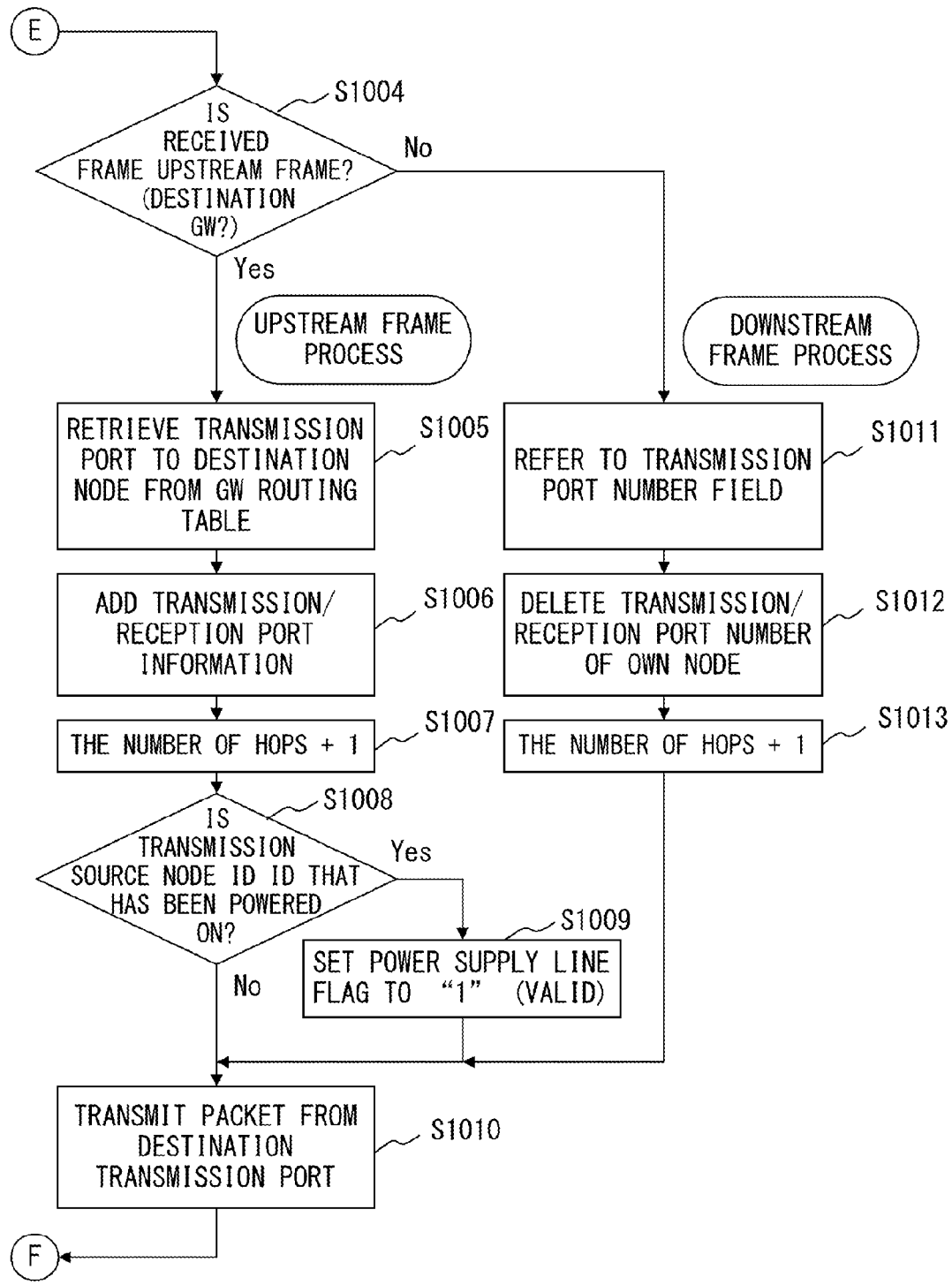

An example of a processing flow of the relay node device 10 in the power-on process as described above with reference to FIGS. 5A-5B to FIGS. 8A-8R is illustrated in FIGS. 10A-10C.

FIGS. 10A-10C illustrate an example of a power-on processing flow of a relay node device according to the embodiment.

FIGS. 10A-10C illustrate an example of a processing flow in a case in which the relay node device 10 receives a frame from another device during the power-on process according to the embodiment.

In step s1001, the relay node device 10 receives a frame transmitted from another device in the wired ad-hoc network system, via one of the ports P1-P3.

In step s1002, the reception frame controller 131 of the relay node device 10 refers to a destination node ID in the received frame (s1002), and determines whether a destination of the received frame is the own node device (s1003).

When the destination of the received frame is not the own node device ("NO" in step S1003), the relay node device 10 proceeds to processes in and after step s1004, and performs a process of relaying the received frame to another device. In the power-on process according to the embodiment, an example of a frame that the relay node device 10 relays is a start notification frame transmitted by the relay node device 10 that has been started by receiving the power supply from an adjacent device.

In step s1004, the routing controller 135 refers to the destination node ID of the received frame. Then, the routing controller 135 determines whether the received frame is an upstream frame from another relay node device 10 to the gateway device 20 or a downstream frame from the gateway device 20 to another relay node device.

When the received frame is a upstream frame ("YES" in step s1004), the routing controller 135 refers to the GW routing management table 136, and retrieves a transmission port of the own node device which heads to the gateway device 20 (s1005). In addition, the routing controller 135 adds a transmission/reception port number of the own node device in a transmission/reception port number field of the received frame (s1006), and increments the number of hops in the number of HOPs field by 1 (s1007). Then, in step S1008, the routing controller 135 determines whether a transmission source node ID of the received frame is an ID of the relay node device 10 on which the power-on process is being performed by a power-on instruction frame. When the transmission source node ID of the received frame is the ID of the relay node device 10 on which the power-on process is being performed by the power-on instruction frame ("YES" in step s1008), the routing controller sets a power supply line flag of the received frame to "1".

On the other hand, when the received frame is a downstream frame ("NO" in step s1004), it is considered that the frame is a frame on which a relay process has been previously performed by the relay node device 10 received the frame. Therefore, the routing controller 135 refers to a transmission/reception port number field of the received frame (s1011), deletes a transmission/reception port number of the own node device 10 (s1012), and increments the number of hops in the number of HOPs field by 1 (s1013).

In step s1010, the transmission frame controller 132 performs control to transmit the frame processed in steps s1008, s1009, and s1013 to a destination device from a transmission port. Then, the relay node device 10 returns to a process of receiving a frame transmitted from another frame (s1029).

On the other hand, when the destination of the received frame is the own node device ("YES" in step s1003), the relay node device 10 proceeds to processes in and after step s1014.

In step s1014, the routing controller 135 refers to a KIND field of the received frame, and determines whether the received frame is a start notification response frame or a power-on instruction frame.

When the received frame is the start notification response frame, in step s1015, the routing controller 135 refers to a transmission source ID field of the received frame, and determines whether the transmission source node ID of the received frame is an ID of the gateway device 20. When the transmission source node ID of the received frame is the ID of the gateway device 20 ("YES" in step s1015), the routing controller 135 stores a GW routing ID and the number of hops indicated by the received frame in the GW routing management table 136 (s1016). When the transmission source node ID of the received frame is not the ID of the gateway device 20 ("NO" in step s1015), the routing controller 135 discards the received frame (s1017). Then, the relay node device returns to the process of receiving a frame transmitted from another device (s1029).

On the other hand, when the received frame is a power-on instruction frame, the relay node device 10 proceeds to a process of step s1018.

In step s1018, the routing controller 135 refers to the transmission source ID field of the received frame, and determines whether the transmission source node ID of the received frame is the ID of the gateway device 20.

When the transmission source node ID of the received frame is the ID of the gateway device 20 ("YES" in step s1018), in step s1019 to step s1027, the power supply controller 137 performs a power-on process for an adjacent relay node device 10 via a port of the own node device.

For example, when the number of ports provided in the relay node device 10 is 3 and the power-on process for the adjacent relay node device 10 is sequentially performed via ports in ascending order of a port number, the power supply controller 137 determines whether the power-on process for the adjacent relay node device via a port P1 whose port number is 1 has been performed (s1019).

When the power-on process via the port P1 has not been performed ("NO" in step s1019), the power supply controller 137 sets a switch S1 to be in an on state, and starts power supply via the port P1 (s1020). In addition, the power supply controller 137 starts the monitoring timer 138, and monitors a time period until receiving a start notification frame from the port P1 (s1021).

On the other hand, when the power-on process via the port P1 has been performed ("YES" in step s1019), the power supply controller 137 determines whether a power-on process for an adjacent node device via a port P2 whose port number is 2 has been performed (s1022).

When the power-on process via the port P2 has not been performed ("NO" in step s1022), the power supply controller 137 sets a switch S2 to be in anon state, and starts power supply via the port P2 (s1023). In addition, the power supply controller 137 starts the monitoring timer 138, and monitors a time period until receiving a start notification frame from the port P2 (s1024).

On the other hand, when the power-on process via the port P2 has been performed ("YES" in step s1022), the power supply controller 137 determines whether a power-on for an adjacent relay node device via a port P3 whose power number is 3 has been performed (S1025).

When the power-on process via the port P3 has not been performed ("NO" in step s1025), the power supply controller 137 sets a switch S3 to be in anon state, and starts power supply via the port P3 (s1026). In addition, the power supply controller 137 starts the monitoring timer 138, and monitors a time period until receiving a start notification frame via the port P3 (s1027).

On the other hand, when the power-on process via the port P3 has been performed ("YES" in step s1025), the relay node device returns to the process of receiving a frame transmitted from another device (s1029).

In step s1018, when the transmission source node ID of the received frame is not the ID of the gateway device 20 ("NO" in step s1018), the relay node device discards the received packet (s1028), and returns to the process of receiving a frame transmitted from another device (s1029).

As a result of the power-on process as described above with reference to FIGS. 5A-5B to FIGS. 10A-10C, pieces of data on a route established as a power supply line between the gateway device 20 and each of the node devices 10 and the alternative route are stored in each of the node routing management tables 236 of the gateway device 20.

In addition, in the GW routing management table 136 of each of the relay node devices 10, pieces of data on a route established as a power supply line between the own node device 10 and the gateway device 20 and the alternative route are stored.

Therefore, the gateway device 20 can manage the power supply line to each of the relay node devices 10 using each of the node routing management tables 236.

In addition, the gateway device 20 can manage the routing of a frame transmitted from the own device 20 to each of the relay node devices 10 using each of the node routing management tables 236. Each of the relay node devices 10 can manage the routing of a frame transmitted from the own node device 10 to the gateway device 20 using the GW routing management table 136.

An example of the network ID and the GW network ID which are set in the power-on process according to the embodiment is described with reference to FIG. 11 to FIG. 14.

Figure 11:
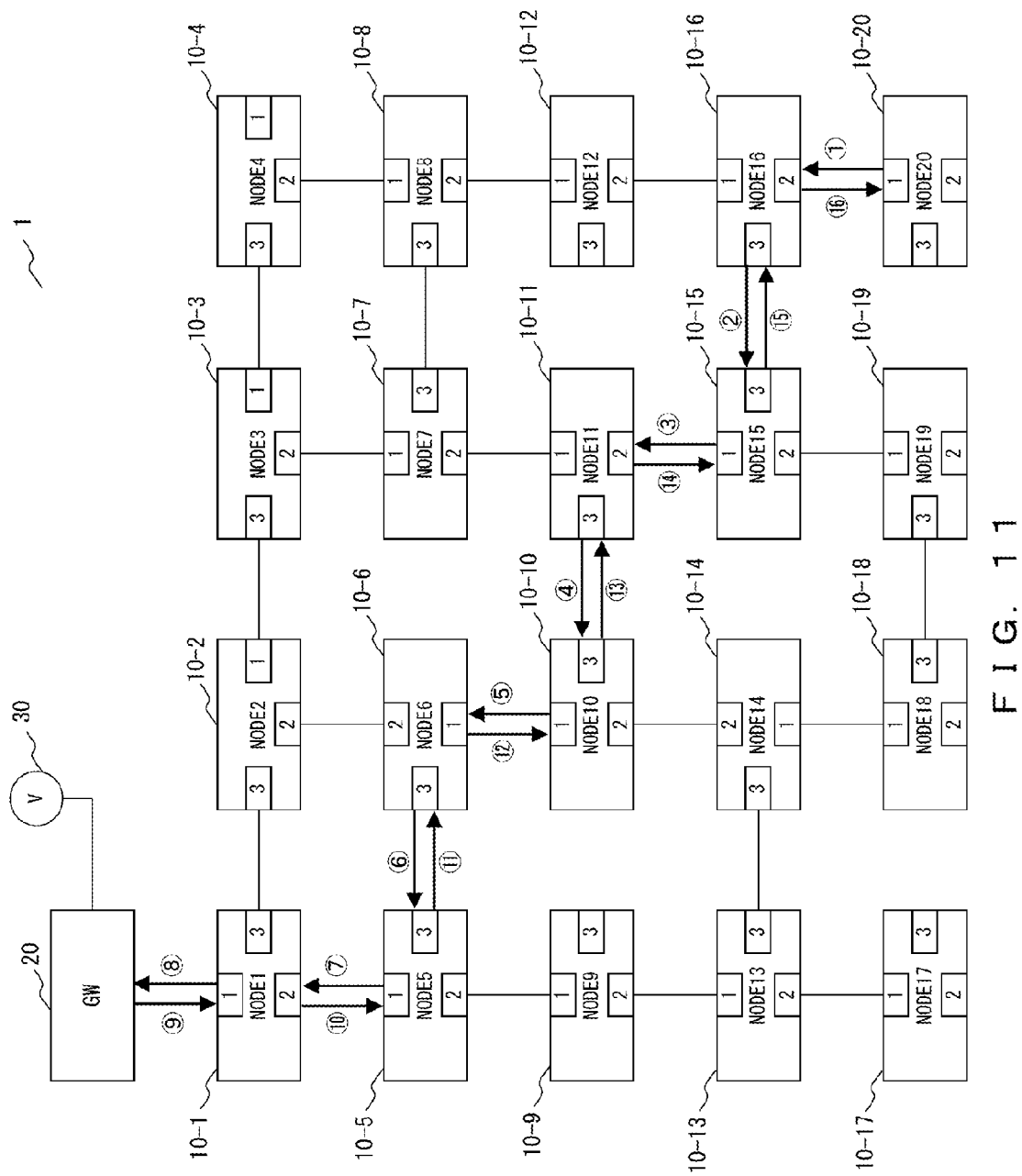
FIG. 11 is a diagram explaining an example of a transmission route of a start notification frame and a start notification response frame.

FIG. 11 is a diagram explaining an example of a transmission route of the start notification frame and the start notification response frame. Numerals 1-3 illustrated in each of the relay node devices 10 of FIG. 11 respectively indicate the numbers of the ports P1-P3.

For example, assume that a start notification frame is transmitted from a relay node device 10-20 to the gateway device 20 along a route of circled numbers 1-8 in FIG. 11. In this case, in the transmission/reception port number field of the start notification frame, a transmission/reception port number illustrated in FIGS. 12A-12H is set by each of the relay node devices 10 that transmit the start notification frames. FIGS. 12A-12H illustrate examples of the start notification frames in the transmission route illustrated in FIG. 11.

As illustrated in FIG. 11, the relay node device 10-20 transmits the start notification frame via the port P1 along a path of circled number 1 of FIG. 11. In addition, the relay node device 10-20 does not have a port from which the start notification frame is to be received. Therefore, as illustrated in FIG. 12A, the relay node device 10-20 sets the first (leftmost) digit in the transmission/reception port number field to the transmission port number "1" indicating the number of the port P1 from which the start notification frame is to be transmitted, and sets the following digit to the reception port number "0" indicating that a port from which the start notification frame is to be received does not exist. In addition, the relay node device 10-20 sets the other digits in the transmission/reception port number field to "0" indicating that a transmission/reception port does not exist.

As illustrated in FIG. 11, a relay node device 10-16 receives the start notification frame transmitted from the relay node device 10-20, via the port P2, and transmits the start notification frame from the port P3 along a path of circled number 2. Therefore, as illustrated in FIG. 12B, the relay node device 10-16 shifts the transmission/reception port number "10" that has been already set in the transmission/reception port number field backward (rightward) by two digits. Then, the relay node device 10-16 sets the first digit in the transmission/reception port number field to the transmission port number "3" indicating the number of the port P3 that transmits the start notification frame, and sets the following digit to the reception port number "2" indicating the number of the port P2 that has received the start notification frame.

Similarly, as illustrated in FIG. 12C to FIG. 12G, the transmission/reception port number field in the start notification frame is set in accordance with the relay node device 10 that transfers the start notification frame.

Then, as illustrated in FIG. 11, the relay node device 10-1 receives the start notification frame illustrated in FIG. 12G via the port P2, and transmits the received start notification frame from the port P1. Therefore, as illustrated in FIG. 12H, the relay node device 10-1 shifts the transmission/reception port number "13311332133210" that has already been set in the transmission/reception port number field backward (rightward) by two digits. Then, the relay node device 10-1 sets the first digit in the transmission/reception port number field to the transmission port number "1" indicating the number of the port P1 that transmits the start notification frame, and sets the following digit to the reception port number "2" indicating the number of the port P2 that has received the start notification frame.

The gateway device 20 that has received the start notification frame as illustrated in FIG. 12H refers to the transmission/reception port number in the transmission/reception port number field, and sets a network ID to the relay node device 10-20 and a GW network ID of the relay node device 10-20.

Namely, in the example of the start notification frame of FIG. 12H, the routing controller 235 of the gateway device 20 extracts the reception port numbers in the transmission/reception port number field sequentially from the top. The extracted reception port numbers are "23132320". The routing controller 235 generates data of 6 bytes "23132320FFFF" as a network ID for a route indicated by the start notification by adding "F" indicating an initial value after the extracted reception port numbers.

In addition, the routing controller 235 extracts the transmission port numbers in the transmission/reception port number field sequentially from the top. The extracted transmission port numbers are "11313131". The routing controller 235 rearranges the extracted transmission port numbers in reverse order. The transmission port numbers rearranged in the reverse order are "13131311". The routing controller 235 generates data of 6 bytes "13131311FFFF" as a GW network ID for a route indicated by the start notification by adding "F" indicating an initial value after "13131311" rearranged in the reverse order.

FIGS. 13A-13H illustrate an example of the start notification response frame in the transmission route illustrated in FIG. 11.

FIG. 13A illustrates a start notification response frame generated by the routing controller 235. In the start notification response frame illustrated in FIG. 13A, "23132320FFFF" is set as a network ID, and "13131311FFFF" is set as a GW network ID. The start notification response frame generated by the gateway device 20 is transmitted to the relay node device 10-20 along paths of circled numbers 9-16 in FIG. 11.

The routing controller 135 of the relay node device 10-1 that has received the start notification response frame illustrated in FIG. 13A retrieves the first digit of the network ID of the received start notification response frame, and determines that a transmission port of the own node device is the port P2. Then, the routing controller 135 deletes data of the first digit of the network ID in the received start notification response frame, and shifts respective pieces of data of the following digits forward by one digit. Then, the relay node device 10-1 transmits the start notification response frame via the port P2.

Thereafter, similarly, the network ID of the start notification response frame is changed as illustrated in FIGS. 13B-13H, and is transferred. Then, the relay node device 10-20 determines that a destination of the received start notification response frame is the own node device because the first digit of the network ID of the start notification response frame is "0", as illustrated in FIG. 13H. Then, the relay node device 10-20 obtains the GW network ID indicated in the received start notification response frame.

In some embodiments, the relay node device 10 that has received the start notification response frame may be configured to decrement the number of hops indicated in the number of hops field instead of shifting the network ID as described above. In this case, the relay node device 10 that has received the start notification response frame refers to the number of hops of the received start notification response frame, and can determine that the received start notification response frame is a start notification response frame addressed to the own node device 10 when the number of hops is "1". In addition, the relay node device that is a destination of the start notification response frame can recognize the number of hops from the gateway device 20 to the own node device 10 from the number of transmission port numbers indicated in the network ID or the GW network ID of the received start notification response frame.

FIG. 14 illustrates an example of each of the node routing management tables.

FIG. 14 illustrates a routing management table 236 for the relay node device 10 of each of the node routing management tables 236.

Each of the node routing management tables 236 includes respective pieces of data of a node number, a priority order, a network ID, the number of hops, and a power supply line flag. The node number indicates an identification number of the relay node device 10. The priority order indicates a priority order of a transmission route of a frame from the gateway device 20 to the relay node device 10. The network ID indicates a transmission route from the gateway device 20 to the relay node device 10. The number of hops indicates the number of hops from the gateway device 20 to the relay node device 10. The power supply line flag is a flag expressed by "1" when the transmission route is a power supply line, or a flag expressed by "0" when the transmission route is not the power supply line but an alternative route.

FIG. 15 illustrates an example of the GW routing management table.

FIG. 15 illustrates the GW routing management table 136 generated by the relay node device 10.

The GW routing management table 136 includes respective pieces of data of routing, a priority order, a GW network ID, the number of hops, and a transmission port number. The routing indicates the routing from the own node device 10 to the gateway device 20. The priority order indicates a priority order of a transmission route of a frame from the own node device 10 to the gateway device 20. The GW network ID indicates a transmission route from the own node device 10 to the gateway device 20. The number of hops indicates the number of hops from the own node device 10 to the gateway device 20. The transmission port number indicates a port number of the own node device 10 that transmits a frame in a corresponding route.

As it is obvious when the respective tables in FIG. 14 and FIG. 15 are referred to, routes and priority orders thereof in a routing management table 236 for each of the relay node devices 10 which is managed by the gateway device 20 have a correspondence relationship with routes and priority orders thereof in a routing management table 136 which is managed by each of the relay node devices. The priority order of a route in each of the tables may be set, for example, such that a route established as a power supply line has a first priority order and a route that has a small number of hops has a higher priority order among routes of second or lower priority orders.

As described above, the gateway device 20 can perform the power supply to each of the relay node devices 10 using the route having a first priority order in each of the node routing management tables 236, and select the route having the first priority order as a route of a frame addressed to each of the relay node devices 10. In addition, each of the relay node devices 10 can select a route having the first priority order in the GW routing management table 136 as a route of a frame addressed to the gateway device 20.

Figure 16:
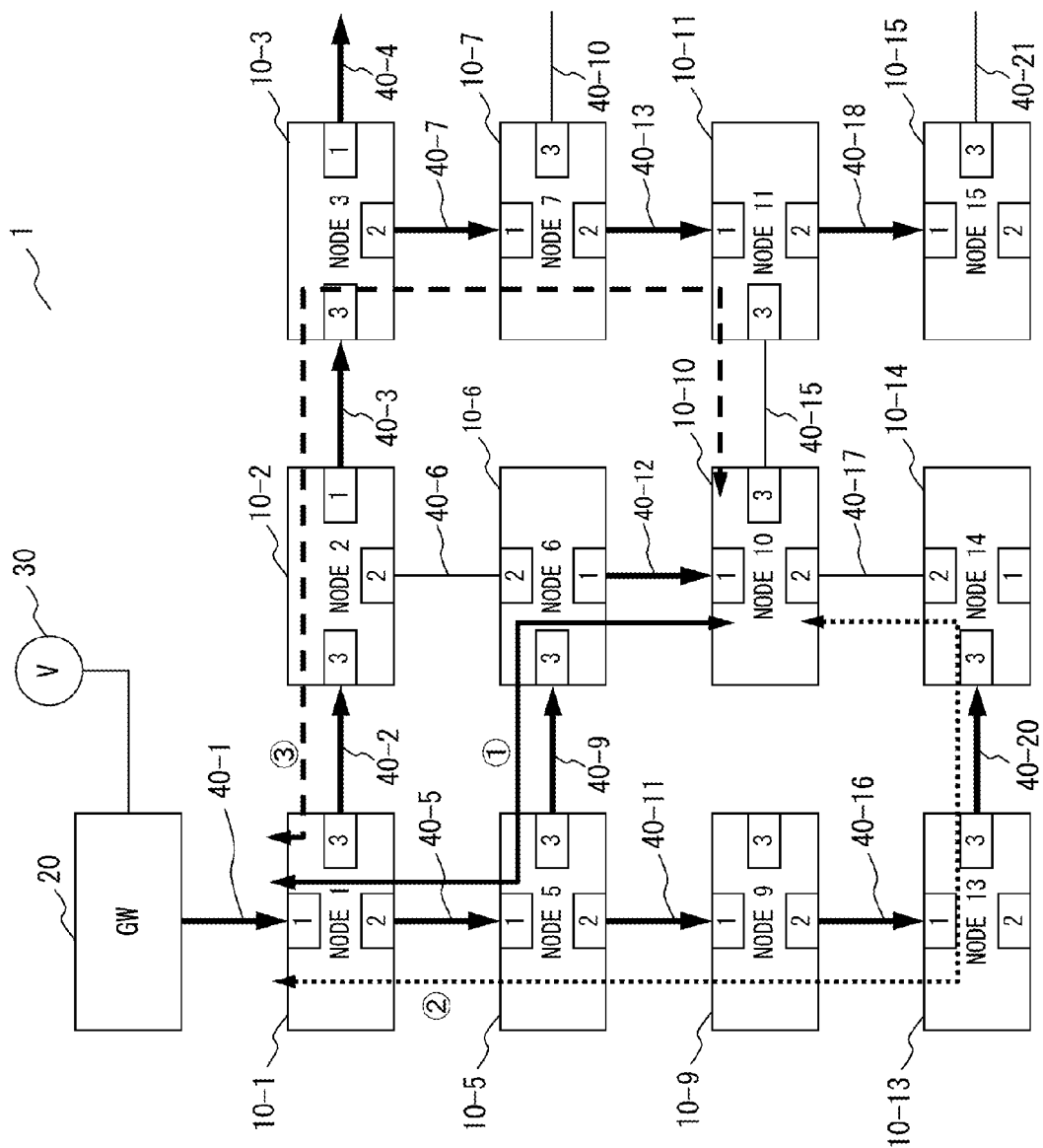
FIG. 16 is a diagram explaining routes stored in the respective tables illustrated in FIG. 14 and FIG. 15.

FIG. 16 is a diagram explaining a route stored in the respective tables in FIG. 14 and FIG. 15. FIG. 16 illustrates a portion of the wired ad-hoc network system 1 illustrated in FIGS. 1A and 1B in order to simplify the description.

The routes having the first to third priority orders as illustrated in the respective tables in FIG. 14 and FIG. 15 respectively correspond to routes expressed by arrows of circled numbers 1-3 in FIG. 16.

For example, transmission ports of respective devices in a route having the first priority order from the gateway device 20 to the relay node device 10-10 are a port P2 of the relay node device 10-1, a port P3 of the relay node device 10-5, a port P1 of the relay node device 10-6, and no transmission port of the relay node device 10-10. Therefore, a network ID having a first priority order in the node routing management table 236 illustrated in FIG. 14 is expressed as "2310FFFFFFFF". Similarly, transmission ports of respective devices in a route having the first priority order from the relay node device 10-10 to the gateway device 20 are a port P1 of the relay node device 10-10, a port P3 of the relay node device 10-6, a port P1 of the relay node device 10-5, and a port P1 of the relay node device 10-1. Therefore, a GW network ID having the first priority order in the GW routing management table 136 illustrated in FIG. 15 is expressed as "1311FFFFFFFF".

The number of hops in the route having the first priority order from the gateway device 20 to the relay node device 10-10 is 4 hops consisting of the relay node device 10-1, the relay node device 10-5, the relay node device 10-6, and the relay node device 10-10. Similarly, the number of hops in the route having the first priority order from the relay node device 10-10 to the gateway device 20 is 4 hops consisting of the relay node device 10-6, the relay node device 10-5, the relay node device 10-1, and the gateway device 20. Accordingly, the number of hops in the route having the first priority order in each of the tables in FIG. 14 and FIG. 15 is "4".

As illustrated in FIG. 9, after the power-on process has been completed, the path 40-1, the path 40-5, the path 40-9, and the path 40-12 are established as a power supply line between the gateway device 20 and the relay node device 10-10. Therefore, a power supply line flag having the first priority order in the GW routing management table 136 in FIG. 15 is "1".

Routes having the second and third priority orders in the respective tables in FIG. 14 and FIG. 15 can be explained similarly to the description above of the route having the first priority order.

As it can be understood from the description above, the power supply controller, the relay node device, the wired ad-hoc network system, and the power supply control method according to the embodiments enable obtaining one or more advantages as described below.

In the embodiments, the respective relay node devices are sequentially powered on and are started, and a needed power supply line to the respective relay node devices is established from among routes spread in a network system. Accordingly, a power supply line from a power supply device to respective relay node devices can be established so as to normally start the respective relay node devices in the wired ad-hoc network system without causing a failure due to a rush current, a voltage drop, or the like.

According to the embodiments, the respective relay node devices in the wired ad-hoc network system are sequentially started. Accordingly, it is possible to prevent message congestion in which the respective started relay node devices simultaneously transmit a start notification message to a gateway device, a server, or the like.

According to the embodiments, a gateway device that is an example of the power supply controller can aggregate data on connection states of ports of the respective relay node devices in power-on processes to the respective relay devices. Accordingly, the power supply controller can obtain a connection state of a network in the wired add-hoc network system by establishing power supply lines to the respective relay node devices.

According to the embodiments, when the respective relay node devices are started, a start notification and a start notification response messages are sequentially transmitted/received between the respective started relay node devices and the gateway device, and a routing path between the gateway device and the respective node devices is learnt. Accordingly, even in a complicatedly incorporated network, the routing path between the gateway device and the respective node devices can be established without mounting, on each of the devices, a device whose power consumption and size are large and that is expensive, such as a Content Addressable Memory (CAM).

According to the embodiments, the power-on process is sequentially performed from a relay node device adjacent to the gateway device. Accordingly, a shortest routing path and an alternative route between the gateway device and the respective relay node devices can be constructed through the power-on process on the respective relay devices.

<Power Supply Line Switching Process>

In the embodiments, the gateway device 20 that is an example of the power supply controller transmits a power-on instruction frame and a power supply stop instruction frame to the relay node device 10, and thereby changes a power supply line established in the wired ad-hoc network system 1.

Figure 17:
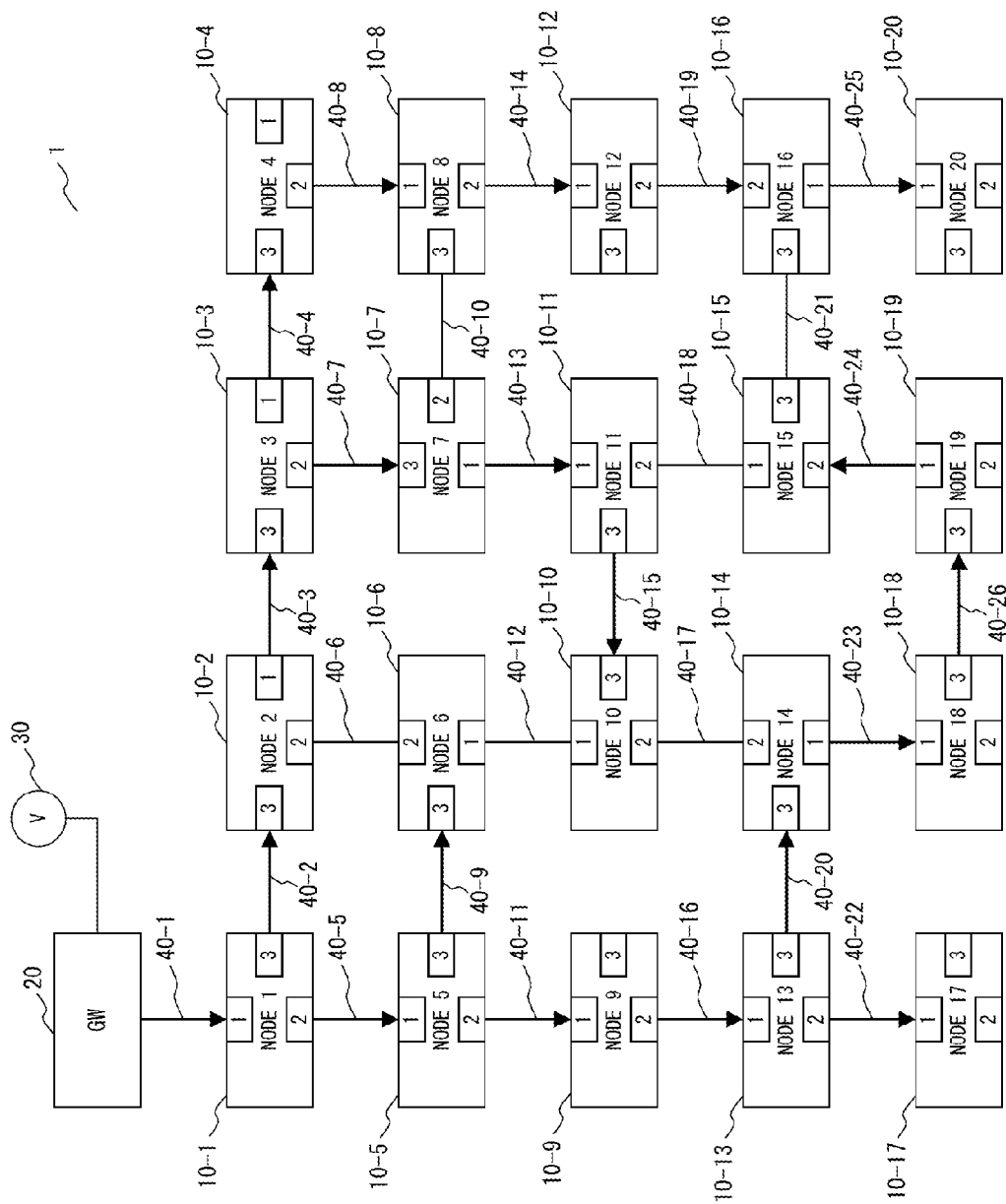
FIG. 17 is a diagram explaining an example of a power supply line switching process.

FIG. 17 is a diagram explaining an example of the power supply line switching process. For example, in order to switch the power supply line illustrated in FIG. 9 to the power supply line illustrated in FIG. 17, the power supply line switching process as described below is performed.

The gateway device 20 transmits, to a relay node device 10-18, a power-on instruction frame for instructing the start of the power supply from the port P3 of the relay node device 10-18.

When the relay node device 10-18 receives the power-on instruction frame, the relay node device 10-18 starts power supply from the port P3. As a result, the relay node device 10-19 receives the power supply from the relay node device 10-18, via the port P3. The relay node device 10-18 transmits, to the gateway device 20, a power-on response frame for reporting that the power supply from the port P3 has been started. A format of the power-on response frame may be a format of the general-purpose command frame illustrated in FIG. 4A.

When the gateway device 20 receives the power-on response frame from the relay node device 10-18, the gateway device 20 transmits, to the relay node device 10-19, the power-on instruction frame for instructing the start of the power supply from the port P1 of the relay node device 10-19.

When the relay node device 10-19 receives the power-on instruction frame, the relay node device 10-19 starts power supply from the port P1. As a result, the relay node device 10-15 receives the power supply from the relay node device 10-19, via the port P2. The relay node device 10-19 transmits, to the gateway device 20, a power-on response frame for reporting that the power supply from the port P1 has been started.

When the gateway device 20 receives the power-on response frame from the relay node device 10-19, the gateway device 20 transmits, to the relay node device 10-15, a power supply stop instruction frame for instructing the stop of the power supply from the port P2 of the relay node device 10-15.

When the relay node device 10-15 receives the power supply stop instruction frame, the relay node device 10-15 stops the power supply from the port P2. As a result, the power supply to the relay node device 10-19 via the port P2 of the relay node device 10-15 is stopped. The relay node device 10-15 transmits, to the gateway device 20, a power supply stop response frame for reporting that the power supply from the port P2 has been stopped. A format of the power supply stop response frame may be a format of the general-purpose frame illustrated in FIG. 4A.

When the gateway device 20 receives the power supply stop response frame from the relay node device 10-15, the gateway device 20 transmits, to the relay node device 10-11, a power supply stop instruction frame for instructing the stop of the power supply from the port P2 of the relay node device 10-11.

When the relay node device 10-11 receives the power supply stop instruction frame, the relay node device 10-11 stops the power supply from the port P2. As a result, the power supply to the relay node device 10-15 via the port P2 of the relay node device 10-11 is stopped. The relay node device 10-11 transmits, to the gateway device 20, a power supply stop response frame for reporting that the power supply to the port P2 has been stopped.

When the gateway device 20 receives the power supply stop response frame from the relay node device 10-11, the gateway device 20 transmits, to the relay node device 10-11, a power-on instruction frame for instructing the start of the power supply from the port P3 of the relay node device 10-11.

When the relay node device 10-11 receives the power-on instruction frame, the relay node device 10-11 starts the power supply from the port P3. As a result, the relay node device 10-10 receives the power supply from the relay node device 10-11, via the port P3. The relay node device 10-11 transmits, to the gateway device 20, a power-on response frame for reporting that the power supply from the port P3 has been started.

When the gateway device 20 receives the power-on response frame from the relay node device 10-11, the gateway device 20 transmits, to the relay node device 10-6, a power supply stop instruction frame for instructing the stop of the power supply from the port P1 of the relay node device 10-6.

When the relay node device 10-6 receives the power supply stop instruction frame, the relay node device 10-6 stops the power supply from the port P1. As a result, the power supply to the relay node device 10-10 via the port P1 of the relay node device 10-6 is stopped. The relay node device 10-6 transmits, to the gateway device 20, a power supply stop response frame for reporting that the power supply from the port P1 has been stopped.

The gateway device 20 receives the power supply stop instruction frame from the relay node device 10-6, and determines that the power supply line switching process has been completed.

The power supply switching process described above enables switching the power supply line illustrated in FIG. 9 to the power supply line illustrated in FIG. 17.

Further, according to the embodiments, the gateway device 20 can change the power to be supplied only to a needed route in the wired ad-hoc network system 1 by transmitting the power-on instruction frame and the power supply stop instruction frame to the relay node device 10.

Figure 18:
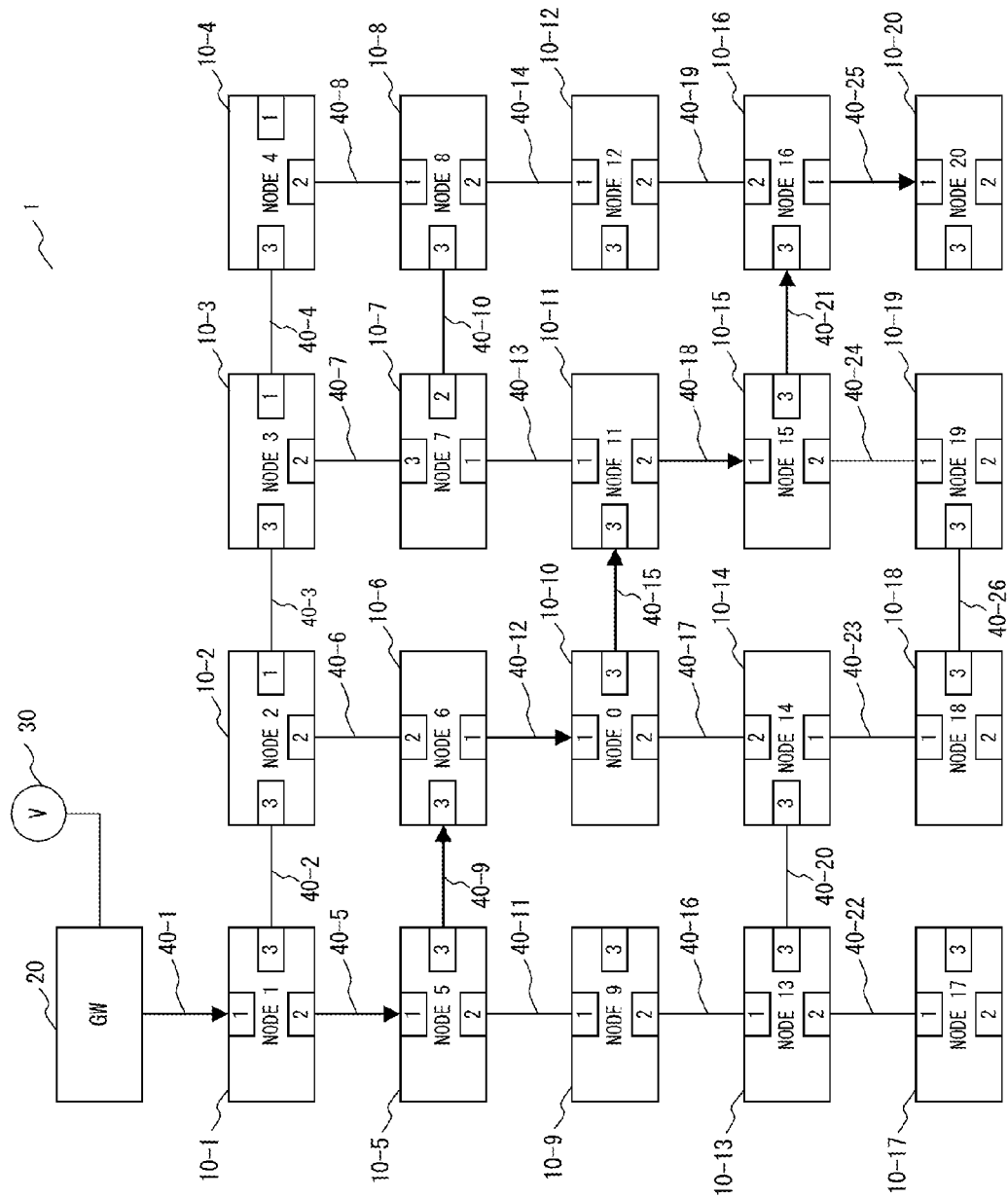
FIG. 18 is a diagram explaining an example of a power supply line switching process only to needed paths.

FIG. 18 is a diagram explaining an example of a process of switching power supply lines so as to supply power only to the needed route. As a result of the power supply line switching process as described above with reference to FIG. 17, it is possible to switch, for example, the power supply line illustrated in FIG. 9 to the power supply line illustrated in FIG. 18. In FIG. 18, the power supply lines are switched such that only the paths 40-1, 40-5, 40-9, 40-12, 40-15, 40-18, 40-21, and 40-25 become the power supply line. As a result of this, only the relay node devices 10-1, 10-5, 10-6, 10-10, 10-11, 10-15, 10-16, and 10-20 are started, and the other relay node devices are stopped.

As described above, the embodiments enables dealing with a failure occurring in the power supply line by switching the power supply line in the wired ad-hoc network to an alternative route if needed.

In addition, the embodiments enables reducing power consumption in the wired ad-hoc network system by using only a needed power supply line in the wired ad-hoc network system. Furthermore, even if a power supply device does not have a power capacity needed for starting all of the devices in the wired ad-hoc network system, it is possible to realize the desired operation of the wired ad-hoc network system within the power capacity of the power supply device.

<Failure Detection Process and Routing Change Process>

As described above, in the embodiments, the gateway device 20 can manage the power supply line to the respective relay node devices 10 using the each of the node routing management tables 236 in which data is collected and stored through the power supply process according to the embodiments.

In addition, the gateway device 20 can manage the routing of a frame transmitted from the own device 20 to the respective relay node devices 10 using the respective node routing management table 236. The respective relay node devices 10 can manage the routing of a frame transmitted from the own node device 10 to the gateway device 20 using the GW routing management table 136 in which data is collected and stored through the power supply process according to the embodiments.

Therefore, for example, the gateway device 20 can perform control such that the power supply to the respective relay node devices 10 is performed along a route having the first priority order in the respective node routing management tables 236, and select the route having the first priority order as a transmission route of a frame addressed to the respective relay node devices 10. The respective relay node devices 10 can select a route having the first priority order in the GW routing management table 136 as a transmission route of a frame addressed to the gateway device 20.

In addition, when a failure occurs in a route established as a power supply line, the gateway device 20 refers to each of the node routing management tables 236, and can perform control such that the power supply to the relay node device 10 is performed using a route having the second priority order that is an alternative route of the power supply line in which a failure has occurred, and select the route having the second priority order as a transmission route of a frame addressed to the relay node device 10. Each of the relay node devices 10 refers to the GW routing management table 136, and can select a route having the second priority order that is an alternative route of the power supply line in which a failure has occurred as a transmission route of a frame addressed to the gateway device 20.

Described below are examples of a failure detection method and a routing change method according to the embodiments when a failure occurs in a path being used for a frame transmission between the relay node device 10 and the gateway device 20.

In the description below, as an example, assume that a power supply line of the wired ad-hoc network system 1 has been established as illustrated in FIG. 9 and FIG. 16 illustrating a portion of FIG. 9. Assume that the gateway device 20 includes the routing management table 236 illustrated in FIG. 14 as a routing management table 236 for the relay node device 10-10. Assume that the relay node device 10-10 includes the GW routing management table 136 illustrated in FIG. 15 as a GW routing management table 136.

Figure 19:
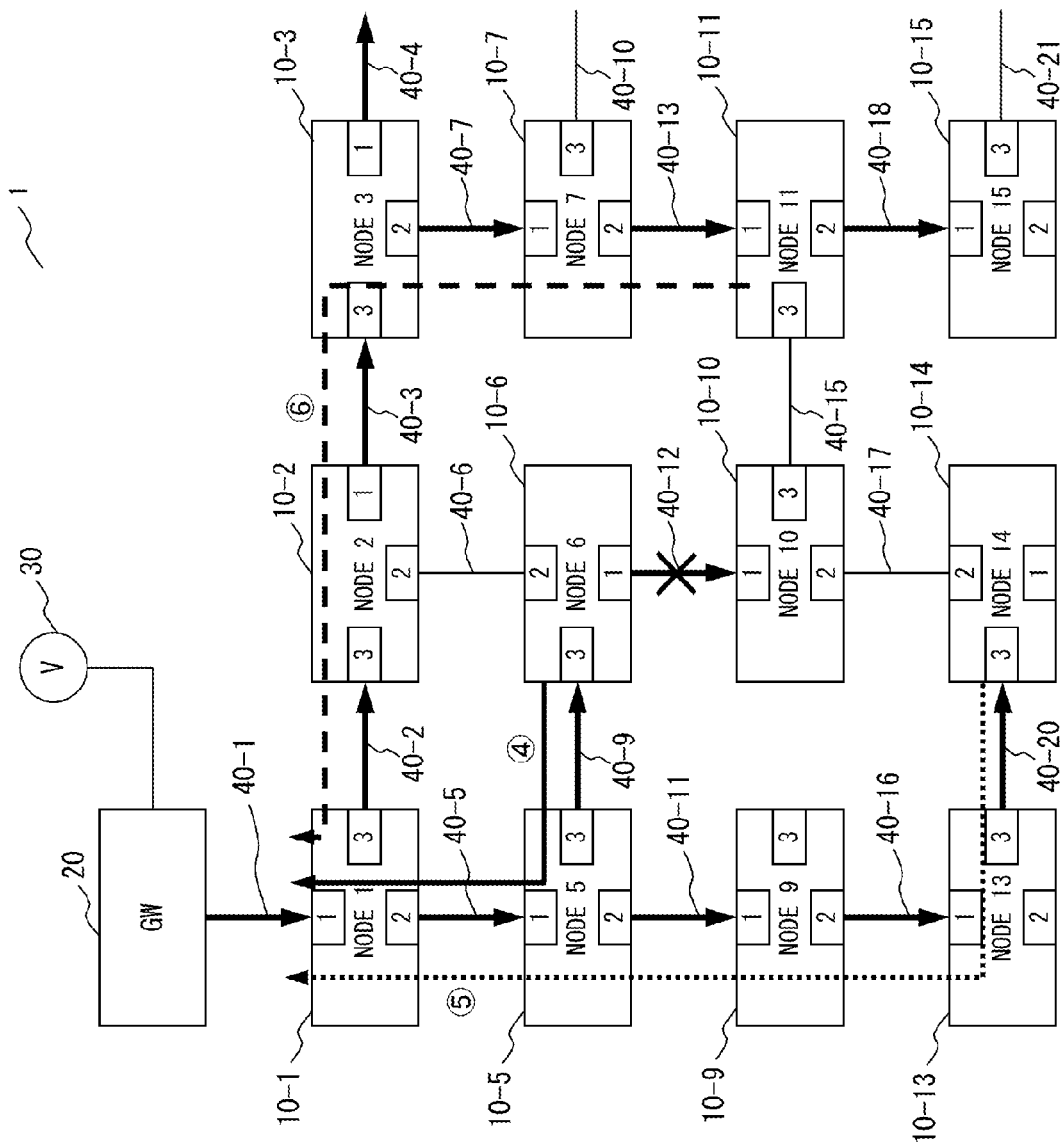
FIG. 19 is a diagram explaining a failure detection process and a routing change process according to an embodiment when a power supply failure occurs.
Figure 20A:
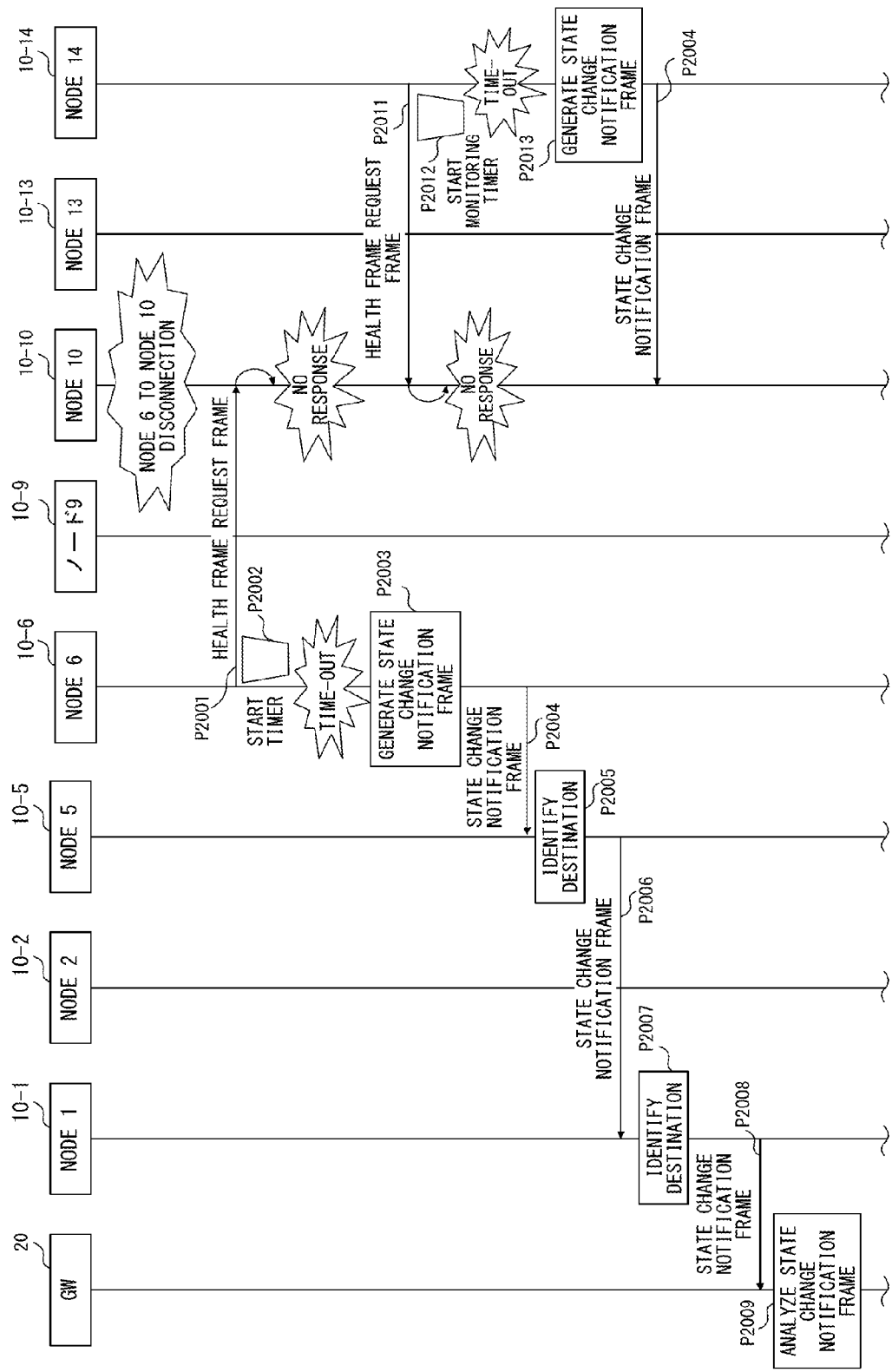
FIGS. 20A-20D illustrate an example of a sequence of a failure detection process and a routing change process according to an embodiment when a power supply failure occurs.
Figure 20B:
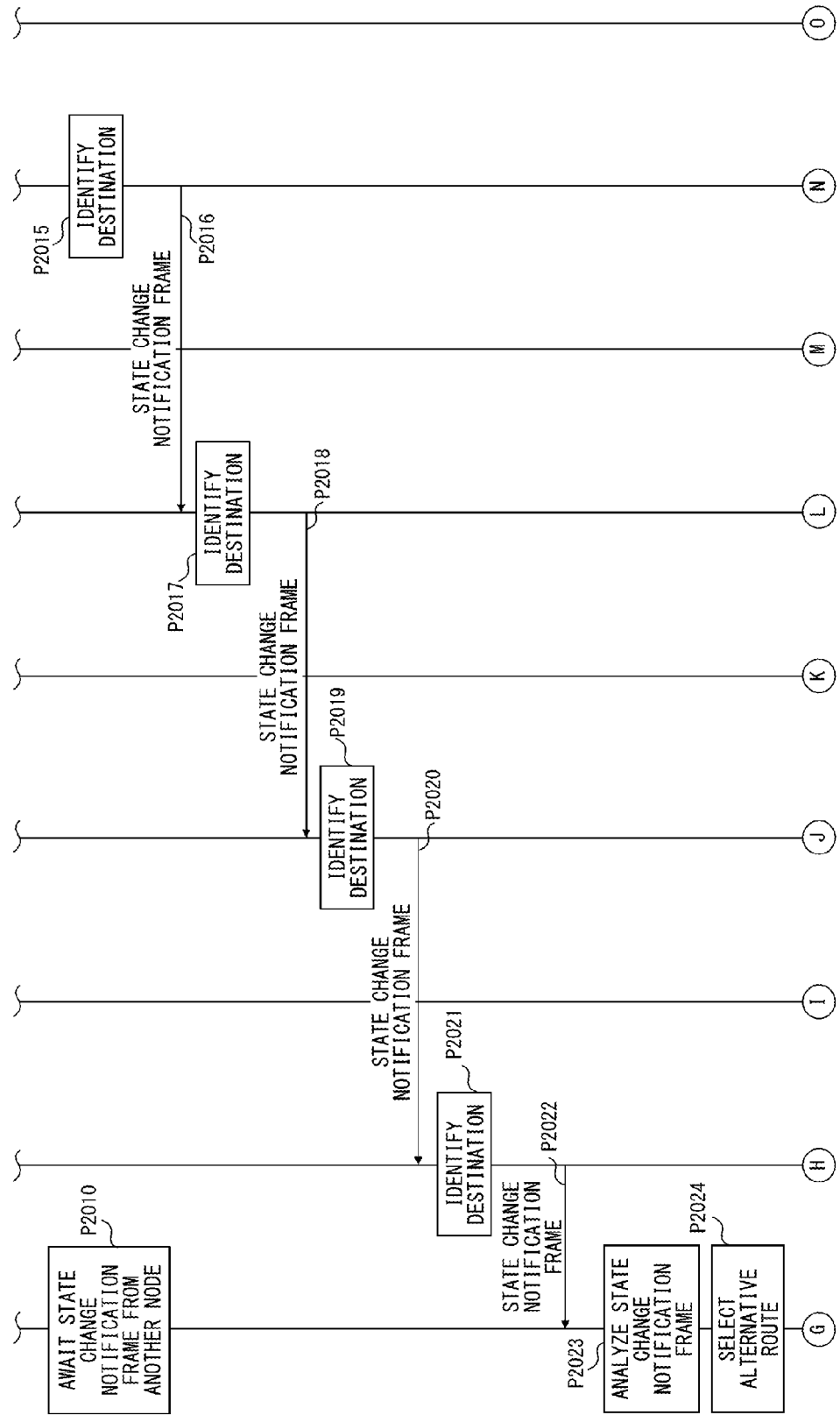
Figure 20C:
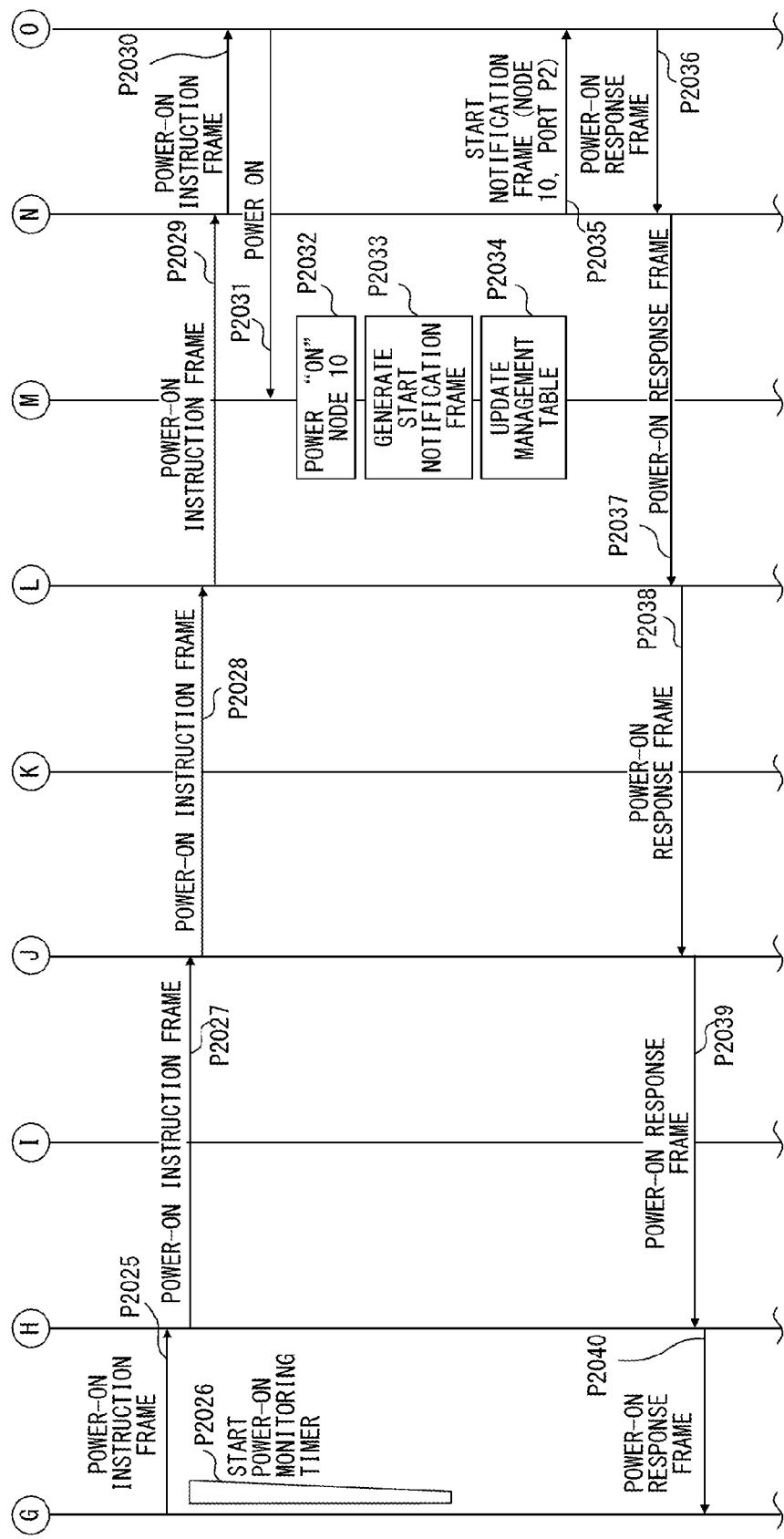
Figure 20D:
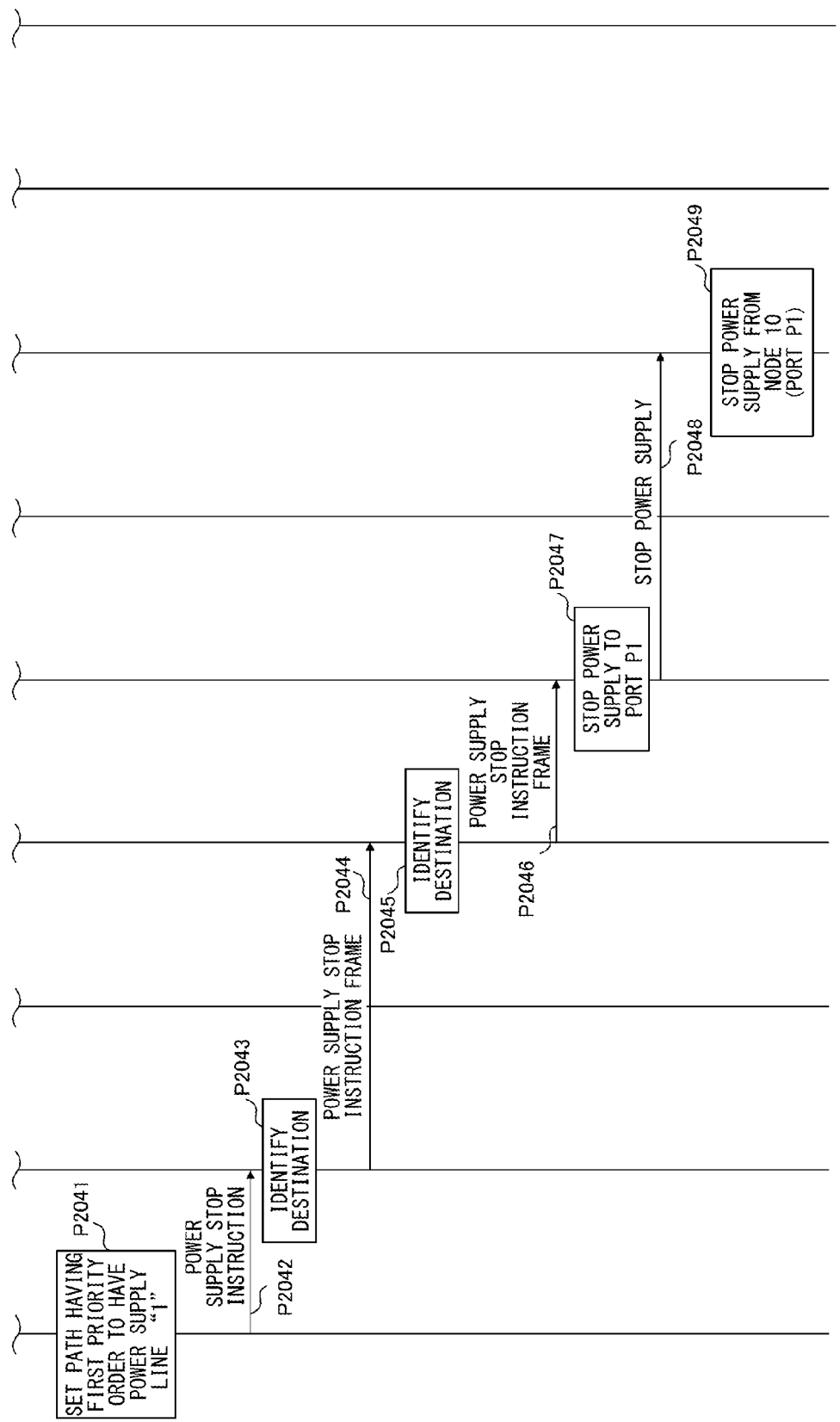
Figure 24C:
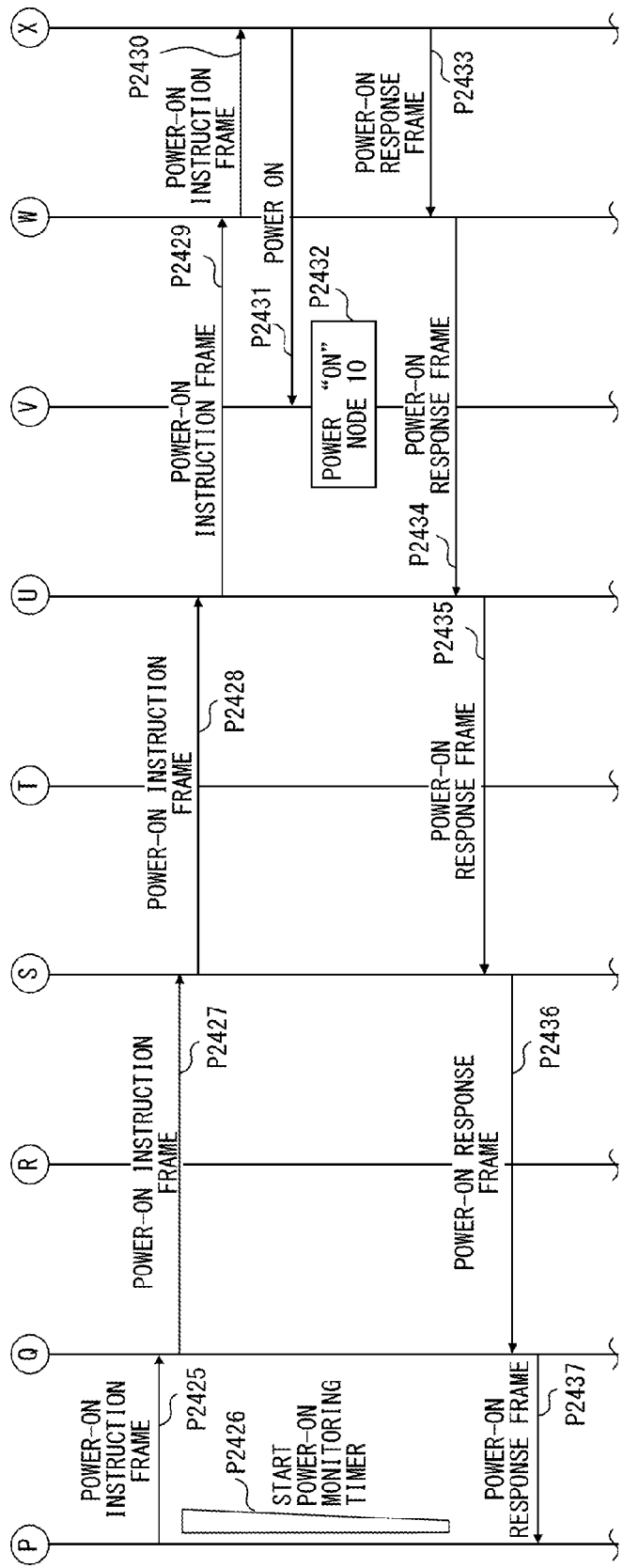

First, as a first specific example, a case in which a power supply failure has occurred in a path connecting between adjacent relay node devices is described. FIG. 19 is a diagram explaining a failure detection process and a routing change process according to the embodiments when the power supply failure has occurred. FIGS. 20A-20D illustrate an example of a sequence of the failure detection process and the routing change process according to the embodiments when the power supply failure has occurred.

After the power supply line as illustrated in FIG. 9 and FIG. 16 has been established, each of the relay node devices 10 transmits the health frame request frame as illustrated in FIG. 4D from each port of the own node device to an adjacent node device 10 at prescribed time intervals. When the adjacent relay node device 10 receives the health frame request frame, the adjacent relay node device 10 transmits the health frame as illustrated in FIG. 4D from a port of the own node device from which the health frame request frame has been received.

Each of the relay node devices 10 can identify relay node devices that are adjacent via the respective ports of the own node device, from the GW network ID stored in the GW routing management table 136. Accordingly, when the relay node device 10 receives the health frame from the port from which the health frame request frame has been transmitted, the relay node device 10 determines that the relay node device 10 adjacent via the port from which the health frame request has been transmitted, and a path 40 between the own node device and the relay node device 10 are normal. On the other hand, when the relay node device 10 does not receive the health frame when a prescribed time passes after the transmission of the health frame request frame, the relay node device 10 determines that a failure has occurred in the relay node device 10 adjacent via the port from which the health frame request frame has been transmitted, or the path 40 between the own node device and the relay node device 10.

For example, as illustrated in FIG. 19, assume that a failure has occurred in a power supply function of the path 40-12 due to a disconnection of the path 40-12 connecting the relay node device 10-6 and the relay node device 10-10, or the like. In this case, the relay node device 10-10 that is receiving the power supply from the relay node device 10-6 along the path 40-12 goes down.

When the relay node device 10-10 goes down as described above, even when the relay node device 10-6 transmits a health frame request frame from the port P1 (p2001) along with starting the timer 138 (p2002), it is impossible for the relay node device 10-6 to receive a health frame from the port P1 within a prescribed time period during which the timer 138 performs monitoring.

In view of this, the routing controller 135 of the relay node device 10-6 generates a state change notification frame as illustrated in FIG. 4H for notifying the gateway device 20 of the occurrence of a failure in a connection state of the port P1 of the own node device (p2003). A GW network ID of the generated state change notification frame is a GW network ID having the first priority order in the GW routing management table 136, e.g., an ID of a transmission route to which a circled number 4 is assigned in FIG. 19.

The relay node device 10-6 transmits the generated state change notification frame (p2004), and the relay node device 10-5 and the relay node device 10-1 in the transmission route each identify the destination of the received state change notification frame, and transfer the state change notification frame (p2005-p2008). Then, the gateway device 20 receives the state change notification frame from the relay node device 10-6.

The routing controller 235 of the gateway device 20 refers to the received state change notification frame, and recognizes that a failure has occurred in a connection state of the transmission port P1 of the relay node device 10-6 and that a connection destination of the transmission port P1 is the relay node device 10-10 (p2009).

The routing controller 235 awaits the reception of the state change notification frames from relay node devices 10-11 and 10-14 adjacent to the relay node device 10-10 for a prescribed time period in order to determine whether a cause of the failure in the connection state of the transmission port P1 of the relay node device 10-6 is a failure in a power supply function or a failure in a communication function between the relay node device 10-6 and the relay node device 10-10 (p2010). When the state change notification frames from the relay node devices 10-11 and 10-14 are not received even after a prescribed time period passes, the routing controller 235 determines that the cause is the failure in the communication function between the relay node device 10-6 and the relay node device 10-10 because the relay node device 10-10 is normally communicating with the relay node devices 10-11 and 10-14.

In this specific example, the relay node device 10-10 has gone down due to the occurrence of a failure in the power supply function of the path 40-12. Therefore, even when the relay node device 10-14 transmits a health frame request frame from the power P2 (p2011) along with starting the timer 138 (p2012), it is impossible for the relay node device 10-14 to receive a health frame from the port P2 within a prescribed time period during which the timer 138 performs monitoring.

The relay node device 10-14 generates a state change notification frame for notifying the gateway device 20 of the occurrence of a failure in a connection state of the port P2 of the own node device (p2013). A GW network ID of the generated state change notification frame is a GW network ID having the first priority order in the GW routing management table 136 managed by the relay node device 10-14, e.g., an ID of a transmission route to which a circled number 5 is assigned in FIG. 19.

The relay node device 10-14 transmits the generated state change notification frame (p2014), and the relay node devices 10-13, 10-9, 10-5, and 10-1 in the transmission route each identify a destination of the received state change notification frame and transfers the state change notification frame (p2015-p2022). Then, the gateway device 20 receives the state change notification frame from the relay node device 10-14.

The routing controller 235 of the gateway device 20 refers to the received state change notification frame, and recognizes that a failure has occurred in a connection state of the transmission port P2 of the relay node device 10-14 and that a connection destination of the transmission port P2 is the relay node device 10-10 (p2023).

The relay node device 10-11 becomes in a state similar to that of the relay node device 10-14, and the relay node device 10-11 transmits a state change notification frame to the gateway device 20 along a transmission route to which a circled number 6 is assigned in FIG. 19 (not illustrated in FIGS. 20A-20D). The routing controller 235 of the gateway device 20 refers to the received state change notification frame, and recognizes that a failure has occurred in a connection state of the transmission port P3 of the relay device 10-11 and that a connection destination of the transmission port P3 is the relay node device 10-10.

The routing controller 235 receives the state change notification frames that are respectively transmitted from the relay node devices 10-6, 10-14, and 10-11 so as to determine that a failure cause indicated in each of the state change notification frames is a failure in a power supply line from the relay node device 10-6 to the relay node device 10-10.

The routing controller 235 refers to the routing management table 236 for the relay node device 10-10. Then, as illustrated in FIG. 21, the routing controller 235 deletes a transmission route having the first priority order that is a power supply line, and moves up transmission routes having the second or lower priority orders. The routing controller 235 selects a transmission route having the first priority order after the moving up as a new power supply line (p2024).

The routing controller 235 starts a routing change process of setting the transmission route having the first priority order after the moving up as a power supply line. In this specific example, the transmission route having the first priority order after the moving up is a route to which a circled number 2 is assigned in FIG. 16. In the route to which the circled number 2 is assigned in FIG. 16, a path in which a power supply line illustrated by an arrow has not been established is a path 40-17 from the relay node device 10-14 to the relay node device 10-17. Therefore, the routing controller 235 generates and transmits a power-on instruction frame, which is addressed to the relay node device 10-14 (p2025), for instructing the start of the power supply from the power P2 of the relay node device 10-14 along with starting the timer (p2026).

The relay node devices 10-1, 10-5, 10-9, and 10-13 perform a relay process on the power-on instruction frame transmitted from the gateway device 20 (p2027-p2030), and the relay node device 10-14 receives the power-on instruction frame.

The power supply controller 137 of the relay node device 10-14 starts the timer 138 in order to monitor whether a start notification frame is received within a prescribe time period, and sets a switch S2 to be in an on state and starts the power supply from the port P2 in accordance with the received power-on instruction frame (p2031).

The relay node device 10-10 receives the power supply from the port P2 of the relay node device 10-14, from the port P2 via the path 40-17, and is started (p2032). The routing controller 135 of the relay node device 10-10 generates a start notification frame (p2033), and updates the GW routing management table 136 (p2034). For example, as illustrated in FIG. 22, the routing controller 135 deletes data of a transmission route having the first priority order, moves up pieces of data of transmission routes having the second and lower priority orders, and thereby performs change so as to provide a first priority order to a transmission route from the port P2 that has received power supply.

The relay node device 10-10 transmits the generated start notification frame to the relay node device 10-14 (p2035). The relay node device 10-14 receives the start notification frame from the relay node device 10-10, and thereby determines that the relay node device 10-10 has received power supply and has been started.

The relay node device 10-14 transmits a power-on response frame addressed to the gateway device 20 (p2036). The relay node devices 10-13, 10-9, 10-5, and 10-1 performs a relay process on the power-on response frame transmitted via the port P3 of the relay node device 10-14 (p2037-p2040), and the gateway device 20 receives the power-on response frame.

The routing controller 235 of the gateway device 20 refers to the received power-on response frame, and determines that the relay node device 10-10 has been started in response to the power supply from the port P2 of the relay node device 10-14. Then, the routing controller 235 sets a power supply line flag of the transmission route having the first priority order after the moving up to "1" (p2041).

The gateway device 20 generates and transmits a power supply stop instruction frame for instructing the stop of the power supply from the port P1 of the relay node device 10-6 (p2042). The relay node device 10-1 and the relay node device 10-5 each identify a destination of the received power supply stop instruction frame, and transfer the power supply stop instruction frame (p2043-p2046). Then, the relay node device 10-6 receives the power supply stop instruction frame from the gateway device 20.

The power supply controller 137 of the relay node device 10-6 stops the power supply from the port P1 in accordance with the instruction of the received power supply stop instruction frame (p2047). As a result, the power supply to the port P1 of the relay node device 10-1 via the port P1 of the relay node device 10-6 is stopped (p2048 and p2049).

As described above, the embodiments enables detecting a failure in a power supply line that has occurred in a wired ad-hoc network system and appropriately switching the power supply line to an alternative route.

As a second specific example, described next is a case in which a failure occurs in a communication function of a relay node device adjacent to an own node device. FIG. 23 is a diagram explaining a failure detection process and a routing change process according to the embodiments when a communication failure has occurred. FIGS. 24A-24D illustrate an example of a sequence of the failure detection process and the routing change process according to the embodiments when the communication failure has occurred.

For example, as illustrated in FIG. 23, assume that a failure has occurred in a communication function of the relay node device 10-6. In this case, it is impossible for the relay node device 10-10 to receive a frame via the path 40-12, but it is possible to receive the power supply from the relay node device 10-6 via the path 40-12.

When a failure occurs in the communication function of the relay node device 10-6, even when the relay node device 10-5 transmits a health frame request frame from the port P3 (p2401) along with starting the timer 138 (p2402), it is impossible for the relay node device 10-5 to receive a health frame from the port P3 within a prescribed time period during which the timer 138 performs monitoring.

In view of this, the routing controller 135 of the relay node device 10-5 generates a state change notification frame for notifying the gateway device 20 of the occurrence of a failure in a connection state of the port P3 of the own node device (p2403). A GW network ID of the generated state change notification frame is a GW network ID having the first priority order in a GW routing management table 136 managed by the relay node device 10-5, e.g., an ID of a transmission route to which a circled number 7 is assigned in FIG. 23.

The relay node device 10-5 transmits the generated state change notification frame (p2404), and the relay node device 10-1 in the transmission route identifies a destination of the received state change notification frame, and transfers the state change notification frame (p2405-p2406). Then, the gateway device 20 receives the state change notification frame from the relay node device 10-5.

The routing controller 235 of the gateway device 20 refers to the received state change notification frame, and recognizes that a failure has occurred in a connection state of the transmission port P3 of the relay node device 10-5 and that a connection destination of the transmission port P3 is the relay node device 10-6 (p2407).

The routing controller 235 awaits the reception of state change notification frames from the relay node devices 10-2 and 10-10 adjacent to the relay node device 10-6 for a prescribed time period in order to determine whether a cause of the failure in the connection state of the transmission port P3 of the relay node device 10-5 is a failure in a power supply function between the relay node device 10-5 and the relay node device 10-6 or a failure in a communication function (p2408). When the state change notification frames from the relay node devices 10-2 and 10-10 are received within the prescribed time period, power is normally supplied to the relay node device 10-10, and therefore the routing controller 235 determines that the cause is the failure in the communication function of the relay node device 10-6. When only the state change notification frame from the relay node device 10-2 is received within the prescribed time period, the routing controller 235 determines that the cause is the failure in the power supply function between the relay node device 10-5 and the relay node device 10-6.

In this specific example, a failure has occurred in the communication function of the relay node device 10-6. Therefore, even when the relay node device 10-10 transits a health frame request frame from the port P1 (p2409) along with starting the timer 138 (p2410), it is impossible for the relay node device 10-10 to receive a health frame from the port P1 within a prescribed time period during which the timer 138 performs monitoring.

The relay node device 10-10 generates a state change notification frame for notifying the gateway device 20 of the occurrence of a failure in a connection state of the port P1 of the own node device (p2411). For example, when the relay node device 10-10 includes the GW network management table 136 illustrated in FIG. 15, in this specific example, a failure has occurred in a transmission route having the first priority order in the GW routing management table 136. Therefore, similarly to the GW routing management table 136 illustrated in FIG. 22, the routing controller 135 of the relay node device 10-10 deletes data of the transmission route having the first priority order, and moves up pieces of data of transmission routes having the second or lower priority orders. Then, the routing controller 135 uses a transmission route having the first priority order after the moving up that is expressed by an ID of a transmission route to which a circled number 8 is assigned in FIG. 23 as a GW network ID of the generated state change notification frame.

The relay node device 10-10 transmits the generated state change notification frame (p2412), and the relay node devices 10-14, 10-13, 10-9, 10-5, and 10-1 in the transmission route each identify a destination of the received state change notification frame, and transfers the state change notification frame (p2413-p2422). Then, the gateway device 20 receives the state change notification frame from the relay node device 10-10.

The routing controller 235 of the gateway device 20 refers to the received state change notification frame, and recognizes that a failure has occurred in the connection state of the transmission port P1 of the relay node device 10-10 and that a connection destination of the transmission port P1 is the relay node device 10-6 (p2423).

The relay node device 10-2 becomes in a state similar to that of the relay node device 10-10, and the relay node device 10-2 transmits a state change notification frame to the gateway device 20, for example, in a transmission route to which a circled number 9 is assigned in FIG. 23 (not illustrated in FIGS. 24A-24D). The routing controller 235 of the gateway device 20 refers to the received state change notification frame, and recognizes that a failure has occurred in a connection state of a transmission port P2 of the relay node device 10-2 and that a connection destination of the transmission port P2 is the relay node device 10-6.

The routing controller 235 receives the state change notification frames that have been transmitted respectively from the relay node devices 10-5, 10-10, and 10-2, and thereby determines that a failure cause indicated in each of the state change notification frames is a failure in the communication function of the relay node device 10-6.

The routing controller 235 refers to a routing management table 236 for the relay node device 10-10. Then, similarly to the routing management table 236 illustrated in FIG. 21, the routing controller 235 deletes a transmission route having the first priority order that is a power supply line, and moves up transmission routes having the second or lower priority orders. The routing controller 235 selects the transmission route having the first priority order after the moving up as a new power supply line (p2424). In this specific example, a failure has not occurred in the power supply function, and therefore, in some embodiments, the routing controller 235 may use the transmission route having the first priority order as a power supply line, and perform change to move up the priority orders of transmission routes having the second or lower priority orders.

The routing controller 235 starts a routing change process of setting the transmission route having the first priority order after the moving up to be a power supply line. In this specific example, the transmission route having the first priority order after the moving up is a route to which a circled number 2 is assigned in FIG. 16. In the route to which the circled number 2 is assigned in FIG. 16, a path in which a power supply line illustrated by an arrow is not established is a path 40-17 from a relay node device 10-14 to a relay node device 10-17. Therefore, the routing controller 235 starts the timer (p2426), and generates and transmits a power-on instruction frame for instructing the start of the power supply from a port P2 of the relay node device 10-14 (p2425).

A relay process for the power-on instruction frame transmitted from the gateway device 20 is performed in the relay node devices 10-1, 10-5, 10-9, and 10-10 (p2427-p2430), and the relay node device 10-14 receives the port-on instruction frame.

The power supply controller 137 of the relay node device 10-14 sets a switch S2 to be in an on state in accordance with the received power-on instruction frame, and starts the power supply from the port P2 (p2431). The relay node device 10-10 receives the power supply from the port P2 of the relay node device 10-14, from the port P2 via the path 40-17 (p2432).

The relay node device 10-14 transmits a power-on response frame for reporting that the power supply via the port P2 has been started (p2433). Then, a relay process for the power-on response frame transmitted from the relay node device 10-14 is performed in the relay node devices 10-13, 10-9, 10-5, and 10-1 (p2434-p2437), and the gateway device 20 receives the power-on response frame.

The routing controller 235 of the gateway device 20 refers to the received power-on response frame, and determines that the power supply from the port P2 of the relay node device 10-14 has been started. Then, the routing controller 235 sets a power supply line flag of the transmission route having the first priority order after the moving up to "1", as illustrated in FIG. 21 (p2438).

The gateway device 20 generates and transmits a power supply stop instruction frame for instructing the stop of the power supply form the port P3 of the relay node device 10-5 (p2439). The relay node device 10-1 identifies a destination of the received power supply stop instruction frame, and transfers the power supply stop instruction frame (p2440-p2441). Then, the relay node device 10-5 receives the power supply stop instruction frame from the gateway device 20.

The power supply controller 137 of the relay node device 10-5 stops the power supply from the port P3 in accordance with the instruction of the received power supply stop instruction frame (p2442). As a result, the power supply to the relay node device 10-6 via the port P3 of the relay node device 10-5 is stopped (p2443), and the relay node device 10-6 being started is stopped (p2444).

The relay node device 10-5 generates and transmits a power supply stop response frame for indicating that the power supply from the port P3 has been stopped (p2445). A relay process for the power supply stop response frame is performed in the relay node device 10-1 (p2446), and the gateway device 20 receives the power supply stop response frame.

The routing controller 235 of the gateway device 20 receives the power supply stop response frame and thereby determines that the relay node device 10-6 has been stopped by stopping the power supply from the port P3 of the relay node device 10-5. Then, the routing controller 235 adds data indicating that the relay node device 10-6 is not working to a routing management table 136 for the relay node device 10-6 (p2447).

As described above, the embodiments enables detecting a communication failure that has occurred in a wired ad-hoc network system and appropriately switching a power supply line and/or a communication path to an alternative route.

<Failure Recovery Detection Process and Routing Change Process>

In the embodiments, when a failure in a power supply function and/or a communication function as described above that has occurred in the wired ad-hoc network system has been recovered, it is possible to detect a failure recovery and return the transmission route to a transmission route before the occurrence of the failure.

Figure 25:
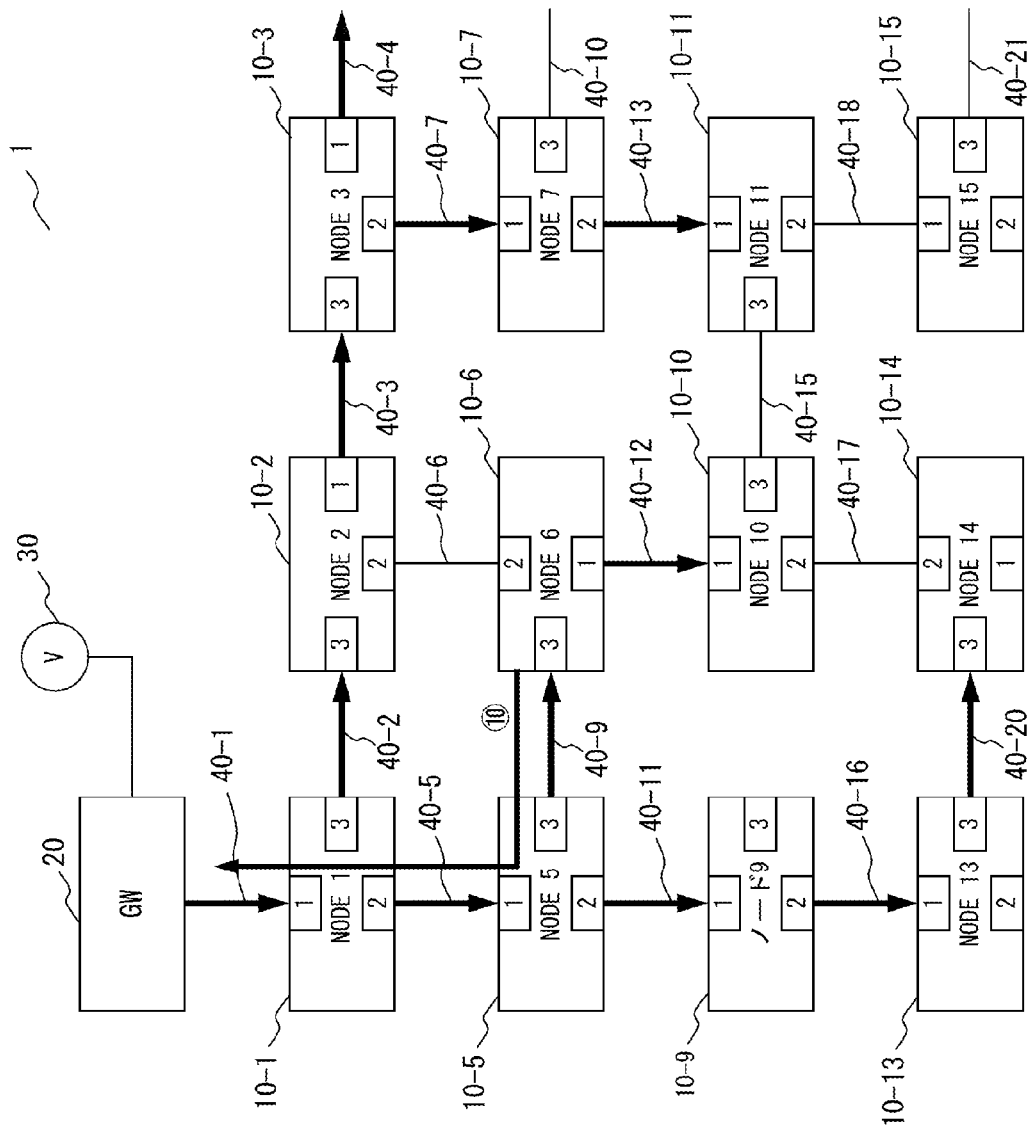
FIG. 25 is a diagram explaining a failure recovery detection process and a routing change process according to an embodiment.
Figure 26A:
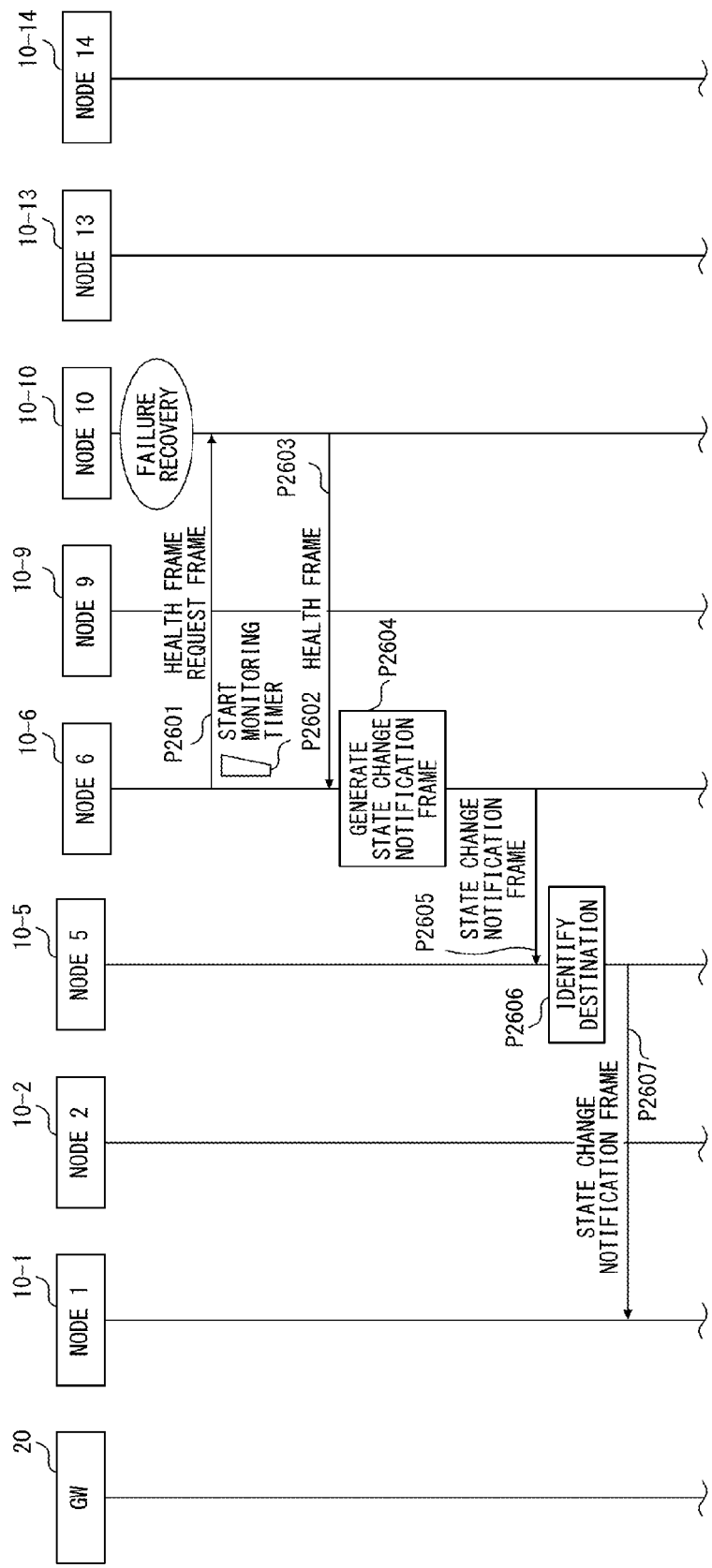
FIGS. 26A-26D illustrate an example of a routing change process sequence in failure recovery according to an embodiment.
Figure 26B:
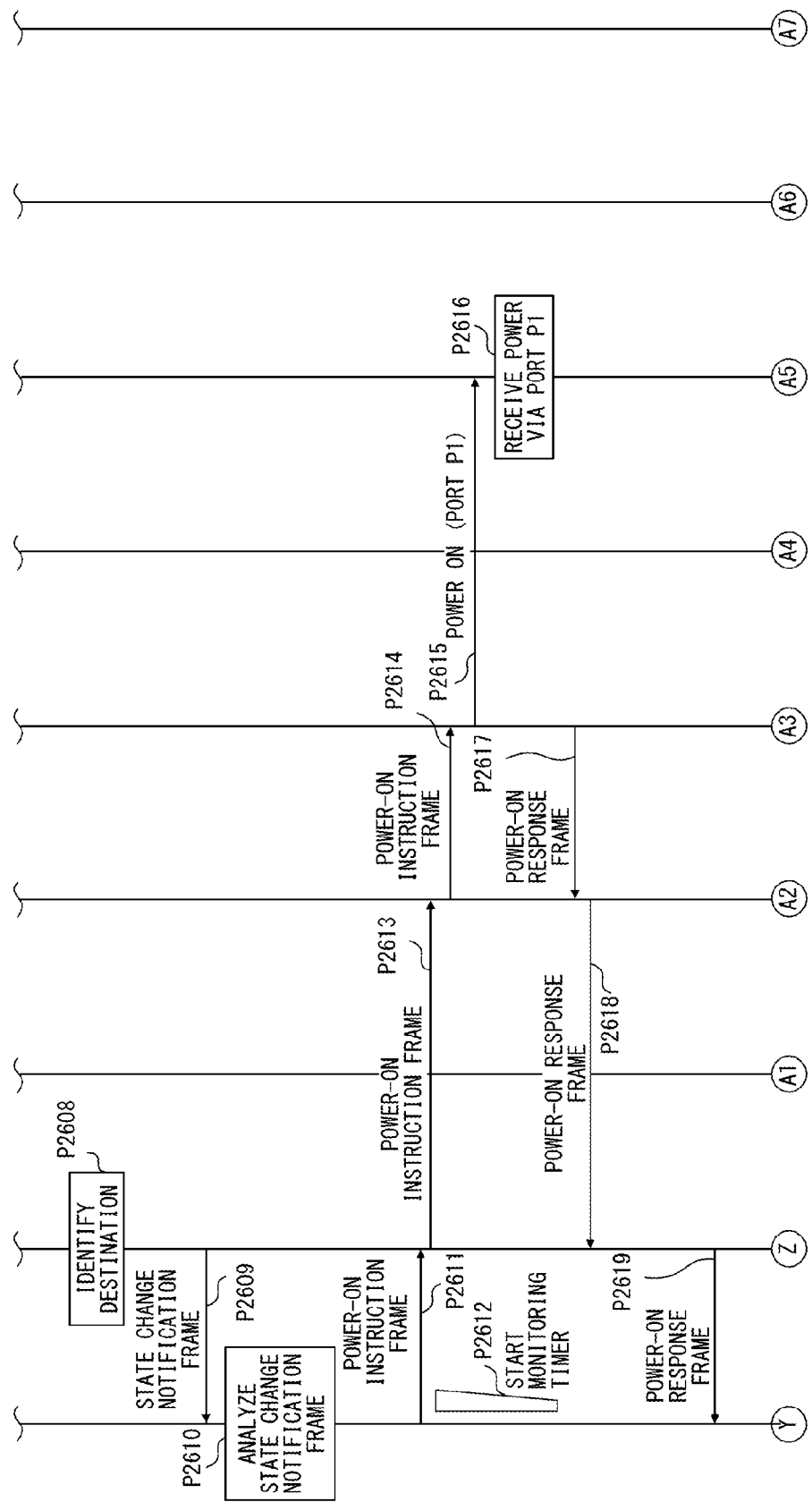
Figure 26C:
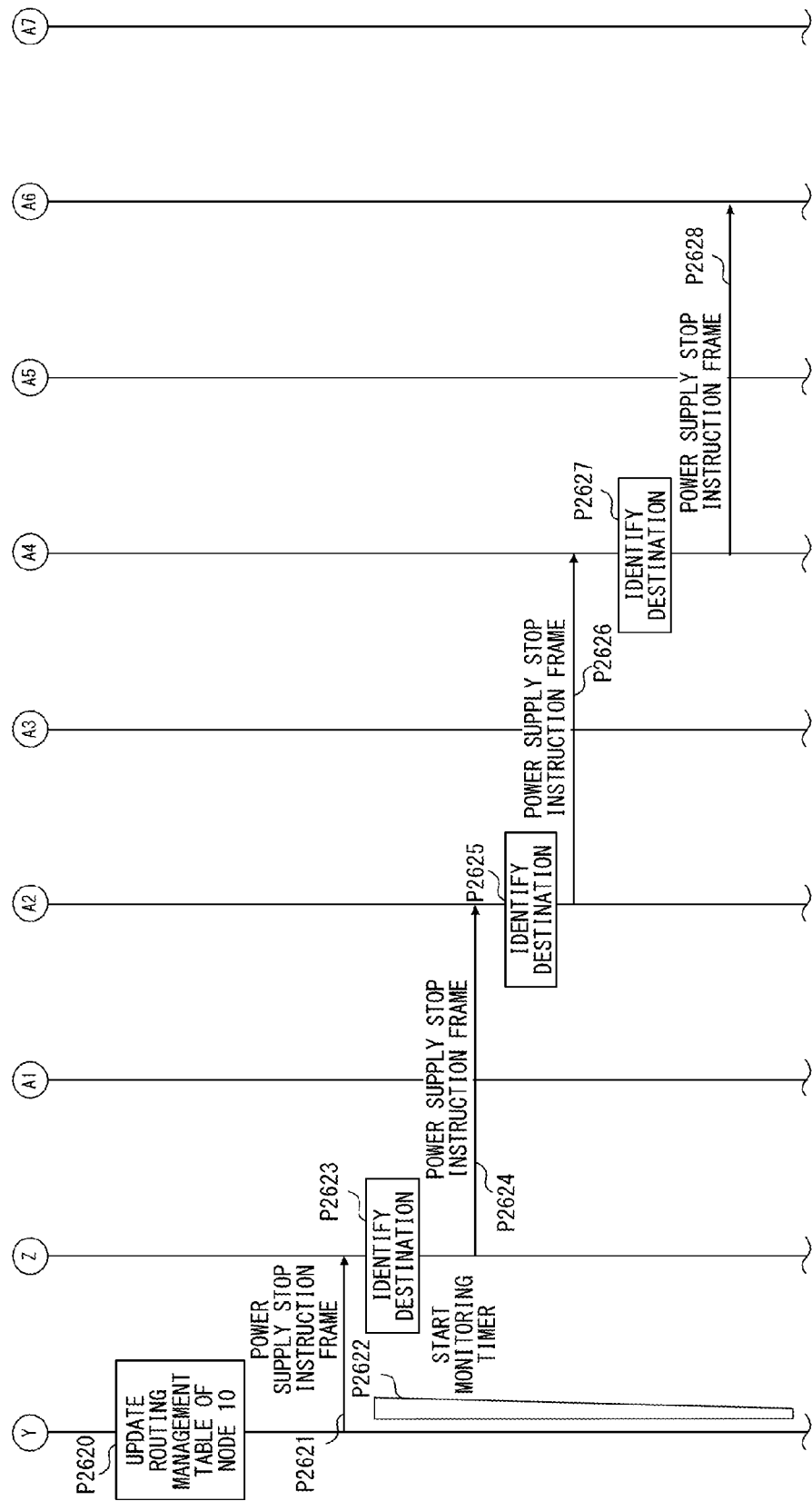
Figure 26D:
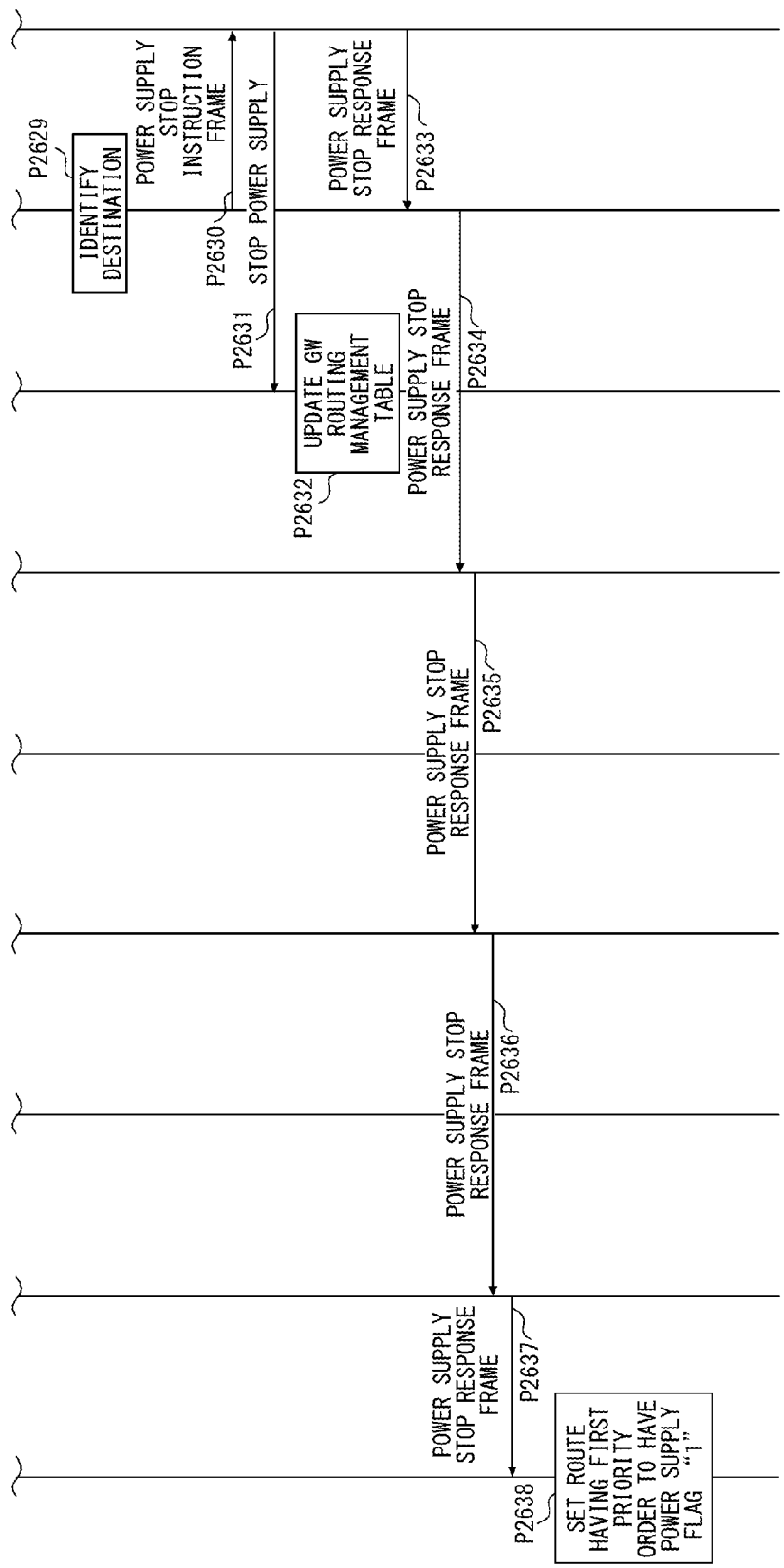

FIG. 25 is a diagram explaining a failure recovery detection process and a routing change process according to the embodiments. FIGS. 26A-26D illustrate an example of a routing change process sequence at the time of a failure recovery according to the embodiment.

For example, assume that, after a failure occurs in a power supply function due to a disconnection of a path 40-12, or the like, the path 40-12 is repaired, and the failure in the power supply function of the path 40-12 is recovered.

When the failure in the power supply function of the path 40-12 is recovered, and the relay node device 10-6 transmits a health frame request frame from a port P1 (p2601) along with starting the timer 138 (p2602), the relay node device 10-6 can receive a health frame from the port P1 within a prescribed time period during which the timer performs monitoring (p2603).

Then, the routing controller 135 of the relay node device 10-6 generates a state change notification frame for notifying the gateway device 20 of the recovery of a connection state of the port P1 of the own node device (p2604). A GW network ID of the generated state change notification frame is a GW network ID having the first priority order of the GW routing management table 136, e.g., an ID of a transmission route to which a circled number 10 is assigned in FIG. 25.

The relay node device 10-6 transmits the generated state change notification frame (p2605), and the relay node device 10-5 and the relay node device 10-1 in the transmission route each identify a destination of the received state change notification frame and transfer the state change notification frame (p2606-p2609). Then, the gateway device 20 receives the state change notification frame from the relay node device 10-6.

The routing controller 235 of the gateway device 20 refers to the received state change notification frame, and recognizes that the connection state of the transmission port P1 of the relay node device 10-6 has been recovered and that a connection destination of the transmission port P1 is a relay node device 10-10 (p2610).

The gateway device 20 generates and transmits a power-on instruction frame for instructing the power supply from the port P1 of the relay node device 10-6 (p2611), along with starting the timer 238 (p2612). The power-on instruction frame transmitted from the gateway device 20 passes through the relay node devices 10-1 and 10-5 (p2613 and p2614), and is received by the relay node device 10-6.

The power supply controller 137 of the relay node device 10-6 that has received the power-on instruction frame starts power supply via the port P1 (p2615). As a result, the relay node device 10-10 receives the power supply via the port P1 (p2616).

The relay node device 10-6 generates and transmits a power-on response frame for reporting that the power supply via the port P1 has been started (p2617). The power-on response frame transmitted from the relay node device 10-6 passes through the relay node devices 10-5 and 10-1 (p2618 and p2619), and is received by the gateway device 20.

The routing controller 235 of the gateway device 20 receives the power-on response frame from the relay node device 10-6, and thereby determines that the power supply to the relay node device 10-10 via the path 40-12 has been normally performed. The routing controller 235 refers to a routing management table 236 for the relay node device 10-10. Then, the routing controller 235 moves down transmission routes having the first or lower priority orders, and performs a change process of setting a transmission route including a path newly established as a power supply line to have the first priority order (p2620). In this specific example, a transmission route having the first priority order is a route to which a circled number 1 is assigned in FIG. 16. In some embodiments, the routing controller 235 may add a transmission route including the path newly established as a power supply line after the transmission routes having the first or lower priority orders. In this case, a transmission route having the first priority order that is used for a frame transmission is not changed.

The routing controller 235 generates and transmits a power supply stop instruction frame for instructing the stop of the power supply from the port P2 of the relay node device 10-14 (p2621), along with starting the timer 238 (p2622). A relay process for the power supply stop instruction frame transmitted from the gateway device 20 is performed in the relay node devices 10-1, 10-5, 10-9, and 10-13 (P2623-p2630), and the power supply stop instruction frame is received by the relay node device 10-14.

The power supply controller 137 of the relay node device 10-14 that has received the power supply stop instruction frame stops the power supply via the port P2 (p2631). As a result, the relay node device 10-10 stops receiving the power supply via the port P2.

The routing controller 135 of the relay node device 10-10 moves down transmission routes having the first or lower priority orders in the GW routing management table 136, and performs a change process of setting a new transmission route including a power supply line from the port P1 to have the first priority order (p2632). As a result, a GW routing management table 136 included in the relay node device 10-10 becomes, for example, the same table as a table before the failure occurrence as illustrated in FIG. 15. In some embodiments, the routing controller 135 may add a new transmission route including the power supply line from the port P1 after the transmission routes having the first or lower priority orders. In this case, a transmission route having the first priority order used for the frame transmission is not changed.

The relay node device 10-4 generates and transmits a power supply stop response frame for reporting that the power supply from the port P2 has been stopped (p2633). A relay process for the power supply stop response frame transmitted from the relay node device 10-14 is performed in the relay node devices 10-13, 10-9, 10-5, and 10-1 (p2634-p2637), and the power supply stop response frame is received by the gateway device 20.

The routing controller 235 of the gateway device 20 refers to the received power supply stop response frame, and determines that the power supply from the port P2 of the relay node device 10-14 has been stopped. Then, the routing controller 235 sets a power supply line flag of a transmission route having the first priority order in the routing management table 236 for the relay node device 10-10 to "1" (p2638). As a result, the routing management table 236 for the relay node device 10-10 becomes, for example, the same table as a table before the failure occurrence as illustrated in FIG. 14.

As described above, the embodiments enables detecting the failure recovery of a transmission route that has occurred in a wired ad-hoc network system and appropriately switching power supply lines and/or transmission routes.

<Relay Node Device Addition Process>

In the embodiments, even when a relay node device is added after a power supply line to each of the relay node devices is established by the power-on process as descried above, it is possible to establish a power supply line to the added relay node device.

Described below are a first example and a second example of a relay node device addition process according to the embodiments.

Figure 27:
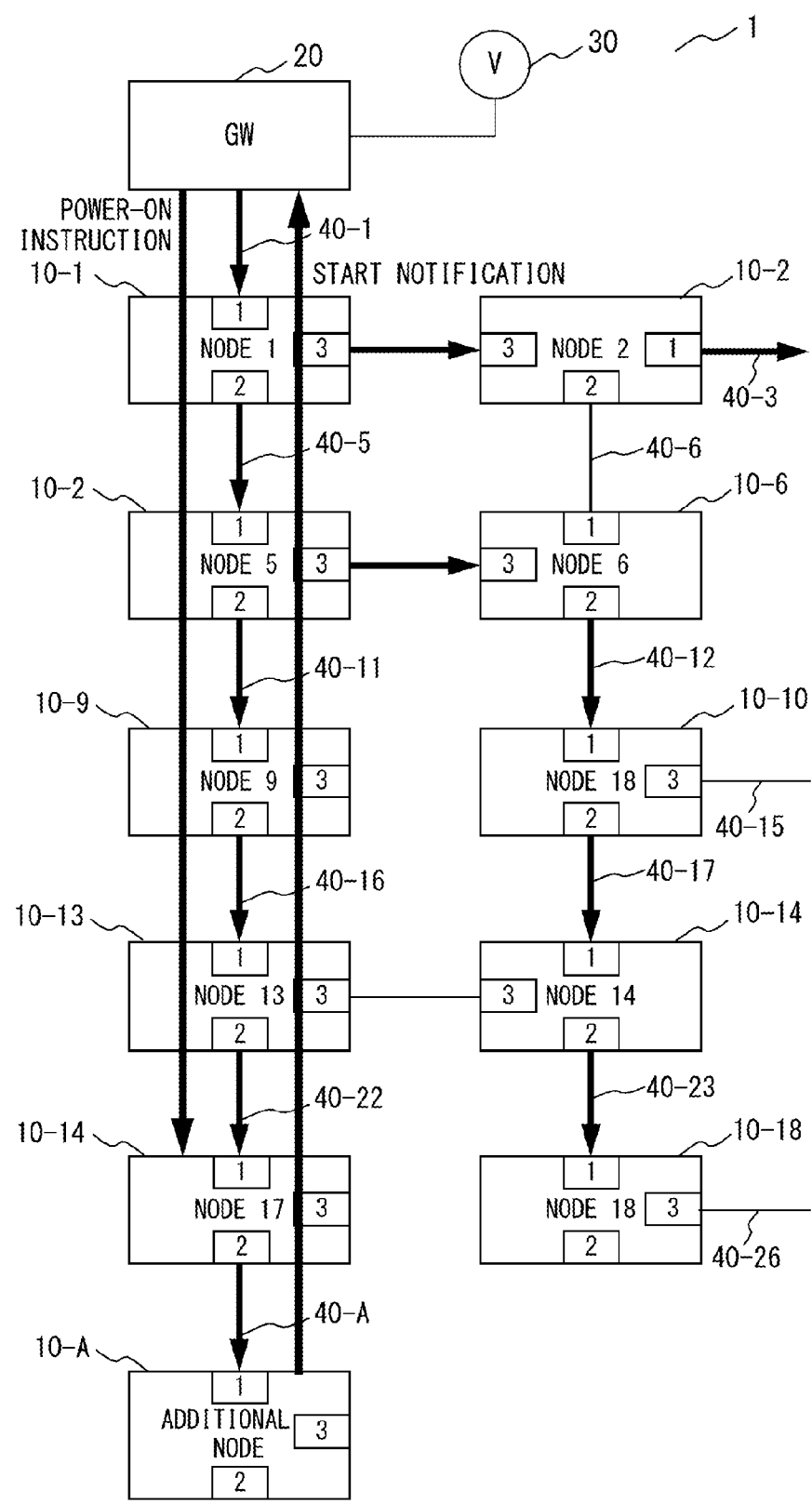
FIG. 27 is a diagram explaining the first example of a power supply control process according to an embodiment for an added relay node device.

FIG. 27 is a diagram explaining the first example of a power supply control process according to the embodiments for an added relay node device.

FIG. 27 illustrates a portion of the wired ad-hoc network system 1 illustrated in FIG. 9. Described below is an example of adding an additional relay node device 10-A using an unused port P2 of the relay node device 10-17 in the wired ad-hoc network system 1 illustrated in FIG. 27.

First, an additional path 40-A is connected to the unused port P2 of the relay node device 10-17 in the wired ad-hoc network system 1. In addition, a port P1 that is an arbitrary port of the additional relay node device 40-A is connected to the addition path 40-A.

Next, as illustrated in FIG. 27, a power-on instruction frame is transmitted from the gateway device 20 to the relay node device 10-17.

When the relay node device 10-17 receives the power-on instruction frame, the relay node device 10-17 starts power supply from the port P2. As a result, the additional relay node device 10-A receives the power supply from the relay node device 10-17 via the port P1, and is started.

The started additional relay node device 10-A transmits a start notification frame to the gateway device 20, as illustrated in FIG. 27.

The gateway device 20 refers to the received start notification frame, and stores an ID of the relay node device 10-A and the number of hops in a routing management table 236 for the relay node device 10-A. In addition, the gateway device 20 refers to a transmission/reception port number field, and generates a network ID to the relay node device 10-A. Then, the gateway device 20 stores the generated network ID in the routing management table 236, and sets a power supply line flag indicating that a power supply line has been established in a path indicated by the generated network ID.

Then, the gateway device 20 generates a start notification response frame, and transmits the start notification response frame to the relay node device 10-A.

The relay node device 10-A refers to the received start notification response frame, and stores a GW network ID and the number of hops in the GW routing management table 136.

As a result of the power-on process to the relay node device 10-A as described above, the path 40-A is established as a power supply line.

FIG. 28 is a diagram explaining a second example of the power supply control process according to the embodiments for an added relay node device.

FIG. 28 illustrates a portion of the wired ad-hoc network system illustrated in FIG. 9, similarly to FIG. 27.

First, a port power switch S2 of an unused port P2 of the relay node device 10-17 is set to be in an on state. For example, in the power-on process described above, when the relay node device 10 is configured to not stop the power output to an unused port at the time of the reception of the power-on instruction frame from the gateway device 20, a port power switch of the unused port of each of the relay node devices 10 has already been in an on state. In addition, when the relay node device 10 is configured to stop the power output to the unused port at the time of reception of the power-on instruction frame, a power-on instruction frame is newly transmitted from the gateway device 20 to the relay node device 10-17.

Next, an addition path 40-A is connected to an unused port P2 of the relay node device 10-17 in the wired ad-hoc network system 1. In addition, a port P1 that is an arbitrary port of an additional relay node device 10-A is connected to the addition path 40-A. As a result, the additional relay node device 10-A receives power supply from the relay node device 10-17 via the port P1, and is started.

The started addition relay node device 10-A transmits a start notification frame to the gateway device 20, as illustrated in FIG. 28.

The gateway device 20 refers to the received start notification frame, and stores an ID of the relay node device 10-A and the number of hops in a routing management table 236 for the relay node device 10-A. In addition, the gateway device 20 refers to a transmission/reception port number field of the start notification frame, and generates a network ID to the relay node device 10-A. Then, the gateway device 20 stores the generated network ID in the routing management table 236, and sets a power supply line flag indicating that a power supply line has been established in a path indicated by the generated network ID.

Then, the gateway device 20 generates a start notification response frame, and transmits the start notification response frame to the relay node device 10-A.

The relay node device 10-A refers to the received start notification response frame, and stores a GW network ID and the number of hops in the GW routing management table 136.

As a result of the power-on process to the relay node device 10-A as described above, the path 40-A is established as a power supply line.

As described above, according to the embodiments, even when a relay node device is added in a wired ad-hoc network system after a power supply line to each of the relay node devices is established, it is possible to establish a power supply line to an added relay node device. In addition, through a power-on process for the added relay node device, it is possible to establish a routing path between a gateway device that is an example of a power supply controller and the added relay node device.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power supply controller comprising:
    a first port that is connected to a power supply device;
    a second port that is connected to a first relay node device via a wired path; and
    a controller that performs control to:
        supply power received from the power supply device from the second port to the first relay node device;
        generate a power-on instruction frame for instructing the first relay node device to start power supply from a port included in the first relay node device to a second relay node device connected to the first relay node device via a wired path;
        transmit the generated power-on instruction frame from the second port to the first relay node device after starting the first relay node device by supplying the power to the first relay node device;
        receive, from the second port, a start notification frame of a started relay node device which started by the power supply from the second relay node device which received the power supply from the first relay node device, the first relay node device receiving the start notification frame from the started relay node device transferring the received start notification frame to the second port, the start notification frame including
            pieces of data respectively indicating a transmission port number and a reception port number of the start notification frame,
            data indicating a number of hops until the start notification frame is received by the power supply controller, and
            a power supply line flag indicating whether an adjacent relay node device connected to the started relay node device via a wired path is started by the power supply from a port of the started relay node device which transmitted the start notification frame;
        generate first network identification data indicating a transmission route of a frame from the started relay node device which transmitted the start notification frame, to the power supply controller in accordance with the data indicating the transmission port number included in the received start notification frame;
        generate second network identification data indicating a transmission route from the power supply controller to the started relay node device which transmitted the start notification frame in accordance with the data indicating the reception port number included in the received start notification frame;
        store the generated second network identification data, and the data indicating the number of hops and the power supply line flag which are included in the received start notification frame in a routing management table for managing a route to the started relay node device which transmitted the start notification frame; and
        transmit a start notification response frame including the generated first network identification data to the started relay node device which transmitted the start notification frame in accordance with the second network identification data.

2. The power supply controller according to claim 1, wherein the controller performs control to:
    generate third network identification data indicating an alternative route for the transmission route in accordance with the data indicating the transmission port number which is included in the received start notification frame, when the power supply line flag included in the received start notification frame indicates that the adjacent relay node device is not started;
    generate fourth network identification data indicating an alternative route of the transmission route from the started relay node device which transmitted the start notification frame, to the power supply controller in accordance with the data indicating the reception port number included in the received start notification frame;

store the generated third network identification data, and the data indicating the number of hops and the power supply line flag which are included in the received start notification frame in the routing management table; and transmit a start notification response frame including the generated third network identification data to the started relay node device which transmitted the start notification frame in accordance with the fourth network identification data.

3. The power supply controller according to claim 2, wherein the controller receives, from the started relay node device, a state change notification frame for reporting a change in a connection state of a port included in the started relay node device, and when the received state change notification frame indicates an occurrence of a connection failure of the port, the controller performs control to select, from the routing management table, an alternative route that does not pass through the port in which the connection failure has occurred, and transmit a power-on instruction frame for instructing the started relay node device to start power supply from a port having a specified port number or a power supply stop instruction frame for instructing the started relay node device to stop the power supply from the port having the specified port number, so as to supply power along the alternative route.

4. The power supply controller according to claim 3, wherein, when the received state change notification frame indicates a recovery of the connection failure of the port, the controller performs control to transmit the power-on instruction frame or the power supply stop instruction frame so as to supply power along a transmission route used before an occurrence of the connection failure of the port.

5. A relay node device comprising:

a first port that is connected to, via a wired path, a power supply controller connected to a power supply device or an adjacent relay node device which is adjacent to the relay node device and which is receiving power supply from the power supply device;

a second port that is connected to an another adjacent relay node device which is adjacent to the relay node device and which is different from the adjacent relay node device; and a controller that transmits a start notification frame for reporting a start of the relay node device from the first port to the power supply controller, when the relay node device is started by receiving, from the first port, power supply from the power supply controller or the adjacent relay node device, and starts power supply from the second port to the another adjacent relay node device, when the controller receives, from the power supply controller, a power-on instruction frame for instructing a start of power supply from a port included in the relay node device to the adjacent relay node device connected to the relay node device via a wired path.

6. The relay node device according to claim 5, wherein the start notification frame comprises pieces of data that respectively indicate a transmission port number and a reception port number of the start notification frame, and data that indicates a number of hops until the start notification frame is received by the power supply controller, and the controller performs:

receiving a start notification response frame transmitted by the power supply controller that has received the start notification frame, the start notification response frame including a first network identification data and the number hops, and being transmitted in accordance with a second network identification data, the first network identification data being generated in accordance with the data indicating the transmission port number included in the received start notification frame, and indicating a transmission route of a frame from a relay node device which transmitted the start notification frame, to the power supply controller, the second network identification data being generated in accordance with the data indicating the reception port number included in the received start notification frame, and indicating a transmission route from the power supply controller to the relay node device which transmitted the start notification frame; and storing the first network identification data and the data indicating the number of hops which are included in the received start notification response frame, in a routing management table for managing a route to the power supply controller.

7. The relay node device according to claim 6, wherein the controller:

transmits a health frame request frame from each of the first port and the second port; and performs control to generate a state change notification frame for reporting, to the power supply controller, a change in a connection state of a port from which a health frame is not received and to transmit the generated start change notification frame from a port different from the port from which the health frame is not received, when the controller does not receive the health frame from one or more of the first port and the second port within a prescribed time period.

8. The relay node device according to claim 7, wherein when the controller receives a power-on instruction frame for instructing that power supply be started from a port having a specified port number or a power supply stop instruction frame for instructing that the power supply from the port having the specified port number be stopped after the controller transmits the state change notification frame, the controller selects, from the routing management table, a route including a port from which the power is to be supplied after a change according to the power-on instruction frame or the power supply stop instruction frame, and controls a start or a stop of the power supply so as to use the selected route in transmitting a frame addressed to the power supply controller.

9. A wired ad-hoc network system comprising:

a gateway device that is connected to a power supply device;

a first relay node device including a first port connected to the gateway device via a wired path;

a second relay node device including a second port connected to the first relay node device via a wired path; and a started relay node device which is started by the power supply from the second relay node device, wherein the gateway device supplies power received from the power supply device to the first relay node, and generates and transmits a power-on instruction frame for instructing the first relay node device which started by receiving power supply to start power supply from the first port to the second relay node device, the started relay node device which started by the power supply from the second relay device, which received the power supply from the first relay node device, transmits a start notification frame, the start notification frame including
pieces of data that respectively indicate a transmission port number and a reception port number,
data indicating a number of hops to the gateway device, and
a power supply line flag indicating whether an adjacent relay node device connected to the started relay node device via a wired path has been started by the power supply from a port of the started relay node device,
the gateway device generates first network identification data indicating a transmission route of a frame from the started relay node device which transmitted the start notification frame, to the gateway device in accordance with the data indicating the transmission port number included in the received start notification frame,
the gateway device generates second network identification data indicating a transmission route from the gateway device to the started relay node device which transmitted the start notification frame in accordance with the data indicating the reception port number included in the received start notification frame,
the gateway device stores the generated second network identification data, and the data indicating the number of hops and the power supply line flag which are included in the received start notification frame, in a routing management table for managing a route to the started relay node device transmitted the start notification frame,
the gateway device transmits a start notification response frame including the generated first network identification data to the started relay node device which transmitted the start notification frame in accordance with the second network identification data, and
the started relay node device stores the first network identification data and the data indicating the number of hops which are included in the received start notification response frame, in a gateway routing management table for managing a route to the power supply controller.

10. A power supply control method for supplying power from a power supply controller connected to a power supply device to a plurality of relay node devices that include a first relay node device including a first port connected to the power supply controller via a wired path, a second relay node device including a second port connected to the first relay node device via a wired path and a started relay node device which is started by the power supply from the second relay node device, the power supply control method comprising:
supplying power received from the power supply device to the first relay node by the power supply controller, and generating and transmitting, by the power supply controller, a power-on instruction frame for instructing the first relay node device which started by receiving power supply to start the power supply from the first port to the second relay node device;
transmitting a start notification frame by the started relay node device which started by the power supply from the second relay device which received the power supply from the first relay node device, the start notification frame including
pieces of data that respectively indicate a transmission port number and a reception port number,
data indicating a number of hops to the power supply controller, and
a power supply line flag indicating whether an adjacent relay node device connected to the started relay node device via a wired path has been started by the power supply from a port of the started relay node device;
generating, by the power supply controller, first network identification data indicating a transmission route of a frame from the started relay node device which transmitted the start notification frame, to the power supply controller, in accordance with the data indicating the transmission port number included in the received start notification frame;
generating, by the power supply controller, second network identification data indicating a transmission route from the power supply controller to the started relay node device which transmitted the start notification frame, in accordance with the data indicating the reception port number included in the received start notification frame;
storing, by the power supply controller, the generated second network identification data, and the data indicating the number of hops and the power supply line flag which are included in the received start notification frame, in a routing management table for managing a route to the started relay node device which transmitted the start notification frame;
transmitting, by the power supply controller, a start notification response frame including the generated first network identification data to the started relay node device which transmitted the start notification frame, in accordance with the second network identification data; and
storing, by the started relay node device, the first network identification data and the data indicating the number of hops which are included in the received start notification response frame, in a gateway routing management table for managing a route to the power supply controller.

11. The power supply control method according to claim 10, wherein
the power supply controller generates third network identification data indicating an alternative route for the transmission route in accordance with the data indicating the transmission port number included in the received start notification frame, when the power supply line flag included in the received start notification frame indicates that the adjacent relay node device has not been started,
the power supply controller generates fourth network identification data indicating an alternative route for the transmission route from the started relay node device transmitted the start notification frame to the power supply controller in accordance with the data indicating the reception port number included in the received start notification frame,
the power supply controller stores the generated third network identification data, and the data indicating the number of hops and the power supply line flag which are included in the received start notification frame, in the routing management table,
the power supply controller transmits a start notification response frame including the generated third network identification data to the started relay node device which transmitted the start notification frame in accordance with the fourth network identification data, and the started relay node device stores the third network identification data and the data indicating the number of hops which are included in the received start notification response frame, in the gateway routing management table.

12. The power supply control method according to claim 11, wherein the started relay node device transmits a health frame request frame from each port included in the started relay node device, when the started relay node device does not receive a health frame from one or more of the ports within a prescribed time period, the started relay node device generates a state change notification frame for reporting, to the power supply controller, a change in a connection state of a port from which the health frame is not received, and transmits the generated state change notification frame from a port that different from the port from which the health frame is not received, and the power supply controller receives the state change notification frame from the started relay node device.

13. The power supply control method according to claim 12, wherein when the received state change notification frame indicates an occurrence of a connection failure of a port, the power supply controller selects, from the routing management table, an alternative route that does not pass through the port in which the connection failure has occurred, and transmits a power-on instruction frame for instructing the started relay node device to start power supply from a port having a specified port number or a power supply stop instruction frame for instructing the started relay node device to stop the power supply from the port having the specified port number, so as to supply power from the power supply controller to the started relay node device which transmitted the state change notification frame along the alternative route selected, and the started relay node device selects, from the gateway routing management table, a route including a port from which the power is to be supplied after a change according to the received power-on instruction frame or power supply stop instruction frame, and controls a start or stop of the power supply so as to transmit a frame using the selected route.

14. The power supply control method according to claim 13, wherein when the received state change notification frame indicates a recovery of the connection failure of the port, the power supply controller transmits the power-on instruction frame or the power supply stop instruction frame so as to supply power from the power supply controller to the started relay node device which transmitted the state change notification frame along a transmission route used before an occurrence of the connection failure of the port, and the started relay node device selects, from the gateway routing management table, a route including a port from which the power is to be supplied after a change according to the received power-on instruction frame or power supply stop instruction frame, and performs control to use the selected route in transmitting a frame addressed to the power supply controller.

* * * * *